US011290418B2

(12) United States Patent
Vasquez et al.

(10) Patent No.: US 11,290,418 B2
(45) Date of Patent: *Mar. 29, 2022

(54) HYBRID CONTENT REQUEST ROUTING SYSTEM

(71) Applicant: Amazon Technologies, Inc., Seattle, WA (US)

(72) Inventors: Jorge Vasquez, Mercer Island, WA (US); Mohanish Narayan, Mumbai (IN); Harvo Reyzell Jones, Gig Harbor, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/987,806

(22) Filed: Aug. 7, 2020

(65) Prior Publication Data

US 2020/0366638 A1 Nov. 19, 2020

Related U.S. Application Data

(63) Continuation of application No. 15/714,799, filed on Sep. 25, 2017, now Pat. No. 10,742,593.

(51) Int. Cl.
*H04L 29/12* (2006.01)
*H04L 61/4511* (2022.01)
(Continued)

(52) U.S. Cl.
CPC ...... *H04L 61/1511* (2013.01); *H04L 61/2007* (2013.01); *H04L 67/42* (2013.01)

(58) Field of Classification Search
CPC .................. H04L 61/1511; H04L 67/2007
See application file for complete search history.

(56) References Cited

U.S. PATENT DOCUMENTS

| 1,075,551 A | 10/1913 | D'Amours |
| 5,063,500 A | 11/1991 | Shorter |

(Continued)

FOREIGN PATENT DOCUMENTS

| CA | 2741 895 A1 | 5/2010 |
| CA | 2765397 A1 | 2/2011 |

(Continued)

OTHER PUBLICATIONS

Office Action in Chinese Application No. 201810426428.0 dated Jul. 20, 2020 in 25 pages.

(Continued)

*Primary Examiner* — Benjamin M Thieu
(74) *Attorney, Agent, or Firm* — Knobbe Martens Olson & Bear LLP

(57) ABSTRACT

A hybrid content request routing system is described herein. The hybrid content request routing system may use aspects of the anycast routing technique and aspects of the domain name server (DNS) resolver-based routing technique to identify the appropriate network address to provide to a user device in response to receiving a DNS query. For example, the hybrid content request routing system may include one or more points of presence (POPs), with some or all of the POPs forming one or more virtual POPs. Individual POPs may be assigned unique network addresses and POPs that form a virtual POP may be assigned the same anycast network address. The hybrid content request routing system can measure latencies from user devices to the individual POP network addresses and to the anycast network addresses and use the measured latencies to identify the network address that may result in the lowest latency.

20 Claims, 7 Drawing Sheets

(51) Int. Cl.
*H04L 61/5007* (2022.01)
*H04L 67/01* (2022.01)

(56) References Cited

U.S. PATENT DOCUMENTS

| | | |
|---|---|---|
| 5,341,477 A | 8/1994 | Pitkin et al. |
| 5,459,837 A | 10/1995 | Caccavale |
| 5,611,049 A | 3/1997 | Pitts |
| 5,627,889 A | 3/1997 | Eslambolchi |
| 5,701,467 A | 9/1997 | Freeston |
| 5,764,910 A | 6/1998 | Shachar |
| 5,774,660 A | 6/1998 | Brendel et al. |
| 5,815,649 A | 9/1998 | Utter et al. |
| 5,852,717 A | 11/1998 | Bhide et al. |
| 5,892,914 A | 4/1999 | Pitts |
| 5,893,116 A | 4/1999 | Simmonds et al. |
| 5,895,462 A | 4/1999 | Toki |
| 5,905,248 A | 4/1999 | Russell et al. |
| 5,933,811 A | 5/1999 | Angles et al. |
| 5,937,427 A | 8/1999 | Shinagawa et al. |
| 5,974,454 A | 8/1999 | Apfel et al. |
| 5,991,306 A | 10/1999 | Burns et al. |
| 5,999,274 A | 11/1999 | Lee et al. |
| 6,006,264 A | 12/1999 | Colby et al. |
| 6,016,512 A | 1/2000 | Huitema |
| 6,026,452 A | 1/2000 | Pitts |
| 6,085,234 A | 1/2000 | Pitts et al. |
| 6,038,601 A | 2/2000 | Lambert et al. |
| 6,052,718 A | 3/2000 | Gifford |
| 6,078,960 A | 4/2000 | Ballard |
| 6,018,619 A | 6/2000 | Allard et al. |
| 6,092,100 A | 7/2000 | Berstis et al. |
| 6,098,096 A | 7/2000 | Tsirigotis et al. |
| 6,108,703 A | 8/2000 | Leighton et al. |
| 6,128,279 A | 8/2000 | O'Neil et al. |
| 6,151,631 A | 10/2000 | Ansell et al. |
| 6,157,942 A | 11/2000 | Chu et al. |
| 6,167,438 A | 12/2000 | Yates et al. |
| 6,167,446 A | 12/2000 | Lister et al. |
| 6,173,316 B1 | 1/2001 | De Boor et al. |
| 6,178,160 B1 | 1/2001 | Bolton et al. |
| 6,182,111 B1 | 1/2001 | Inohara et al. |
| 6,182,125 B1 | 1/2001 | Borella et al. |
| 6,185,598 B1 | 1/2001 | Farber et al. |
| 6,192,051 B1 | 2/2001 | Lipman et al. |
| 6,205,475 B1 | 2/2001 | Pitts |
| 6,223,288 B1 | 3/2001 | Byrne |
| 6,223,209 B1 | 4/2001 | Watson et al. |
| 6,243,761 B1 | 4/2001 | Mogul et al. |
| 6,275,496 B1 | 6/2001 | Burns et al. |
| 6,256,671 B1 | 7/2001 | Strentzsch et al. |
| 6,286,043 B1 | 8/2001 | Cuomo et al. |
| 6,286,084 B1 | 9/2001 | Wexler et al. |
| 6,304,913 B1 | 9/2001 | Rune |
| 6,324,580 B1 | 10/2001 | Jindal et al. |
| 6,330,602 B1 | 11/2001 | Law et al. |
| 6,338,082 B1 | 1/2002 | Schneider |
| 6,345,308 B1 | 1/2002 | Abe |
| 6,351,743 B1 | 2/2002 | DeArdo et al. |
| 6,351,775 B1 | 2/2002 | Yu |
| 6,363,411 B1 | 2/2002 | Dugan et al. |
| 6,366,952 B2 | 3/2002 | Pitts |
| 6,374,290 B1 | 4/2002 | Scharber et al. |
| 6,377,257 B1 | 4/2002 | Borrel et al. |
| 6,386,043 B1 | 4/2002 | Millins |
| 6,389,532 B1 | 5/2002 | Gupta et al. |
| 6,405,252 B1 | 5/2002 | Gupta et al. |
| 6,408,360 B1 | 6/2002 | Chamberlain et al. |
| 6,411,967 B1 | 6/2002 | Van Renesse |
| 6,415,280 B1 | 6/2002 | Farber et al. |
| 6,430,607 B1 | 7/2002 | Kavner |
| 6,438,592 B1 | 8/2002 | Killian |
| 6,442,165 B1 | 8/2002 | Sitaraman et al. |
| 6,452,925 B1 | 8/2002 | Sistanizadeh et al. |
| 6,457,047 B1 | 9/2002 | Chandra et al. |
| 6,459,909 B1 | 9/2002 | Bilcliff et al. |
| 6,473,804 B1 | 10/2002 | Kaiser et al. |
| 6,484,143 B1 | 10/2002 | Swildens et al. |
| 6,484,161 B1 | 11/2002 | Chipalkatti et al. |
| 6,493,765 B1 | 11/2002 | Cunningham et al. |
| 6,505,241 B2 | 1/2003 | Pitts |
| 6,513,112 B1 | 1/2003 | Craig et al. |
| 6,523,036 B1 | 1/2003 | Hickman et al. |
| 6,529,910 B1 | 2/2003 | Fleskes |
| 6,529,953 B1 | 3/2003 | Van Renesse |
| 6,553,413 B1 | 3/2003 | Leighton et al. |
| 6,560,610 B1 | 4/2003 | Eatherton et al. |
| 6,564,380 B1 | 5/2003 | Murphy |
| 6,611,873 B1 | 5/2003 | Kanehara |
| 6,622,168 B1 | 8/2003 | Datta |
| 6,643,357 B2 | 10/2003 | Lumsden |
| 6,643,707 B1 | 11/2003 | Booth |
| 6,654,807 B2 | 11/2003 | Farber et al. |
| 6,658,462 B1 | 11/2003 | Dutta |
| 6,665,706 B2 | 12/2003 | Kenner et al. |
| 6,678,717 B1 | 1/2004 | Schneider |
| 6,678,791 B1 | 1/2004 | Jacobs et al. |
| 6,681,282 B1 | 1/2004 | Golden et al. |
| 6,687,846 B1 | 1/2004 | Adrangi et al. |
| 6,694,358 B1 | 2/2004 | Swildens et al. |
| 6,697,805 B1 | 2/2004 | Choquier et al. |
| 6,718,324 B2 | 3/2004 | Edlund et al. |
| 6,724,770 B1 | 4/2004 | Van Renesse |
| 6,732,237 B1 | 4/2004 | Jacobs et al. |
| 6,754,699 B2 | 5/2004 | Swildens et al. |
| 6,754,706 B1 | 6/2004 | Swildens et al. |
| 6,760,721 B1 | 6/2004 | Chasen et al. |
| 6,769,031 B1 | 7/2004 | Bero |
| 6,782,398 B1 | 7/2004 | Bahl |
| 6,785,704 B1 | 8/2004 | McCanne |
| 6,795,434 B1 | 8/2004 | Kumar et al. |
| 6,799,214 B1 | 9/2004 | Li |
| 6,804,706 B2 | 9/2004 | Pitts |
| 6,810,291 B2 | 10/2004 | Card et al. |
| 6,810,411 B1 | 10/2004 | Coughlin et al. |
| 6,829,654 B1 | 11/2004 | Jungck |
| 6,862,607 B1 | 3/2005 | Vermeulen |
| 6,868,439 B2 | 3/2005 | Basu et al. |
| 6,874,017 B1 | 3/2005 | Inoue et al. |
| 6,917,951 B2 | 3/2005 | Orbits et al. |
| 6,925,499 B1 | 7/2005 | Chen et al. |
| 6,928,467 B2 | 8/2005 | Peng et al. |
| 6,928,485 B1 | 8/2005 | Krishnamurthy et al. |
| 6,941,562 B2 | 8/2005 | Gao et al. |
| 6,944,167 B1 | 9/2005 | McPherson |
| 6,950,848 B1 | 9/2005 | Yousefi'zadeh et al. |
| 6,961,783 B1 | 9/2005 | Cook et al. |
| 6,963,850 B1 | 11/2005 | Bezos et al. |
| 6,968,389 B1 | 11/2005 | Menditto et al. |
| 6,976,090 B2 | 12/2005 | Ben-Shaul et al. |
| 6,981,017 B1 | 12/2005 | Kasriel et al. |
| 6,981,025 B1 | 12/2005 | Frazier et al. |
| 6,985,945 B2 | 1/2006 | Farhat et al. |
| 6,986,018 B2 | 1/2006 | O'Rourke et al. |
| 6,990,526 B1 | 1/2006 | Zhu |
| 6,996,616 B1 | 1/2006 | Leighton et al. |
| 7,003,555 B1 | 2/2006 | Jungck |
| 7,006,099 B2 | 2/2006 | Gut et al. |
| 7,007,089 B2 | 2/2006 | Freedman |
| 7,010,578 B1 | 3/2006 | Lewin et al. |
| 7,010,598 B2 | 3/2006 | Sitaraman et al. |
| 7,024,466 B2 | 4/2006 | Outten et al. |
| 7,027,582 B2 | 4/2006 | Khello et al. |
| 7,031,445 B2 | 4/2006 | Lumsden |
| 7,032,010 B1 | 4/2006 | Swildens et al. |
| 7,058,633 B1 | 4/2006 | Gnagy et al. |
| 7,058,706 B1 | 6/2006 | Iyer et al. |
| 7,058,953 B2 | 6/2006 | Willard et al. |
| 7,062,158 B1 | 6/2006 | Ayaki |
| 7,065,587 B2 | 6/2006 | Huitema et al. |
| 7,072,982 B2 | 6/2006 | Teodosiu et al. |
| 7,076,633 B2 | 7/2006 | Tormasov et al. |
| 7,082,476 B1 | 7/2006 | Cohen et al. |
| 7,086,061 B1 | 8/2006 | Joshi et al. |

(56) References Cited

U.S. PATENT DOCUMENTS

| | | |
|---|---|---|
| 7,092,505 B2 | 8/2006 | Allison et al. |
| 7,092,997 B1 | 8/2006 | Kasriel et al. |
| 7,095,715 B2 | 8/2006 | Buckman et al. |
| 7,096,266 B2 | 8/2006 | Lewin et al. |
| 7,099,936 B2 | 8/2006 | Chase et al. |
| 7,103,645 B2 | 8/2006 | Leighton et al. |
| 7,114,160 B2 | 9/2006 | Suryanarayana et al. |
| 7,117,262 B2 | 9/2006 | Bai et al. |
| 7,133,905 B2 | 10/2006 | Dilley et al. |
| 7,136,922 B2 | 11/2006 | Sundaram et al. |
| 7,139,808 B2 | 11/2006 | Anderson et al. |
| 7,139,821 B1 | 11/2006 | Shah et al. |
| 7,143,169 B1 | 11/2006 | Champagne et al. |
| 7,143,170 B2 | 11/2006 | Swildens et al. |
| 7,146,560 B2 | 11/2006 | Dang et al. |
| 7,149,747 B1 | 12/2006 | Cheng et al. |
| 7,149,809 B1 | 12/2006 | Barde et al. |
| 7,152,118 B2 | 12/2006 | Anderson, IV et al. |
| 7,162,539 B2 | 1/2007 | Garcie-Luna-Aceves |
| 7,165,117 B1 | 1/2007 | Sitaraman et al. |
| 7,171,469 B2 | 1/2007 | Ackaouy et al. |
| 7,174,382 B2 | 1/2007 | Ramanathan et al. |
| 7,185,046 B2 | 2/2007 | Ferstl et al. |
| 7,185,063 B1 | 2/2007 | Kasriel et al. |
| 7,185,084 B2 | 2/2007 | Sirivara et al. |
| 7,188,214 B1 | 2/2007 | Kasriel et al. |
| 7,194,522 B1 | 3/2007 | Swildens et al. |
| 7,194,552 B1 | 3/2007 | Schneider |
| 7,200,667 B2 | 3/2007 | Teodosiu et al. |
| 7,200,673 B1 | 4/2007 | Augart |
| 7,216,170 B2 | 4/2007 | Ludvig et al. |
| 7,225,254 B1 | 5/2007 | Swildens et al. |
| 7,228,350 B2 | 5/2007 | Hong et al. |
| 7,228,359 B1 | 6/2007 | Monteiro |
| 7,233,978 B2 | 6/2007 | Overton et al. |
| 7,240,100 B1 | 6/2007 | Wein et al. |
| 7,249,196 B1 | 7/2007 | Peiffer et al. |
| 7,251,675 B1 | 7/2007 | Kamakura et al. |
| 7,254,626 B1 | 7/2007 | Kommula et al. |
| 7,272,227 B1 | 7/2007 | Beran |
| 7,254,634 B1 | 8/2007 | Davis et al. |
| 7,254,636 B1 | 8/2007 | O'Toole, Jr. et al. |
| 7,257,581 B1 | 8/2007 | Steele et al. |
| 7,260,598 B1 | 8/2007 | Liskov et al. |
| 7,260,639 B2 | 8/2007 | Afergan et al. |
| 7,269,784 B1 | 9/2007 | Kasriel et al. |
| 7,274,658 B2 | 9/2007 | Bornstein et al. |
| 7,284,056 B2 | 9/2007 | Ramig |
| 7,289,519 B1 | 10/2007 | Liskov |
| 7,293,093 B2 | 10/2007 | Leighton |
| 7,308,499 B2 | 11/2007 | Chavez |
| 7,310,686 B2 | 12/2007 | Uysal |
| 7,316,648 B2 | 1/2008 | Kelly et al. |
| 7,318,074 B2 | 1/2008 | Iyengar et al. |
| 7,320,131 B1 | 1/2008 | O'Toole, Jr. |
| 7,321,918 B2 | 1/2008 | Burd et al. |
| 7,337,968 B2 | 1/2008 | Wilz, Sr. et al. |
| 7,339,937 B2 | 3/2008 | Mitra et al. |
| 7,340,505 B2 | 3/2008 | Lisiecki et al. |
| 7,343,397 B2 | 3/2008 | Kochanski |
| 7,350,075 B1 | 3/2008 | Eastham et al. |
| 7,362,703 B1 | 3/2008 | Taft et al. |
| 7,363,291 B1 | 4/2008 | Page |
| 7,363,626 B2 | 4/2008 | Koutharapu et al. |
| 7,370,089 B2 | 4/2008 | Boyd et al. |
| 7,372,809 B2 | 5/2008 | Chen |
| 7,373,416 B2 | 5/2008 | Kagan et al. |
| 7,376,716 B2 | 5/2008 | Dilley et al. |
| 7,376,736 B2 | 5/2008 | Sundaram et al. |
| 7,380,078 B2 | 5/2008 | Ikegaya et al. |
| 7,389,354 B1 | 5/2008 | Sitaraman et al. |
| 7,392,236 B2 | 6/2008 | Rusch et al. |
| 7,398,301 B2 | 6/2008 | Hennessey et al. |
| 7,406,512 B2 | 7/2008 | Swildens et al. |
| 7,406,522 B2 | 7/2008 | Riddle |
| 7,409,712 B1 | 7/2008 | Brooks et al. |
| 7,430,610 B2 | 8/2008 | Pace et al. |
| 7,441,045 B2 | 9/2008 | Skene et al. |
| 7,441,261 B2 | 10/2008 | Slater et al. |
| 7,451,230 B2 | 10/2008 | Corrado et al. |
| 7,454,457 B1 | 11/2008 | Lowery et al. |
| 7,454,500 B1 | 11/2008 | Hsu et al. |
| 7,461,170 B1 | 11/2008 | Taylor et al. |
| 7,464,142 B2 | 12/2008 | Flurry et al. |
| 7,472,201 B1 | 12/2008 | Aitken |
| 7,478,148 B2 | 1/2009 | Neerdaels |
| 7,492,720 B2 | 1/2009 | Pruthi et al. |
| 7,496,651 B1 | 2/2009 | Joshi |
| 7,499,998 B2 | 2/2009 | Toebes et al. |
| 7,502,836 B1 | 3/2009 | Menditto et al. |
| 7,505,464 B2 | 3/2009 | Okmianski et al. |
| 7,506,034 B2 | 3/2009 | Coates et al. |
| 7,519,705 B1 | 3/2009 | Papagiannaki et al. |
| 7,519,720 B2 | 4/2009 | Fishman et al. |
| 7,519,726 B2 | 4/2009 | Palliyil et al. |
| 7,523,181 B2 | 4/2009 | Swildens et al. |
| 7,543,024 B2 | 4/2009 | Holstege |
| 7,548,947 B2 | 6/2009 | Kasriel et al. |
| 7,552,235 B2 | 6/2009 | Chase et al. |
| 7,555,542 B1 | 6/2009 | Ayers et al. |
| 7,561,571 B1 | 6/2009 | Lovett et al. |
| 7,565,407 B1 | 7/2009 | Hayball |
| 7,568,032 B2 | 7/2009 | Feng et al. |
| 7,573,916 B1 | 7/2009 | Bechtolsheim et al. |
| 7,574,499 B1 | 8/2009 | Swildens et al. |
| 7,581,009 B1 | 8/2009 | Hsu et al. |
| 7,593,935 B2 | 8/2009 | Sullivan |
| 7,584,507 B1 | 9/2009 | Nucci |
| 7,594,189 B1 | 9/2009 | Walker et al. |
| 7,596,619 B2 | 9/2009 | Leighton et al. |
| 7,603,439 B2 | 9/2009 | Dilley et al. |
| 7,613,815 B1 | 10/2009 | Prakash et al. |
| 7,617,222 B2 | 11/2009 | Coulthard et al. |
| 7,623,460 B2 | 11/2009 | Miyazaki |
| 7,624,169 B2 | 11/2009 | Lisiecki et al. |
| 7,624,264 B2 | 11/2009 | Aura et al. |
| 7,631,101 B2 | 11/2009 | Sullivan et al. |
| 7,626,940 B2 | 12/2009 | Jain |
| 7,640,296 B2 | 12/2009 | Fuchs et al. |
| 7,650,376 B1 | 1/2010 | Blumenau |
| 7,653,689 B1 | 1/2010 | Champagne et al. |
| 7,653,700 B1 | 1/2010 | Bahl et al. |
| 7,653,725 B2 | 1/2010 | Yahiro et al. |
| 7,657,613 B1 | 1/2010 | Hanson et al. |
| 7,657,622 B1 | 2/2010 | Douglis et al. |
| 7,661,027 B2 | 2/2010 | Langen et al. |
| 7,664,831 B2 | 2/2010 | Cartmell et al. |
| 7,664,879 B2 | 2/2010 | Chan et al. |
| 7,676,570 B2 | 2/2010 | Levy et al. |
| 7,680,897 B1 | 3/2010 | Carter et al. |
| 7,684,394 B1 | 3/2010 | Cutbill et al. |
| 7,685,109 B1 | 3/2010 | Ransil et al. |
| 7,685,251 B2 | 3/2010 | Houlihan et al. |
| 7,685,270 B1 | 3/2010 | Vermeulen et al. |
| 7,685,273 B1 | 3/2010 | Anastas et al. |
| 7,693,813 B1 | 3/2010 | Cao et al. |
| 7,693,959 B2 | 4/2010 | Leighton et al. |
| 7,698,418 B2 | 4/2010 | Shimada et al. |
| 7,702,724 B1 | 4/2010 | Brydon et al. |
| 7,706,740 B2 | 4/2010 | Collins et al. |
| 7,707,071 B2 | 4/2010 | Rigole |
| 7,707,314 B2 | 4/2010 | McCarthy et al. |
| 7,711,647 B2 | 4/2010 | Gunaseelan et al. |
| 7,711,788 B2 | 5/2010 | Lev Ran et al. |
| 7,716,367 B1 | 5/2010 | Leighton et al. |
| 7,725,602 B2 | 5/2010 | Liu et al. |
| 7,725,658 B2 | 5/2010 | Lang et al. |
| 7,730,187 B2 | 5/2010 | Raciborski et al. |
| 7,739,400 B2 | 6/2010 | Lindbo et al. |
| 7,747,720 B2 | 6/2010 | Toebes et al. |
| 7,748,005 B2 | 6/2010 | Romero et al. |
| 7,756,017 B2 | 7/2010 | Goyal et al. |
| 7,756,032 B2 | 7/2010 | Feick et al. |
| 7,756,913 B1 | 7/2010 | Day |

(56) References Cited

U.S. PATENT DOCUMENTS

| | | |
|---|---|---|
| 7,756,965 B2 | 7/2010 | Joshi |
| 7,757,202 B2 | 7/2010 | Dahlsted et al. |
| 7,761,572 B1 | 7/2010 | Auerbach |
| 7,765,295 B2 | 7/2010 | Anastas et al. |
| 7,765,304 B2 | 7/2010 | Davis et al. |
| 7,769,823 B2 | 7/2010 | Jenny et al. |
| 7,773,596 B1 | 8/2010 | Marques |
| 7,774,342 B1 | 8/2010 | Virdy |
| 7,783,727 B1 | 8/2010 | Foley et al. |
| 7,787,380 B1 | 8/2010 | Aggarwal et al. |
| 7,792,989 B2 | 8/2010 | Toebes et al. |
| 7,805,516 B2 | 9/2010 | Kettler et al. |
| 7,809,597 B2 | 9/2010 | Das et al. |
| 7,813,308 B2 | 10/2010 | Reddy et al. |
| 7,814,229 B1 | 10/2010 | Cabrera et al. |
| 7,818,454 B2 | 10/2010 | Kim et al. |
| 7,827,256 B2 | 10/2010 | Phillips et al. |
| 7,836,177 B2 | 11/2010 | Kasriel et al. |
| 7,853,719 B1 | 11/2010 | Cao et al. |
| 7,853,680 B2 | 12/2010 | Phatak |
| 7,860,735 B2 | 12/2010 | Evanitsky |
| 7,865,594 B1 | 1/2011 | Baumback et al. |
| 7,865,953 B1 | 1/2011 | Hsieh et al. |
| 7,873,065 B1 | 1/2011 | Mukerji et al. |
| 7,890,612 B2 | 1/2011 | Todd et al. |
| 7,890,989 B1 | 2/2011 | Hofrichter et al. |
| 7,899,899 B2 | 2/2011 | Joshi |
| 7,904,875 B2 | 3/2011 | Hegyi |
| 7,912,921 B2 | 3/2011 | O'Rourke et al. |
| 7,925,782 B2 | 3/2011 | Sivasubramanian et al. |
| 7,925,713 B1 | 4/2011 | Day et al. |
| 7,930,393 B1 | 4/2011 | Baumback et al. |
| 7,930,402 B2 | 4/2011 | Swildens et al. |
| 7,930,427 B2 | 4/2011 | Josefsberg et al. |
| 7,933,988 B2 | 4/2011 | Nasuto et al. |
| 7,937,456 B2 | 4/2011 | McGrath |
| 7,937,477 B1 | 5/2011 | Day et al. |
| 7,945,693 B2 | 5/2011 | Farber et al. |
| 7,949,779 B2 | 5/2011 | Farber et al. |
| 7,949,785 B2 | 5/2011 | Alkhatib et al. |
| 7,958,222 B1 | 5/2011 | Pruitt et al. |
| 7,958,258 B2 | 6/2011 | Yeung et al. |
| 7,961,736 B2 | 6/2011 | Ayyagari |
| 7,962,597 B2 | 6/2011 | Richardson et al. |
| 7,966,404 B2 | 6/2011 | Hedin et al. |
| 7,970,816 B2 | 6/2011 | Chess et al. |
| 7,970,940 B1 | 6/2011 | van de Ven et al. |
| 7,979,509 B1 | 6/2011 | Malmskog et al. |
| 7,991,910 B2 | 7/2011 | Richardson et al. |
| 7,996,404 B2 | 8/2011 | Wong et al. |
| 7,996,533 B2 | 8/2011 | Leighton et al. |
| 7,996,535 B2 | 8/2011 | Auerbach |
| 8,000,724 B1 | 8/2011 | Rayburn et al. |
| 8,001,187 B2 | 8/2011 | Stochosky |
| 8,010,705 B1 | 8/2011 | Sebastian et al. |
| 8,010,707 B2 | 8/2011 | Elzur et al. |
| 8,019,869 B2 | 8/2011 | Kriegsman |
| 8,024,441 B2 | 9/2011 | Kommula et al. |
| 8,028,090 B2 | 9/2011 | Richardson et al. |
| 8,041,773 B2 | 9/2011 | Abu-Ghazaleh et al. |
| 8,041,809 B2 | 10/2011 | Sundaram et al. |
| 8,041,818 B2 | 10/2011 | Gupta et al. |
| 8,042,054 B2 | 10/2011 | White et al. |
| 8,051,166 B1 | 10/2011 | Baumback et al. |
| 8,065,275 B2 | 11/2011 | Eriksen et al. |
| 8,069,231 B2 | 11/2011 | Schran et al. |
| 8,073,940 B1 | 11/2011 | Richardson et al. |
| 8,079,087 B1 | 12/2011 | Spies et al. |
| 8,082,348 B1 | 12/2011 | Averbuj et al. |
| 8,099,487 B1 | 1/2012 | Smirnov et al. |
| 8,108,623 B2 | 1/2012 | Krishnaprasad et al. |
| 8,117,306 B1 | 1/2012 | Baumback et al. |
| 8,122,098 B1 | 2/2012 | Richardson et al. |
| 8,122,124 B1 | 2/2012 | Baumback et al. |
| 8,132,242 B1 | 2/2012 | Wu |
| 8,135,820 B2 | 3/2012 | Richardson et al. |
| 8,155,126 B1 | 3/2012 | Mao et al. |
| 8,156,199 B1 | 4/2012 | Hoche-Mong et al. |
| 8,156,243 B2 | 4/2012 | Richardson et al. |
| 8,161,184 B2 | 4/2012 | Sekar et al. |
| 8,165,915 B1 | 4/2012 | Lucash |
| 8,175,863 B1 | 4/2012 | Ostermeyer et al. |
| 8,180,720 B1 | 5/2012 | Kovacs et al. |
| 8,190,682 B2 | 5/2012 | Paterson-Jones et al. |
| 8,195,605 B2 | 5/2012 | Chellappa et al. |
| 8,195,837 B2 | 6/2012 | McCarthy et al. |
| 8,209,695 B1 | 6/2012 | Pruyne et al. |
| 8,224,971 B1 | 6/2012 | Miller et al. |
| 8,218,965 B1 | 7/2012 | Uhlhorn et al. |
| 8,219,647 B2 | 7/2012 | Harvell et al. |
| 8,224,942 B1 | 7/2012 | Presotto et al. |
| 8,224,986 B1 | 7/2012 | Liskov et al. |
| 8,224,994 B1 | 7/2012 | Schneider |
| 8,234,403 B2 | 7/2012 | Richardson et al. |
| 8,239,530 B2 | 7/2012 | Sundaram et al. |
| 8,250,135 B2 | 8/2012 | Driesen et al. |
| 8,250,211 B2 | 8/2012 | Swildens et al. |
| 8,250,219 B2 | 8/2012 | Raciborski et al. |
| 8,260,914 B1 | 8/2012 | Ranjan |
| 8,261,062 B2 | 9/2012 | Aura et al. |
| 8,266,288 B2 | 9/2012 | Banerjee et al. |
| 8,266,327 B2 | 9/2012 | Kumar et al. |
| 8,271,471 B1 | 9/2012 | Kamvar et al. |
| 8,280,998 B2 | 9/2012 | Joshi |
| 8,281,035 B2 | 10/2012 | Farber et al. |
| 8,286,176 B1 | 10/2012 | Baumback et al. |
| 8,291,046 B2 | 10/2012 | Farber et al. |
| 8,291,117 B1 | 10/2012 | Eggleston et al. |
| 8,296,375 B1 | 10/2012 | Katzer et al. |
| 8,296,393 B2 | 10/2012 | Alexander et al. |
| 8,296,429 B2 | 10/2012 | Baumback et al. |
| 8,296,786 B2 | 10/2012 | Faust et al. |
| 8,301,600 B1 | 10/2012 | Helmick et al. |
| 8,301,645 B1 | 10/2012 | Crook |
| 8,316,124 B1 | 10/2012 | Baumback et al. |
| 8,321,568 B2 | 11/2012 | Sivasubramanian et al. |
| 8,321,588 B2 | 11/2012 | Richardson et al. |
| 8,331,370 B2 | 11/2012 | Hamilton et al. |
| 8,341,745 B1 | 12/2012 | Chat et al. |
| 8,356,074 B1 | 1/2013 | Ehrlich et al. |
| 8,380,831 B2 | 1/2013 | Barber |
| 8,380,851 B2 | 2/2013 | McCarthy et al. |
| 8,392,928 B1 | 2/2013 | Forys et al. |
| 8,396,908 B2 | 3/2013 | Moore et al. |
| 8,402,137 B2 | 3/2013 | Sivasuramanian et al. |
| 8,423,408 B1 | 3/2013 | Barnes et al. |
| 8,423,662 B1 | 4/2013 | Weihl et al. |
| 8,423,667 B2 | 4/2013 | Richardson et al. |
| 8,433,749 B2 | 4/2013 | Wee et al. |
| 8,443,167 B1 | 4/2013 | Fallone et al. |
| 8,447,831 B1 | 5/2013 | Sivasubramanian et al. |
| 8,447,854 B1 | 5/2013 | Jasinskyj |
| 8,447,876 B2 | 5/2013 | Verma et al. |
| 8,452,745 B2 | 5/2013 | Ramakrishna |
| 8,452,870 B2 | 5/2013 | Baumback et al. |
| 8,452,874 B2 | 5/2013 | MacCarthaigh et al. |
| 8,463,877 B1 | 5/2013 | Richardson |
| 8,458,360 B2 | 6/2013 | Richardson et al. |
| 8,468,222 B2 | 6/2013 | Sakata et al. |
| 8,468,245 B2 | 6/2013 | Farber et al. |
| 8,473,613 B2 | 6/2013 | Farber et al. |
| 8,478,903 B2 | 6/2013 | Farber et al. |
| 8,478,883 B2 | 7/2013 | Day et al. |
| 8,489,737 B2 | 7/2013 | Baumback et al. |
| 8,504,721 B2 | 7/2013 | Hsu et al. |
| 8,504,775 B2 | 8/2013 | Plamondon |
| 8,510,428 B2 | 8/2013 | Joshi |
| 8,510,807 B1 | 8/2013 | Elazary et al. |
| 8,516,082 B2 | 8/2013 | Cadwell et al. |
| 8,521,851 B1 | 8/2013 | Richardson et al. |
| 8,521,876 B2 | 8/2013 | Goodman et al. |
| 8,521,880 B1 | 8/2013 | Richardson et al. |
| 8,521,885 B1 | 8/2013 | Richardson et al. |
| 8,521,908 B2 | 8/2013 | Holmes et al. |

(56) References Cited

U.S. PATENT DOCUMENTS

| | | |
|---|---|---|
| 8,526,405 B2 | 8/2013 | Curtis et al. |
| 8,527,639 B1 | 9/2013 | Liskov et al. |
| 8,527,645 B1 | 9/2013 | Proffit et al. |
| 8,527,658 B2 | 9/2013 | Holmes et al. |
| 8,549,646 B2 | 9/2013 | Stavrou et al. |
| 8,572,208 B2 | 10/2013 | Farber et al. |
| 8,572,210 B2 | 10/2013 | Farber et al. |
| 8,577,992 B1 | 10/2013 | Richardson et al. |
| 8,577,963 B2 | 11/2013 | Trahan et al. |
| 8,589,996 B2 | 11/2013 | Ma et al. |
| 8,606,996 B2 | 11/2013 | Richardson et al. |
| 8,606,926 B2 | 12/2013 | Ulevitch |
| 8,612,565 B2 | 12/2013 | Schneider |
| 8,612,588 B1 | 12/2013 | Ehrlich et al. |
| 8,615,549 B2 | 12/2013 | Knowles et al. |
| 8,619,780 B1 | 12/2013 | Brandwine |
| 8,626,950 B1 | 1/2014 | Richardson et al. |
| 8,635,340 B1 | 1/2014 | Schneider |
| 8,639,817 B2 | 1/2014 | Sivasubramanian et al. |
| 8,645,539 B2 | 1/2014 | McCarthy et al. |
| 8,645,700 B2 | 2/2014 | Smith et al. |
| 8,667,127 B2 | 2/2014 | Bettis et al. |
| 8,676,918 B2 | 3/2014 | Richardson et al. |
| 8,683,023 B1 | 3/2014 | Brandwine et al. |
| 8,683,076 B2 | 3/2014 | Farber et al. |
| 8,688,837 B1 | 3/2014 | Richardson et al. |
| 8,694,642 B2 | 4/2014 | Dempsky et al. |
| 8,712,950 B2 | 4/2014 | Smith et al. |
| 8,732,309 B1 | 4/2014 | Richardson et al. |
| 8,738,766 B1 | 5/2014 | Kazerani et al. |
| 8,745,177 B1 | 5/2014 | Kazerani et al. |
| 8,756,322 B1 | 6/2014 | Lynch |
| 8,756,325 B2 | 6/2014 | Sivasubramanian et al. |
| 8,756,341 B1 | 6/2014 | Richardson et al. |
| 8,762,526 B2 | 6/2014 | Baumback et al. |
| 8,775,553 B2 | 6/2014 | Cansino et al. |
| 8,782,207 B2 | 7/2014 | Qiu et al. |
| 8,782,236 B1 | 7/2014 | Marshall et al. |
| 8,782,279 B2 | 7/2014 | Eggleston et al. |
| 8,788,671 B2 | 7/2014 | Richardson et al. |
| 8,812,727 B1 | 7/2014 | Sorenson, III et al. |
| 8,819,187 B1 | 8/2014 | Hofmann |
| 8,819,283 B2 | 8/2014 | Richardson et al. |
| 8,826,032 B1 | 8/2014 | Yahalom et al. |
| 8,843,625 B2 | 9/2014 | Baumback et al. |
| 8,902,897 B2 | 9/2014 | Hamilton et al. |
| 8,885,584 B2 | 11/2014 | Praveenkumar et al. |
| 8,904,009 B1 | 12/2014 | Marshall et al. |
| 8,914,514 B1 | 12/2014 | Jenkins et al. |
| 8,914,626 B1 | 12/2014 | Adogla et al. |
| 8,914,797 B2 | 12/2014 | Osogami et al. |
| 8,914,814 B1 | 12/2014 | Middleton et al. |
| 8,924,466 B2 | 12/2014 | Seed et al. |
| 8,924,528 B1 | 12/2014 | Richardson et al. |
| 8,930,513 B1 | 1/2015 | Richardson et al. |
| 8,930,544 B2 | 1/2015 | Richardson et al. |
| 8,935,744 B2 | 1/2015 | Osterweil et al. |
| 8,938,526 B1 | 1/2015 | Richardson et al. |
| 8,949,161 B2 | 1/2015 | Borst et al. |
| 8,949,459 B1 | 2/2015 | Scholl |
| 8,966,318 B1 | 2/2015 | Shah |
| 8,971,328 B2 | 2/2015 | Judge et al. |
| 8,972,580 B2 | 3/2015 | Fleischman et al. |
| 8,976,711 B2 | 3/2015 | Li et al. |
| 9,003,035 B1 | 3/2015 | Richardson et al. |
| 9,003,040 B2 | 4/2015 | MacCarthaigh et al. |
| 9,009,286 B2 | 4/2015 | Sivasubramanian et al. |
| 9,009,334 B1 | 4/2015 | Jenkins et al. |
| 9,021,127 B2 | 4/2015 | Richardson et al. |
| 9,021,128 B2 | 4/2015 | Sivasubramanian et al. |
| 9,021,129 B2 | 4/2015 | Richardson et al. |
| 9,026,616 B2 | 4/2015 | Sivasubramanian et al. |
| 9,037,975 B1 | 5/2015 | Taylor et al. |
| 9,071,502 B2 | 5/2015 | Baumback et al. |
| 9,075,777 B1 | 6/2015 | Pope et al. |
| 9,075,893 B1 | 7/2015 | Jenkins |
| 9,083,675 B2 | 7/2015 | Richardson et al. |
| 9,083,743 B1 | 7/2015 | Patel et al. |
| 9,088,460 B2 | 7/2015 | Baumback et al. |
| 9,092,141 B2 | 7/2015 | Hayashi |
| 9,106,701 B2 | 7/2015 | Richardson et al. |
| 9,116,803 B1 | 8/2015 | Agrawal et al. |
| 9,118,543 B2 | 8/2015 | Baumback et al. |
| 9,118,680 B1 | 8/2015 | Dunlap et al. |
| 9,130,756 B2 | 8/2015 | Richardson et al. |
| 9,130,977 B2 | 9/2015 | Zisapel et al. |
| 9,137,210 B1 | 9/2015 | Joglekar et al. |
| 9,137,301 B1 | 9/2015 | Dunlap et al. |
| 9,137,302 B1 | 9/2015 | Makhijani et al. |
| 9,154,551 B1 | 9/2015 | Watson |
| 9,160,641 B2 | 10/2015 | Baumback et al. |
| 9,160,703 B2 | 10/2015 | Richardson et al. |
| 9,172,674 B1 | 10/2015 | Patel et al. |
| 9,176,894 B2 | 10/2015 | Marshall et al. |
| 9,185,012 B2 | 11/2015 | Richardson et al. |
| 9,191,338 B2 | 11/2015 | Richardson et al. |
| 9,191,393 B2 | 11/2015 | Tovar |
| 9,191,458 B2 | 11/2015 | Richardson et al. |
| 9,195,996 B1 | 11/2015 | Walsh et al. |
| 9,208,097 B2 | 11/2015 | Richardson et al. |
| 9,210,099 B2 | 12/2015 | Baumback et al. |
| 9,210,235 B2 | 12/2015 | Sivasubramanian et al. |
| 9,219,686 B2 | 12/2015 | Hilt et al. |
| 9,237,087 B1 | 1/2016 | Risbood et al. |
| 9,237,114 B2 | 1/2016 | Richardson et al. |
| 9,240,954 B1 | 1/2016 | Ellsworth et al. |
| 9,246,776 B2 | 1/2016 | Ellsworth et al. |
| 9,253,065 B2 | 1/2016 | Richardson et al. |
| 9,251,112 B2 | 2/2016 | Richardson et al. |
| 9,276,812 B1 | 2/2016 | Nagargadde et al. |
| 9,282,032 B2 | 3/2016 | Judge et al. |
| 9,294,391 B1 | 3/2016 | Mostert |
| 9,300,535 B2 | 3/2016 | Popli et al. |
| 9,323,577 B2 | 3/2016 | Marr et al. |
| 9,332,078 B2 | 4/2016 | Sivasubramanian et al. |
| 9,367,929 B2 | 5/2016 | Bettis et al. |
| 9,386,038 B2 | 6/2016 | Martini |
| 9,391,949 B1 | 7/2016 | Richardson et al. |
| 9,407,676 B2 | 7/2016 | Archer et al. |
| 9,407,539 B1 | 8/2016 | Dickinson et al. |
| 9,407,681 B1 | 8/2016 | Richardson et al. |
| 9,407,699 B2 | 8/2016 | Sivasubramanian et al. |
| 9,444,718 B2 | 8/2016 | Khakpour et al. |
| 9,444,759 B2 | 9/2016 | Richardson et al. |
| 9,479,476 B2 | 9/2016 | Richardson et al. |
| 9,491,073 B2 | 10/2016 | Baumback et al. |
| 9,495,338 B1 | 11/2016 | Hollis et al. |
| 9,497,259 B1 | 11/2016 | Richardson et al. |
| 9,515,949 B2 | 11/2016 | Richardson et al. |
| 9,525,659 B1 | 12/2016 | Sonkin et al. |
| 9,544,388 B1 | 1/2017 | Li et al. |
| 9,544,394 B2 | 1/2017 | Richardson et al. |
| 9,571,389 B2 | 1/2017 | Richardson et al. |
| 9,584,328 B1 | 2/2017 | Graham-cumming |
| 9,590,946 B2 | 2/2017 | Richardson et al. |
| 9,608,957 B2 | 3/2017 | Sivasubramanian et al. |
| 9,621,660 B2 | 3/2017 | Sivasubramanian et al. |
| 9,628,403 B2 | 4/2017 | Baumback et al. |
| 9,628,509 B2 | 4/2017 | Holloway et al. |
| 9,628,554 B2 | 4/2017 | Marshall et al. |
| 9,645,808 B1 | 4/2017 | Turpie |
| 9,660,890 B2 | 5/2017 | Baumback et al. |
| 9,703,713 B2 | 5/2017 | Nadgowda |
| 9,699,108 B1 | 7/2017 | Popli et al. |
| 9,705,922 B2 | 7/2017 | Foxhoven et al. |
| 9,712,325 B2 | 7/2017 | Richardson et al. |
| 9,712,484 B1 | 7/2017 | Richardson et al. |
| 9,734,472 B2 | 7/2017 | Richardson et al. |
| 9,742,795 B1 | 8/2017 | Radlein et al. |
| 9,760,420 B1 | 8/2017 | Letz et al. |
| 9,769,248 B1 | 9/2017 | Krishnan et al. |
| 9,774,619 B1 | 9/2017 | Radlein et al. |
| 9,787,599 B2 | 9/2017 | Richardson et al. |
| 9,787,775 B1 | 10/2017 | Richardson et al. |

(56) References Cited

U.S. PATENT DOCUMENTS

| | | |
|---|---|---|
| 9,794,188 B2 | 10/2017 | Baumback et al. |
| 9,794,216 B2 | 10/2017 | Richardson et al. |
| 9,794,281 B1 | 10/2017 | Radlein et al. |
| 9,800,539 B2 | 10/2017 | Richardson et al. |
| 9,811,451 B1 | 10/2017 | Arguelles et al. |
| 9,819,567 B1 | 11/2017 | Uppal et al. |
| 9,825,831 B2 | 11/2017 | Baumback et al. |
| 9,832,141 B1 | 11/2017 | Raftery |
| 9,871,794 B2 | 1/2018 | Joffe et al. |
| 9,887,914 B2 | 1/2018 | Bergman |
| 9,887,915 B2 | 2/2018 | Richardson et al. |
| 9,887,931 B1 | 2/2018 | Uppal et al. |
| 9,887,932 B1 | 2/2018 | Uppal et al. |
| 9,888,089 B2 | 2/2018 | Sivasubramanian et al. |
| 9,893,957 B2 | 2/2018 | Ellsworth et al. |
| 9,894,168 B2 | 2/2018 | Sivasubramanian et al. |
| 9,900,402 B1 | 2/2018 | Li et al. |
| 9,912,740 B2 | 2/2018 | Richardson et al. |
| 9,929,959 B2 | 3/2018 | Mostert |
| 9,930,131 B2 | 3/2018 | MacCarthaigh et al. |
| 9,954,934 B2 | 3/2018 | Sivasubramanian et al. |
| 9,985,927 B2 | 4/2018 | Richardson et al. |
| 9,992,086 B1 | 5/2018 | Mizik et al. |
| 9,992,303 B2 | 6/2018 | Richardson et al. |
| 9,996,501 B1 | 6/2018 | Nelson et al. |
| 9,996,572 B2 | 6/2018 | Calder et al. |
| 10,015,237 B2 | 6/2018 | Richardson et al. |
| 10,015,241 B2 | 7/2018 | Marr et al. |
| 10,027,582 B2 | 7/2018 | Richardson et al. |
| 10,027,739 B1 | 7/2018 | Krishnan et al. |
| 10,033,627 B1 | 7/2018 | Howard et al. |
| 10,033,691 B1 | 7/2018 | Mizik et al. |
| 10,033,699 B2 | 7/2018 | Sullivan et al. |
| 10,049,051 B1 | 7/2018 | Baldwin |
| 10,162,753 B2 | 7/2018 | Marshall et al. |
| 10,063,459 B2 | 8/2018 | Judge et al. |
| 10,075,551 B1 | 8/2018 | Baldwin et al. |
| 10,079,742 B1 | 9/2018 | Richardson et al. |
| 10,091,096 B1 | 9/2018 | Howard et al. |
| 10,097,398 B1 | 10/2018 | Richardson et al. |
| 10,097,448 B1 | 10/2018 | Howard et al. |
| 10,097,566 B1 | 10/2018 | Radlein et al. |
| 10,104,009 B2 | 10/2018 | Baumback et al. |
| 10,110,694 B1 | 10/2018 | Watson et al. |
| 10,116,584 B2 | 10/2018 | Richardson et al. |
| 10,135,620 B2 | 10/2018 | Richardson et al. |
| 10,148,542 B2 | 11/2018 | Baumback et al. |
| 10,021,179 B1 | 12/2018 | Velummylum et al. |
| 10,157,135 B2 | 12/2018 | Richardson et al. |
| 10,158,729 B2 | 12/2018 | Sivasubramanian et al. |
| 10,180,993 B2 | 1/2019 | Raftery |
| 10,200,402 B2 | 1/2019 | Radlein et al. |
| 10,200,492 B2 | 2/2019 | MacCarthaigh et al. |
| 10,205,644 B2 | 2/2019 | Baumback et al. |
| 10,205,698 B1 | 2/2019 | Petersen et al. |
| 10,218,584 B2 | 2/2019 | Ellsworth et al. |
| 10,225,322 B2 | 2/2019 | Richardson et al. |
| 10,225,326 B1 | 3/2019 | Puchala et al. |
| 10,225,362 B2 | 3/2019 | Watson |
| 10,225,365 B1 | 3/2019 | Hotchkies et al. |
| 10,230,819 B2 | 3/2019 | Richardson et al. |
| 10,257,307 B1 | 3/2019 | Baldwin |
| 10,264,062 B2 | 4/2019 | Richardson et al. |
| 10,270,878 B1 | 4/2019 | Uppal et al. |
| 10,284,446 B2 | 4/2019 | Baumback et al. |
| 10,305,797 B2 | 5/2019 | Richardson et al. |
| 10,311,371 B1 | 5/2019 | Hotchkies et al. |
| 10,348,639 B2 | 7/2019 | Puchala et al. |
| 10,372,499 B1 | 8/2019 | Radhakrishnan et al. |
| 10,374,955 B2 | 8/2019 | Mostert |
| 10,410,085 B2 | 9/2019 | Bettis et al. |
| 10,447,648 B2 | 10/2019 | Bliss et al. |
| 10,462,025 B2 | 10/2019 | Baumback et al. |
| 10,467,042 B1 | 11/2019 | Mercier et al. |
| 10,469,355 B2 | 11/2019 | Uppal et al. |
| 10,469,513 B2 | 11/2019 | Uppal et al. |
| 10,491,534 B2 | 11/2019 | Richardson et al. |
| 10,505,961 B2 | 12/2019 | Uppal et al. |
| 10,506,029 B2 | 12/2019 | Hollis et al. |
| 10,511,567 B2 | 12/2019 | Richardson et al. |
| 10,516,590 B2 | 12/2019 | Mizik et al. |
| 10,521,348 B2 | 12/2019 | Marshall et al. |
| 10,523,783 B2 | 12/2019 | Richardson et al. |
| 10,530,874 B2 | 1/2020 | Sivasubramanian et al. |
| 10,542,079 B2 | 1/2020 | Marr et al. |
| 10,554,748 B2 | 2/2020 | Sivasubramanian et al. |
| 10,574,787 B2 | 2/2020 | Richardson et al. |
| 10,601,767 B2 | 3/2020 | Richardson et al. |
| 10,616,250 B2 | 4/2020 | Uppal et al. |
| 10,623,408 B1 | 4/2020 | Marshall et al. |
| 10,630,771 B1 | 4/2020 | Garza et al. |
| 10,645,149 B2 | 5/2020 | Sivasubramanian et al. |
| 10,666,756 B2 | 5/2020 | Baldwin et al. |
| 10,691,752 B2 | 6/2020 | Raftery |
| 10,742,550 B2 | 8/2020 | Richardson et al. |
| 10,771,552 B2 | 9/2020 | Sivasubramanian et al. |
| 10,778,554 B2 | 9/2020 | Richardson et al. |
| 10,783,077 B2 | 9/2020 | Marshall et al. |
| 10,785,037 B2 | 9/2020 | Richardson et al. |
| 10,797,995 B2 | 10/2020 | Richardson et al. |
| 10,812,358 B2 | 10/2020 | Navaneetha et al. |
| 10,831,549 B1 | 11/2020 | Radhakrishnan et al. |
| 10,931,738 B2 | 2/2021 | Radhakrishnan et al. |
| 10,938,884 B1 | 3/2021 | Baldwin et al. |
| 10,958,501 B1 | 3/2021 | Richardson et al. |
| 11,108,729 B2 | 3/2021 | Richardson et al. |
| 11,025,747 B1 | 6/2021 | Keogh |
| 11,115,500 B2 | 9/2021 | Richardson et al. |
| 11,134,134 B2 | 9/2021 | Uppal et al. |
| 2001/0000811 A1 | 5/2001 | May et al. |
| 2001/0025305 A1 | 9/2001 | Yoshiasa et al. |
| 2001/0027479 A1 | 10/2001 | Delaney et al. |
| 2001/0032133 A1 | 10/2001 | Moran |
| 2001/0034704 A1 | 10/2001 | Farhat et al. |
| 2001/0049741 A1 | 12/2001 | Skene et al. |
| 2001/0052016 A1 | 12/2001 | Skene et al. |
| 2001/0056416 A1 | 12/2001 | Garcia-Luna-Aceves |
| 2001/0056500 A1 | 12/2001 | Farber et al. |
| 2002/0002613 A1 | 1/2002 | Freeman et al. |
| 2002/0004816 A1 | 1/2002 | Vange et al. |
| 2002/0004846 A1 | 1/2002 | Garcia-Luna-Aceves et al. |
| 2002/0007404 A1 | 1/2002 | Vange et al. |
| 2002/0007413 A1 | 1/2002 | Garcia-Luna-Aceves et al. |
| 2002/0009079 A1 | 1/2002 | Jungck et al. |
| 2002/0010783 A1 | 1/2002 | Primak et al. |
| 2002/0010798 A1 | 1/2002 | Ben-Shaul et al. |
| 2002/0013823 A1 | 1/2002 | Eubanks |
| 2002/0016831 A1 | 2/2002 | Peled et al. |
| 2002/0035624 A1 | 3/2002 | Kim |
| 2002/0048269 A1 | 4/2002 | Hong et al. |
| 2002/0049608 A1 | 4/2002 | Hartsell et al. |
| 2002/0049842 A1 | 4/2002 | Huetsch et al. |
| 2002/0049857 A1 | 4/2002 | Farber et al. |
| 2002/0052942 A1 | 5/2002 | Swildens et al. |
| 2002/0062372 A1 | 5/2002 | Hong et al. |
| 2002/0065910 A1 | 5/2002 | Dutta |
| 2002/0068554 A1 | 6/2002 | Dusse |
| 2002/0069420 A1 | 6/2002 | Russell et al. |
| 2002/0078233 A1 | 6/2002 | Biliris et al. |
| 2002/0082858 A1 | 6/2002 | Heddaya et al. |
| 2002/0083118 A1 | 6/2002 | Sim |
| 2002/0083148 A1 | 6/2002 | Shaw et al. |
| 2002/0083175 A1 | 6/2002 | Afek |
| 2002/0083178 A1 | 6/2002 | Brothers |
| 2002/0083198 A1 | 6/2002 | Kim et al. |
| 2002/0087374 A1 | 7/2002 | Boubez et al. |
| 2002/0087726 A1 | 7/2002 | Macpherson et al. |
| 2002/0087797 A1 | 7/2002 | Adrangi |
| 2002/0091786 A1 | 7/2002 | Yamaguchi et al. |
| 2002/0091801 A1 | 7/2002 | Lewin et al. |
| 2002/0092026 A1 | 7/2002 | Janniello et al. |
| 2002/0099616 A1 | 7/2002 | Sweldens |
| 2002/0099850 A1 | 7/2002 | Farber et al. |
| 2002/0101836 A1 | 8/2002 | Dorenbosch |

(56) References Cited

U.S. PATENT DOCUMENTS

| | | |
|---|---|---|
| 2002/0103820 A1 | 8/2002 | Cartmell et al. |
| 2002/0103972 A1 | 8/2002 | Satran et al. |
| 2002/0107944 A1 | 8/2002 | Bai et al. |
| 2002/0112049 A1 | 8/2002 | Elnozahy et al. |
| 2002/0112123 A1 | 8/2002 | Becker et al. |
| 2002/0116481 A1 | 8/2002 | Lee |
| 2002/0116491 A1 | 8/2002 | Boyd et al. |
| 2002/0116582 A1 | 8/2002 | Copeland et al. |
| 2002/0120666 A1 | 8/2002 | Landsman et al. |
| 2002/0120782 A1 | 8/2002 | Dillon et al. |
| 2002/0124047 A1 | 9/2002 | Gartner et al. |
| 2002/0124098 A1 | 9/2002 | Shaw |
| 2002/0129123 A1 | 9/2002 | Johnson et al. |
| 2002/0131428 A1 | 9/2002 | Pecus et al. |
| 2002/0133601 A1 | 9/2002 | Kennamer et al. |
| 2002/0133741 A1 | 9/2002 | Maeda et al. |
| 2002/0135611 A1 | 9/2002 | Deosaran et al. |
| 2002/0138286 A1 | 9/2002 | Engstrom |
| 2002/0138437 A1 | 9/2002 | Lewin et al. |
| 2002/0138443 A1 | 9/2002 | Schran et al. |
| 2002/0138649 A1 | 9/2002 | Cartmell et al. |
| 2002/0138761 A1 | 9/2002 | Kanemaki et al. |
| 2002/0143675 A1 | 10/2002 | Orshan |
| 2002/0143798 A1 | 10/2002 | Lisiecki et al. |
| 2002/0143989 A1 | 10/2002 | Huitema et al. |
| 2002/0145993 A1 | 10/2002 | Chowdhury et al. |
| 2002/0147770 A1 | 10/2002 | Tang |
| 2002/0147774 A1 | 10/2002 | Lisiecki et al. |
| 2002/0150094 A1 | 10/2002 | Cheng et al. |
| 2002/0150276 A1 | 10/2002 | Chang |
| 2002/0152326 A1 | 10/2002 | Orshan |
| 2002/0154157 A1 | 10/2002 | Sherr et al. |
| 2002/0156884 A1 | 10/2002 | Bertram et al. |
| 2002/0156911 A1 | 10/2002 | Croman et al. |
| 2002/0161745 A1 | 10/2002 | Call |
| 2002/0161767 A1 | 10/2002 | Shapiro et al. |
| 2002/0163882 A1 | 11/2002 | Bornstein et al. |
| 2002/0165912 A1 | 11/2002 | Wenocur et al. |
| 2002/0169890 A1 | 11/2002 | Beaumont et al. |
| 2002/0184368 A1 | 12/2002 | Wang |
| 2002/0187935 A1 | 12/2002 | Redmond et al. |
| 2002/0188722 A1 | 12/2002 | Banerjee et al. |
| 2002/0194324 A1 | 12/2002 | Guha |
| 2002/0194382 A1 | 12/2002 | Kausik et al. |
| 2002/0198953 A1 | 12/2002 | O'Rourke et al. |
| 2003/0002484 A1 | 1/2003 | Freedman |
| 2003/0004998 A1 | 1/2003 | Datta |
| 2003/0005036 A1 | 1/2003 | Mitzenmacher |
| 2003/0005111 A1 | 1/2003 | Allan |
| 2003/0007482 A1 | 1/2003 | Khello et al. |
| 2003/0009488 A1 | 1/2003 | Hart, III |
| 2003/0009591 A1 | 1/2003 | Hayball et al. |
| 2003/0002641 A1 | 2/2003 | Lumsden |
| 2003/0028642 A1 | 2/2003 | Agarwal et al. |
| 2003/0033283 A1 | 2/2003 | Evans et al. |
| 2003/0037108 A1 | 2/2003 | Peiffer et al. |
| 2003/0037139 A1 | 2/2003 | Shteyn |
| 2003/0037284 A1 | 2/2003 | Srinivasan et al. |
| 2003/0041094 A1 | 2/2003 | Lara et al. |
| 2003/0046343 A1 | 3/2003 | Krishnamurthy et al. |
| 2003/0065739 A1 | 4/2003 | Shnier |
| 2003/0070096 A1 | 4/2003 | Pazi et al. |
| 2003/0074401 A1 | 4/2003 | Connell et al. |
| 2003/0074471 A1 | 4/2003 | Anderson et al. |
| 2003/0074472 A1 | 4/2003 | Lucco et al. |
| 2003/0079027 A1 | 4/2003 | Slocombe et al. |
| 2003/0093523 A1 | 5/2003 | Cranor et al. |
| 2003/0097564 A1 | 5/2003 | Tewari et al. |
| 2003/0099202 A1 | 5/2003 | Lear et al. |
| 2003/0099237 A1 | 5/2003 | Mitra et al. |
| 2003/0101278 A1 | 5/2003 | Garcia-Luna-Aceves et al. |
| 2003/0105829 A1 | 6/2003 | Hayward |
| 2003/0105857 A1 | 6/2003 | Kamen et al. |
| 2003/0112792 A1 | 6/2003 | Cranor et al. |
| 2003/0120741 A1 | 6/2003 | Wu et al. |
| 2003/0126387 A1 | 7/2003 | Watanabe |
| 2003/0133554 A1 | 7/2003 | Nykanen et al. |
| 2003/0135467 A1 | 7/2003 | Okamoto |
| 2003/0135509 A1 | 7/2003 | Davis et al. |
| 2003/0140087 A1 | 7/2003 | Lincoln et al. |
| 2003/0145038 A1 | 7/2003 | Bin Tariq et al. |
| 2003/0145066 A1 | 7/2003 | Okada et al. |
| 2003/0149581 A1 | 8/2003 | Chaudhri et al. |
| 2003/0154239 A1 | 8/2003 | Davis et al. |
| 2003/0154284 A1 | 8/2003 | Bernardin et al. |
| 2003/0163722 A1 | 8/2003 | Anderson, IV |
| 2003/0172145 A1 | 9/2003 | Nguyen |
| 2003/0172183 A1 | 9/2003 | Anderson, IV et al. |
| 2003/0172291 A1 | 9/2003 | Judge et al. |
| 2003/0174648 A1 | 9/2003 | Wang et al. |
| 2003/0177321 A1 | 9/2003 | Watanabe |
| 2003/0182305 A1 | 9/2003 | Balva et al. |
| 2003/0182413 A1 | 9/2003 | Allen et al. |
| 2003/0182447 A1 | 9/2003 | Schilling |
| 2003/0187935 A1 | 10/2003 | Agarwalla et al. |
| 2003/0187970 A1 | 10/2003 | Chase et al. |
| 2003/0191822 A1 | 10/2003 | Leighton et al. |
| 2003/0200394 A1 | 10/2003 | Ashmore et al. |
| 2003/0204602 A1 | 10/2003 | Hudson et al. |
| 2003/0206520 A1 | 11/2003 | Wu et al. |
| 2003/0221000 A1 | 11/2003 | Cherkasova et al. |
| 2003/0225893 A1 | 12/2003 | Roese et al. |
| 2003/0229682 A1 | 12/2003 | Day |
| 2003/0233423 A1 | 12/2003 | Dilley et al. |
| 2003/0233445 A1 | 12/2003 | Levy et al. |
| 2003/0233455 A1 | 12/2003 | Leber et al. |
| 2003/0236700 A1 | 12/2003 | Arning et al. |
| 2003/0236779 A1 | 12/2003 | Choi et al. |
| 2004/0003032 A1 | 1/2004 | Ma et al. |
| 2004/0010562 A1 | 1/2004 | Itonaga |
| 2004/0010563 A1 | 1/2004 | Forte et al. |
| 2004/0010588 A1 | 1/2004 | Slater et al. |
| 2004/0010601 A1 | 1/2004 | Afergan et al. |
| 2004/0010621 A1 | 1/2004 | Afergan et al. |
| 2004/0010683 A1 | 1/2004 | Huitema |
| 2004/0015584 A1 | 1/2004 | Cartmell et al. |
| 2004/0019518 A1 | 1/2004 | Abraham et al. |
| 2004/0019781 A1 | 1/2004 | Chari et al. |
| 2004/0024841 A1 | 1/2004 | Becker et al. |
| 2004/0030620 A1 | 2/2004 | Benjamin et al. |
| 2004/0032278 A1 | 2/2004 | Orii et al. |
| 2004/0034744 A1 | 2/2004 | Karlsson et al. |
| 2004/0039798 A1 | 2/2004 | Hotz et al. |
| 2004/0044731 A1 | 2/2004 | Chen et al. |
| 2004/0044791 A1 | 3/2004 | Pouzzner |
| 2004/0054757 A1 | 3/2004 | Ueda et al. |
| 2004/0059805 A1 | 3/2004 | Dinker et al. |
| 2004/0064335 A1 | 4/2004 | Yang |
| 2004/0064501 A1 | 4/2004 | Jan et al. |
| 2004/0068542 A1 | 4/2004 | Lalonde et al. |
| 2004/0073596 A1 | 4/2004 | Kloninger et al. |
| 2004/0073707 A1 | 4/2004 | Dillon |
| 2004/0073867 A1 | 4/2004 | Kausik et al. |
| 2004/0078468 A1 | 4/2004 | Hedin et al. |
| 2004/0078487 A1 | 4/2004 | Cernohous et al. |
| 2004/0083283 A1 | 4/2004 | Sundaram et al. |
| 2004/0083307 A1 | 4/2004 | Uysal |
| 2004/0105544 A1 | 4/2004 | Haneda et al. |
| 2004/0098478 A1 | 5/2004 | Koetke et al. |
| 2004/0114579 A1 | 6/2004 | Karaoguz et al. |
| 2004/0117309 A1 | 6/2004 | Inoue et al. |
| 2004/0117455 A1 | 6/2004 | Kaminksy et al. |
| 2004/0128344 A1 | 6/2004 | Trossen |
| 2004/0128346 A1 | 7/2004 | Melamed et al. |
| 2004/0148520 A1 | 7/2004 | Talpade et al. |
| 2004/0167981 A1 | 7/2004 | Douglas et al. |
| 2004/0167982 A1 | 8/2004 | Cohen et al. |
| 2004/0170379 A1 | 8/2004 | Yao et al. |
| 2004/0172466 A1 | 9/2004 | Douglas et al. |
| 2004/0184456 A1 | 9/2004 | Binding et al. |
| 2004/0194085 A1 | 9/2004 | Beaubien et al. |
| 2004/0194102 A1 | 9/2004 | Neerdaels |
| 2004/0203630 A1 | 10/2004 | Wang |
| 2004/0205149 A1 | 10/2004 | Dillon et al. |

(56) References Cited

U.S. PATENT DOCUMENTS

| | | |
|---|---|---|
| 2004/0205162 A1 | 10/2004 | Parikh |
| 2004/0205374 A1 | 10/2004 | Poletto et al. |
| 2004/0215823 A1 | 10/2004 | Kleinfelter et al. |
| 2004/0221019 A1 | 10/2004 | Swildens et al. |
| 2004/0221034 A1 | 11/2004 | Kausik et al. |
| 2004/0246948 A1 | 11/2004 | Lee et al. |
| 2004/0249939 A1 | 12/2004 | Amini et al. |
| 2004/0249971 A1 | 12/2004 | Klinker |
| 2004/0249975 A1 | 12/2004 | Tuck et al. |
| 2004/0250119 A1 | 12/2004 | Shelest et al. |
| 2004/0254921 A1 | 12/2004 | Cohen et al. |
| 2004/0260769 A1 | 12/2004 | Yamamoto |
| 2004/0267906 A1 | 12/2004 | Truly |
| 2004/0267907 A1 | 12/2004 | Gustafsson |
| 2005/0004945 A1 | 1/2005 | Cossins et al. |
| 2005/0010653 A1 | 1/2005 | McCanne |
| 2005/0015471 A1 | 1/2005 | Zhang et al. |
| 2005/0021706 A1 | 1/2005 | Maggi et al. |
| 2005/0021862 A1 | 1/2005 | Schroeder et al. |
| 2005/0027882 A1 | 1/2005 | Sullivan et al. |
| 2005/0038967 A1 | 2/2005 | Umbehocker et al. |
| 2005/0039019 A1 | 2/2005 | Delany |
| 2005/0044270 A1 | 2/2005 | Grove et al. |
| 2005/0076137 A1 | 4/2005 | Tang et al. |
| 2005/0102683 A1 | 4/2005 | Branson et al. |
| 2005/0097445 A1 | 5/2005 | Day et al. |
| 2005/0108169 A1 | 5/2005 | Balasubramanian et al. |
| 2005/0108262 A1 | 5/2005 | Fawcett |
| 2005/0108529 A1 | 5/2005 | Juneau |
| 2005/0114296 A1 | 5/2005 | Farber et al. |
| 2005/0117717 A1 | 5/2005 | Lumsden |
| 2005/0132083 A1 | 6/2005 | Raciborski et al. |
| 2005/0147088 A1 | 6/2005 | Bao et al. |
| 2005/0149529 A1 | 7/2005 | Gutmans |
| 2005/0157712 A1 | 7/2005 | Rangarajan et al. |
| 2005/0160133 A1 | 7/2005 | Greenlee et al. |
| 2005/0163168 A1 | 7/2005 | Sheth et al. |
| 2005/0168782 A1 | 7/2005 | Kobashi et al. |
| 2005/0171959 A1 | 8/2005 | Deforche et al. |
| 2005/0172080 A1 | 8/2005 | Miyauchi |
| 2005/0174989 A1 | 8/2005 | Chen et al. |
| 2005/0181769 A1 | 8/2005 | Kogawa |
| 2005/0188073 A1 | 8/2005 | Nakamichi et al. |
| 2005/0192814 A1 | 8/2005 | Challener et al. |
| 2005/0192008 A1 | 9/2005 | Desai et al. |
| 2005/0198170 A1 | 9/2005 | LeMay et al. |
| 2005/0198200 A1 | 9/2005 | Subramanian et al. |
| 2005/0198303 A1 | 9/2005 | Knauerhase et al. |
| 2005/0198334 A1 | 9/2005 | Farber et al. |
| 2005/0198453 A1 | 9/2005 | Osaki |
| 2005/0198571 A1 | 9/2005 | Kramer et al. |
| 2005/0201302 A1 | 9/2005 | Gaddis et al. |
| 2005/0216483 A1 | 9/2005 | Armstrong et al. |
| 2005/0216569 A1 | 9/2005 | Coppola et al. |
| 2005/0216674 A1 | 9/2005 | Robbin et al. |
| 2005/0223095 A1 | 10/2005 | Volz et al. |
| 2005/0228856 A1 | 10/2005 | Swildens et al. |
| 2005/0229119 A1 | 10/2005 | Torvinen |
| 2005/0232165 A1 | 10/2005 | Brawn et al. |
| 2005/0234864 A1 | 10/2005 | Shapiro |
| 2005/0240574 A1 | 10/2005 | Challenger et al. |
| 2005/0256880 A1 | 10/2005 | Nam Koong et al. |
| 2005/0259645 A1 | 11/2005 | Chen et al. |
| 2005/0259672 A1 | 11/2005 | Eduri |
| 2005/0262248 A1 | 11/2005 | Jennings, III et al. |
| 2005/0266835 A1 | 11/2005 | Agrawal et al. |
| 2005/0267928 A1 | 12/2005 | Anderson et al. |
| 2005/0267937 A1 | 12/2005 | Daniels et al. |
| 2005/0267991 A1 | 12/2005 | Huitema et al. |
| 2005/0267992 A1 | 12/2005 | Huitema et al. |
| 2005/0267993 A1 | 12/2005 | Huitema et al. |
| 2005/0278259 A1 | 12/2005 | Gunaseelan et al. |
| 2005/0283759 A1 | 12/2005 | Peteanu et al. |
| 2005/0283784 A1 | 12/2005 | Suzuki |
| 2005/0286564 A1 | 12/2005 | Hatley et al. |
| 2006/0005014 A1 | 1/2006 | Aura et al. |
| 2006/0013158 A1 | 1/2006 | Ahuja et al. |
| 2006/0020596 A1 | 1/2006 | Liu et al. |
| 2006/0020684 A1 | 1/2006 | Mukherjee et al. |
| 2006/0020714 A1 | 1/2006 | Girouard et al. |
| 2006/0020715 A1 | 1/2006 | Jungck |
| 2006/0020807 A1 | 1/2006 | Aura et al. |
| 2006/0021001 A1 | 1/2006 | Giles et al. |
| 2006/0026067 A1 | 1/2006 | Nicholas et al. |
| 2006/0026154 A1 | 2/2006 | Altinel et al. |
| 2006/0031239 A1 | 2/2006 | Koenig |
| 2006/0031319 A1 | 2/2006 | Nelson et al. |
| 2006/0031503 A1 | 2/2006 | Gilbert |
| 2006/0034494 A1 | 2/2006 | Holloran |
| 2006/0036720 A1 | 2/2006 | Faulk, Jr. |
| 2006/0036966 A1 | 2/2006 | Yevdayev |
| 2006/0037037 A1 | 2/2006 | Miranz |
| 2006/0039352 A1 | 2/2006 | Karstens |
| 2006/0041614 A1 | 2/2006 | Oe |
| 2006/0045005 A1 | 2/2006 | Blackmore et al. |
| 2006/0047787 A1 | 3/2006 | Aggarwal et al. |
| 2006/0047813 A1 | 3/2006 | Aggarwal et al. |
| 2006/0059246 A1 | 3/2006 | Grove |
| 2006/0063534 A1 | 3/2006 | Kokkonen et al. |
| 2006/0064476 A1 | 3/2006 | Decasper et al. |
| 2006/0064500 A1 | 3/2006 | Roth et al. |
| 2006/0074750 A1 | 3/2006 | Clark et al. |
| 2006/0075084 A1 | 4/2006 | Lyon |
| 2006/0075139 A1 | 4/2006 | Jungck |
| 2006/0083165 A1 | 4/2006 | McLane et al. |
| 2006/0085536 A1 | 4/2006 | Meyer et al. |
| 2006/0088026 A1 | 4/2006 | Mazur et al. |
| 2006/0106938 A1 | 4/2006 | Dini et al. |
| 2006/0107036 A1 | 5/2006 | Randle et al. |
| 2006/0112066 A1 | 5/2006 | Hamzy |
| 2006/0112176 A1 | 5/2006 | Liu et al. |
| 2006/0120385 A1 | 5/2006 | Atchison et al. |
| 2006/0129665 A1 | 6/2006 | Toebes et al. |
| 2006/0129766 A1 | 6/2006 | Cassia et al. |
| 2006/0136453 A1 | 6/2006 | Kwan |
| 2006/0143293 A1 | 6/2006 | Freedman |
| 2006/0143442 A1 | 6/2006 | Smith |
| 2006/0146820 A1 | 6/2006 | Friedman et al. |
| 2006/0149529 A1 | 7/2006 | Nguyen et al. |
| 2006/0155823 A1 | 7/2006 | Tran et al. |
| 2006/0155862 A1 | 7/2006 | Kathi et al. |
| 2006/0161541 A1 | 7/2006 | Cencini |
| 2006/0165051 A1 | 7/2006 | Banerjee et al. |
| 2006/0168088 A1 | 7/2006 | Leighton et al. |
| 2006/0173957 A1 | 7/2006 | Robinson |
| 2006/0173855 A1 | 8/2006 | Turner et al. |
| 2006/0179080 A1 | 8/2006 | Meek et al. |
| 2006/0184936 A1 | 8/2006 | Abels et al. |
| 2006/0188097 A1 | 8/2006 | Taniguchi et al. |
| 2006/0190605 A1 | 8/2006 | Franz et al. |
| 2006/0193247 A1 | 8/2006 | Naseh et al. |
| 2006/0195866 A1 | 8/2006 | Thukral |
| 2006/0206568 A1 | 8/2006 | Verma et al. |
| 2006/0206586 A1 | 9/2006 | Ling et al. |
| 2006/0218265 A1 | 9/2006 | Farber et al. |
| 2006/0218304 A1 | 9/2006 | Mukherjee et al. |
| 2006/0221971 A1 | 9/2006 | Andrieux et al. |
| 2006/0224752 A1 | 10/2006 | Parekh et al. |
| 2006/0227740 A1 | 10/2006 | McLaughlin et al. |
| 2006/0227758 A1 | 10/2006 | Rana et al. |
| 2006/0230137 A1 | 10/2006 | Gare et al. |
| 2006/0230265 A1 | 10/2006 | Krishna |
| 2006/0233155 A1 | 10/2006 | Srivastava |
| 2006/0242227 A1 | 10/2006 | Rao |
| 2006/0253546 A1 | 11/2006 | Chang et al. |
| 2006/0253609 A1 | 11/2006 | Andreev et al. |
| 2006/0259581 A1 | 11/2006 | Piersol |
| 2006/0259690 A1 | 11/2006 | Vittal et al. |
| 2006/0259984 A1 | 11/2006 | Juneau |
| 2006/0265497 A1 | 11/2006 | Ohata et al. |
| 2006/0265508 A1 | 11/2006 | Angel et al. |
| 2006/0265516 A1 | 11/2006 | Schilling |
| 2006/0265720 A1 | 11/2006 | Cai et al. |
| 2006/0271641 A1 | 11/2006 | Stavrakos et al. |

(56) References Cited

U.S. PATENT DOCUMENTS

| | | |
|---|---|---|
| 2006/0282522 A1 | 11/2006 | Lewin et al. |
| 2006/0070060 A1 | 12/2006 | Tantawi et al. |
| 2006/0282505 A1 | 12/2006 | Hasha et al. |
| 2006/0288119 A1 | 12/2006 | Kim et al. |
| 2006/0288424 A1 | 12/2006 | Saito |
| 2007/0005689 A1 | 1/2007 | Leighton et al. |
| 2007/0005801 A1 | 1/2007 | Kumar et al. |
| 2007/0005892 A1 | 1/2007 | Mullender et al. |
| 2007/0011267 A1 | 1/2007 | Overton et al. |
| 2007/0014241 A1 | 1/2007 | Banerjee et al. |
| 2007/0021998 A1 | 1/2007 | Laithwaite et al. |
| 2007/0028001 A1 | 1/2007 | Phillips et al. |
| 2007/0038729 A1 | 2/2007 | Sullivan et al. |
| 2007/0038994 A1 | 2/2007 | Davis et al. |
| 2007/0041393 A1 | 2/2007 | Westhead et al. |
| 2007/0043667 A1 | 2/2007 | Qawami et al. |
| 2007/0043859 A1 | 2/2007 | Ruul |
| 2007/0050522 A1 | 2/2007 | Grove et al. |
| 2007/0050703 A1 | 3/2007 | Lebel |
| 2007/0055764 A1 | 3/2007 | Dilley et al. |
| 2007/0055765 A1 | 3/2007 | Lisiecki et al. |
| 2007/0061440 A1 | 3/2007 | Sundaram et al. |
| 2007/0064610 A1 | 3/2007 | Khandani |
| 2007/0076872 A1 | 3/2007 | Juneau |
| 2007/0086429 A1 | 4/2007 | Lawrence et al. |
| 2007/0094361 A1 | 4/2007 | Hoynowski et al. |
| 2007/0101377 A1 | 4/2007 | Six et al. |
| 2007/0101061 A1 | 5/2007 | Baskaran et al. |
| 2007/0118667 A1 | 5/2007 | McCarthy et al. |
| 2007/0118668 A1 | 5/2007 | McCarthy et al. |
| 2007/0124309 A1 | 5/2007 | Takase et al. |
| 2007/0134641 A1 | 5/2007 | Lieu |
| 2007/0156726 A1 | 6/2007 | Levy |
| 2007/0156919 A1 | 7/2007 | Potti et al. |
| 2007/0162331 A1 | 7/2007 | Sullivan |
| 2007/0168336 A1 | 7/2007 | Ransil et al. |
| 2007/0168517 A1 | 7/2007 | Weller |
| 2007/0174426 A1 | 7/2007 | Swildens et al. |
| 2007/0174442 A1 | 7/2007 | Sherman et al. |
| 2007/0174490 A1 | 7/2007 | Choi et al. |
| 2007/0183342 A1 | 7/2007 | Wong et al. |
| 2007/0195800 A1 | 8/2007 | Yang et al. |
| 2007/0198982 A1 | 8/2007 | Bolan et al. |
| 2007/0204107 A1 | 8/2007 | Greenfield et al. |
| 2007/0208737 A1 | 8/2007 | Li et al. |
| 2007/0214232 A1 | 9/2007 | Belimpasakis et al. |
| 2007/0219795 A1 | 9/2007 | Park et al. |
| 2007/0220010 A1 | 9/2007 | Ertugrul |
| 2007/0226294 A1 | 9/2007 | Pruitt et al. |
| 2007/0233705 A1 | 9/2007 | Farber et al. |
| 2007/0233706 A1 | 10/2007 | Farber et al. |
| 2007/0233846 A1 | 10/2007 | Farber et al. |
| 2007/0233884 A1 | 10/2007 | Farber et al. |
| 2007/0233896 A1 | 10/2007 | Hilt et al. |
| 2007/0242824 A1 | 10/2007 | Vishik |
| 2007/0243860 A1 | 10/2007 | Aiello et al. |
| 2007/0244964 A1 | 10/2007 | Challenger et al. |
| 2007/0245022 A1 | 10/2007 | Olliphant et al. |
| 2007/0250467 A1 | 10/2007 | Mesnik et al. |
| 2007/0250468 A1 | 10/2007 | Pieper |
| 2007/0250560 A1 | 10/2007 | Wein et al. |
| 2007/0250601 A1 | 10/2007 | Amlekar et al. |
| 2007/0250611 A1 | 10/2007 | Bhogal et al. |
| 2007/0253377 A1 | 10/2007 | Janneteau et al. |
| 2007/0255843 A1 | 11/2007 | Zubev |
| 2007/0263604 A1 | 11/2007 | Tai |
| 2007/0266113 A1 | 11/2007 | Koopmans et al. |
| 2007/0266311 A1 | 11/2007 | Westphal |
| 2007/0266333 A1 | 11/2007 | Cossey et al. |
| 2007/0270165 A1 | 11/2007 | Poosala |
| 2007/0271375 A1 | 11/2007 | Hwang |
| 2007/0271385 A1 | 11/2007 | Davis et al. |
| 2007/0271560 A1 | 11/2007 | Wahlert et al. |
| 2007/0271608 A1 | 11/2007 | Shimizu et al. |
| 2007/0280197 A1 | 11/2007 | Pearlman et al. |
| 2007/0280229 A1 | 12/2007 | Kenney |
| 2007/0281689 A1 | 12/2007 | Altman et al. |
| 2007/0288588 A1 | 12/2007 | Wein et al. |
| 2007/0291739 A1 | 12/2007 | Sullivan et al. |
| 2007/0294419 A1 | 12/2007 | Ulevitch |
| 2008/0005057 A1 | 1/2008 | Ozzie et al. |
| 2008/0005275 A1 | 1/2008 | Overton et al. |
| 2008/0008089 A1 | 1/2008 | Bornstein et al. |
| 2008/0016233 A1 | 1/2008 | Schneider |
| 2008/0028463 A1 | 1/2008 | Dagon et al. |
| 2008/0222647 A1 | 1/2008 | Taylor et al. |
| 2008/0037536 A1 | 2/2008 | Padmanabhan et al. |
| 2008/0046550 A1 | 2/2008 | Mazur et al. |
| 2008/0046596 A1 | 2/2008 | Afergan et al. |
| 2008/0049615 A1 | 2/2008 | Bugenhagen |
| 2008/0056207 A1 | 2/2008 | Eriksson et al. |
| 2008/0062997 A1 | 3/2008 | Nix |
| 2008/0065724 A1 | 3/2008 | Seed et al. |
| 2008/0065745 A1 | 3/2008 | Leighton et al. |
| 2008/0066072 A1 | 3/2008 | Yurekli et al. |
| 2008/0071859 A1 | 3/2008 | Seed et al. |
| 2008/0071925 A1 | 3/2008 | Leighton et al. |
| 2008/0071987 A1 | 3/2008 | Karn et al. |
| 2008/0072264 A1 | 3/2008 | Crayford |
| 2008/0082551 A1 | 3/2008 | Farber et al. |
| 2008/0082662 A1 | 4/2008 | Dandliker et al. |
| 2008/0086434 A1 | 4/2008 | Chesla |
| 2008/0086559 A1 | 4/2008 | Davis et al. |
| 2008/0086574 A1 | 4/2008 | Raciborski et al. |
| 2008/0092242 A1 | 4/2008 | Rowley |
| 2008/0101358 A1 | 4/2008 | Van Ewijk et al. |
| 2008/0103805 A1 | 5/2008 | Shear et al. |
| 2008/0104268 A1 | 5/2008 | Farber et al. |
| 2008/0109679 A1 | 5/2008 | Wright et al. |
| 2008/0114829 A1 | 5/2008 | Button et al. |
| 2008/0125077 A1 | 5/2008 | Velazquez et al. |
| 2008/0126706 A1 | 5/2008 | Newport et al. |
| 2008/0134043 A1 | 5/2008 | Georgis et al. |
| 2008/0140800 A1 | 6/2008 | Farber et al. |
| 2008/0147866 A1 | 6/2008 | Stolorz et al. |
| 2008/0147873 A1 | 6/2008 | Matsumoto |
| 2008/0155059 A1 | 6/2008 | Hardin et al. |
| 2008/0155061 A1 | 6/2008 | Afergan et al. |
| 2008/0155613 A1 | 6/2008 | Benya et al. |
| 2008/0155614 A1 | 6/2008 | Cooper et al. |
| 2008/0155694 A1 | 6/2008 | Kwon et al. |
| 2008/0162667 A1 | 6/2008 | Verma et al. |
| 2008/0162821 A1 | 7/2008 | Duran et al. |
| 2008/0162843 A1 | 7/2008 | Davis et al. |
| 2008/0172488 A1 | 7/2008 | Jawahar et al. |
| 2008/0175222 A1 | 7/2008 | Barnea et al. |
| 2008/0184357 A1 | 7/2008 | Drako et al. |
| 2008/0189437 A1 | 7/2008 | Halley |
| 2008/0201332 A1 | 8/2008 | Souders et al. |
| 2008/0201401 A1 | 8/2008 | Pugh et al. |
| 2008/0025304 A1 | 9/2008 | Venkataswami et al. |
| 2008/0215718 A1 | 9/2008 | Stolorz et al. |
| 2008/0215730 A1 | 9/2008 | Sundaram et al. |
| 2008/0215735 A1 | 9/2008 | Farber et al. |
| 2008/0215747 A1 | 9/2008 | Menon et al. |
| 2008/0215750 A1 | 9/2008 | Farber et al. |
| 2008/0215755 A1 | 9/2008 | Farber et al. |
| 2008/0222281 A1 | 9/2008 | Dilley et al. |
| 2008/0222291 A1 | 9/2008 | Weller et al. |
| 2008/0222295 A1 | 9/2008 | Robinson et al. |
| 2008/0225779 A1 | 9/2008 | Bragiel et al. |
| 2008/0228574 A1 | 9/2008 | Stewart et al. |
| 2008/0228920 A1 | 9/2008 | Souders et al. |
| 2008/0235383 A1 | 9/2008 | Schneider |
| 2008/0235400 A1 | 9/2008 | Slocombe et al. |
| 2008/0256087 A1 | 10/2008 | Piironen et al. |
| 2008/0256175 A1 | 10/2008 | Lee et al. |
| 2008/0263135 A1 | 10/2008 | Olliphant |
| 2008/0270882 A1 | 10/2008 | Rollins et al. |
| 2008/0275772 A1 | 10/2008 | Suryanarayana et al. |
| 2008/0281946 A1 | 11/2008 | Swildens et al. |
| 2008/0281950 A1 | 11/2008 | Wald et al. |
| 2008/0288458 A1 | 11/2008 | Sun et al. |
| 2008/0288722 A1 | 11/2008 | Lecoq et al. |

(56) References Cited

U.S. PATENT DOCUMENTS

| | | |
|---|---|---|
| 2008/0301670 A1 | 11/2008 | Gouge et al. |
| 2008/0312766 A1 | 12/2008 | Couckuyt |
| 2008/0319862 A1 | 12/2008 | Golan et al. |
| 2008/0320123 A1 | 12/2008 | Houlihan et al. |
| 2008/0320269 A1 | 12/2008 | Houlihan et al. |
| 2009/0013063 A1 | 1/2009 | Soman |
| 2009/0016236 A1 | 1/2009 | Alcala et al. |
| 2009/0029644 A1 | 1/2009 | Sue et al. |
| 2009/0031042 A1 | 1/2009 | Phatak |
| 2009/0031367 A1 | 1/2009 | Sue |
| 2009/0031368 A1 | 1/2009 | Ling |
| 2009/0031376 A1 | 1/2009 | Riley et al. |
| 2009/0043900 A1 | 2/2009 | Barber |
| 2009/0049098 A1 | 2/2009 | Pickelsimer et al. |
| 2009/0063038 A1 | 2/2009 | Shrivathsan et al. |
| 2009/0063704 A1 | 3/2009 | Taylor et al. |
| 2009/0070533 A1 | 3/2009 | Elazary et al. |
| 2009/0083228 A1 | 3/2009 | Shatz et al. |
| 2009/0083279 A1 | 3/2009 | Hasek |
| 2009/0083413 A1 | 3/2009 | Levow et al. |
| 2009/0086728 A1 | 3/2009 | Gulati et al. |
| 2009/0086741 A1 | 4/2009 | Zhang |
| 2009/0089869 A1 | 4/2009 | Varghese |
| 2009/0094252 A1 | 4/2009 | Wong et al. |
| 2009/0103707 A1 | 4/2009 | McGary et al. |
| 2009/0106202 A1 | 4/2009 | Mizrahi |
| 2009/0106381 A1 | 4/2009 | Kasriel et al. |
| 2009/0109854 A1 | 4/2009 | Rajpathak |
| 2009/0112703 A1 | 4/2009 | Brown |
| 2009/0125393 A1 | 5/2009 | Hwang et al. |
| 2009/0125934 A1 | 5/2009 | Jones et al. |
| 2009/0132368 A1 | 5/2009 | Cotter et al. |
| 2009/0132640 A1 | 5/2009 | Verma et al. |
| 2009/0132648 A1 | 5/2009 | Swildens et al. |
| 2009/0138533 A1 | 5/2009 | Iwasaki et al. |
| 2009/0138582 A1 | 5/2009 | Turk |
| 2009/0144411 A1 | 5/2009 | Winkler et al. |
| 2009/0144412 A1 | 6/2009 | Ferguson et al. |
| 2009/0144496 A1 | 6/2009 | Kawaguchi |
| 2009/0150926 A1 | 6/2009 | Schlack |
| 2009/0157504 A1 | 6/2009 | Braemer et al. |
| 2009/0157850 A1 | 6/2009 | Gagliardi et al. |
| 2009/0157899 A1 | 6/2009 | Gagliardi et al. |
| 2009/0158163 A1 | 6/2009 | Stephens et al. |
| 2009/0164331 A1 | 6/2009 | Bishop et al. |
| 2009/0164614 A1 | 6/2009 | Christian et al. |
| 2009/0177667 A1 | 6/2009 | Ramos et al. |
| 2009/0172167 A1 | 7/2009 | Drai et al. |
| 2009/0182815 A1 | 7/2009 | Czechowski et al. |
| 2009/0182837 A1 | 7/2009 | Rogers |
| 2009/0182945 A1 | 7/2009 | Aviles et al. |
| 2009/0187575 A1 | 7/2009 | DaCosta |
| 2009/0198817 A1 | 7/2009 | Sundaram et al. |
| 2009/0204682 A1 | 8/2009 | Jeyaseelan et al. |
| 2009/0210549 A1 | 8/2009 | Hudson et al. |
| 2009/0228708 A1 | 8/2009 | Trostle |
| 2009/0233623 A1 | 9/2009 | Johnson |
| 2009/0241167 A1 | 9/2009 | Moore |
| 2009/0248697 A1 | 9/2009 | Richardson et al. |
| 2009/0248786 A1 | 10/2009 | Richardson et al. |
| 2009/0248787 A1 | 10/2009 | Sivasubramanian et al. |
| 2009/0248852 A1 | 10/2009 | Fuhrmann et al. |
| 2009/0248858 A1 | 10/2009 | Sivasubramanian et al. |
| 2009/0248893 A1 | 10/2009 | Richardson et al. |
| 2009/0249222 A1 | 10/2009 | Schmidt et al. |
| 2009/0253435 A1 | 10/2009 | Olofsson |
| 2009/0254661 A1 | 10/2009 | Fullagar et al. |
| 2009/0254989 A1 | 10/2009 | Achan et al. |
| 2009/0259588 A1 | 10/2009 | Lindsay |
| 2009/0259971 A1 | 10/2009 | Rankine et al. |
| 2009/0262741 A1 | 10/2009 | Jungck et al. |
| 2009/0265707 A1 | 10/2009 | Goodman et al. |
| 2009/0265786 A1 | 10/2009 | Xie et al. |
| 2009/0271498 A1 | 10/2009 | Cable |
| 2009/0271577 A1 | 10/2009 | Campana et al. |
| 2009/0271730 A1 | 10/2009 | Rose et al. |
| 2009/0276771 A1 | 10/2009 | Nickolov et al. |
| 2009/0279444 A1 | 11/2009 | Ravindran et al. |
| 2009/0282038 A1 | 11/2009 | Subotin et al. |
| 2009/0287750 A1 | 11/2009 | Banavar et al. |
| 2009/0307307 A1 | 11/2009 | Igarashi |
| 2009/0327489 A1 | 12/2009 | Swildens et al. |
| 2009/0327517 A1 | 12/2009 | Sivasubramanian et al. |
| 2009/0327914 A1 | 12/2009 | Adar et al. |
| 2010/0005175 A1 | 1/2010 | Swildens et al. |
| 2010/0011061 A1 | 1/2010 | Hudson et al. |
| 2010/0011126 A1 | 1/2010 | Hsu et al. |
| 2010/0020699 A1 | 1/2010 | On |
| 2010/0023601 A1 | 1/2010 | Lewin et al. |
| 2010/0023621 A1 | 1/2010 | Ezolt et al. |
| 2010/0030662 A1 | 1/2010 | Klein |
| 2010/0030914 A1 | 2/2010 | Sparks et al. |
| 2010/0034470 A1 | 2/2010 | Valencia-Campo et al. |
| 2010/0036944 A1 | 2/2010 | Douglis et al. |
| 2010/0037314 A1 | 2/2010 | Perdisci et al. |
| 2010/0042725 A1 | 2/2010 | Jeon et al. |
| 2010/0049862 A1 | 2/2010 | Dixon |
| 2010/0057894 A1 | 2/2010 | Glasser |
| 2010/0058352 A1 | 3/2010 | Esfahany et al. |
| 2010/0070603 A1 | 3/2010 | Moss et al. |
| 2010/0070700 A1 | 3/2010 | Borst et al. |
| 2010/0074268 A1 | 3/2010 | Raza |
| 2010/0082320 A1 | 3/2010 | Wood et al. |
| 2010/0082787 A1 | 4/2010 | Kommula et al. |
| 2010/0088367 A1 | 4/2010 | Brown et al. |
| 2010/0088405 A1 | 4/2010 | Huang et al. |
| 2010/0095008 A1 | 4/2010 | Joshi |
| 2010/0100629 A1 | 4/2010 | Raciborski et al. |
| 2010/0103837 A1 | 4/2010 | Jungck et al. |
| 2010/0111059 A1 | 4/2010 | Bappu et al. |
| 2010/0161564 A1 | 4/2010 | Lee et al. |
| 2010/0115133 A1 | 5/2010 | Joshi |
| 2010/0115342 A1 | 5/2010 | Shigeta et al. |
| 2010/0121953 A1 | 5/2010 | Friedman et al. |
| 2010/0121981 A1 | 5/2010 | Drako |
| 2010/0122069 A1 | 5/2010 | Gonion |
| 2010/0125626 A1 | 5/2010 | Lucas et al. |
| 2010/0125673 A1 | 5/2010 | Richardson et al. |
| 2010/0125675 A1 | 5/2010 | Richardson et al. |
| 2010/0131646 A1 | 5/2010 | Drako |
| 2010/0138559 A1 | 5/2010 | Sullivan et al. |
| 2010/0106934 A1 | 6/2010 | Calder et al. |
| 2010/0150155 A1 | 6/2010 | Napierala |
| 2010/0161565 A1 | 6/2010 | Lee et al. |
| 2010/0161799 A1 | 6/2010 | Maloo |
| 2010/0169392 A1 | 6/2010 | Lev Ran et al. |
| 2010/0169452 A1 | 7/2010 | Atluri et al. |
| 2010/0174811 A1 | 7/2010 | Musiri et al. |
| 2010/0191854 A1 | 7/2010 | Isci et al. |
| 2010/0192225 A1 | 7/2010 | Ma et al. |
| 2010/0217801 A1 | 8/2010 | Leighton et al. |
| 2010/0217856 A1 | 8/2010 | Falkena |
| 2010/0223364 A1 | 8/2010 | Wei |
| 2010/0025071 A1 | 9/2010 | Cadwell et al. |
| 2010/0226372 A1 | 9/2010 | Watanabe |
| 2010/0228819 A1 | 9/2010 | Wei |
| 2010/0235915 A1 | 9/2010 | Memon et al. |
| 2010/0257024 A1 | 9/2010 | Holmes et al. |
| 2010/0257266 A1 | 10/2010 | Holmes et al. |
| 2010/0257566 A1 | 10/2010 | Matila |
| 2010/0262964 A1 | 10/2010 | Uyeda et al. |
| 2010/0268789 A1 | 10/2010 | Yoo et al. |
| 2010/0268814 A1 | 10/2010 | Cross et al. |
| 2010/0274765 A1 | 10/2010 | Murphy et al. |
| 2010/0281482 A1 | 10/2010 | Pike et al. |
| 2010/0293296 A1 | 11/2010 | Hsu et al. |
| 2010/0293479 A1 | 11/2010 | Rousso et al. |
| 2010/0299427 A1 | 11/2010 | Joshi |
| 2010/0299438 A1 | 11/2010 | Zimmerman et al. |
| 2010/0299439 A1 | 11/2010 | McCarthy et al. |
| 2010/0306382 A1 | 11/2010 | Cardosa et al. |
| 2010/0312861 A1 | 12/2010 | Kolhi et al. |
| 2010/0318508 A1 | 12/2010 | Brawer et al. |
| 2010/0322255 A1 | 12/2010 | Hao et al. |

(56) References Cited

U.S. PATENT DOCUMENTS

| | | |
|---|---|---|
| 2010/0325365 A1 | 12/2010 | Colglazier et al. |
| 2010/0332595 A1 | 12/2010 | Fullagar et al. |
| 2010/0332601 A1 | 12/2010 | Walter et al. |
| 2010/0332658 A1 | 12/2010 | Elyashev |
| 2011/0010244 A1 | 1/2011 | Hatridge |
| 2011/0016214 A1 | 1/2011 | Jackson |
| 2011/0029598 A1 | 1/2011 | Arnold et al. |
| 2011/0029398 A1 | 2/2011 | Boudville |
| 2011/0035469 A1 | 2/2011 | Smith et al. |
| 2011/0040893 A1 | 2/2011 | Karaoguz et al. |
| 2011/0051738 A1 | 2/2011 | Xu |
| 2011/0055386 A1 | 3/2011 | Middleton et al. |
| 2011/0055714 A1 | 3/2011 | Vemulapalli et al. |
| 2011/0055921 A1 | 3/2011 | Narayanaswamy et al. |
| 2011/0057790 A1 | 3/2011 | Martin et al. |
| 2011/0058675 A1 | 3/2011 | Brueck et al. |
| 2011/0072138 A1 | 3/2011 | Canturk et al. |
| 2011/0072366 A1 | 3/2011 | Spencer |
| 2011/0078000 A1 | 3/2011 | Ma et al. |
| 2011/0078230 A1 | 3/2011 | Sepulveda |
| 2011/0085654 A1 | 3/2011 | Jana et al. |
| 2011/0082916 A1 | 4/2011 | Swanson et al. |
| 2011/0087769 A1 | 4/2011 | Holmes et al. |
| 2011/0093584 A1 | 4/2011 | Qiu et al. |
| 2011/0096987 A1 | 4/2011 | Morales et al. |
| 2011/0099294 A1 | 4/2011 | Kapur et al. |
| 2011/0106949 A1 | 4/2011 | Patel et al. |
| 2011/0113467 A1 | 5/2011 | Agarwal et al. |
| 2011/0125894 A1 | 5/2011 | Anderson et al. |
| 2011/0153938 A1 | 6/2011 | Verzunov et al. |
| 2011/0153941 A1 | 6/2011 | Spatscheck et al. |
| 2011/0154318 A1 | 6/2011 | Oshins et al. |
| 2011/0154350 A1 | 6/2011 | Doyle et al. |
| 2011/0161461 A1 | 6/2011 | Niven-Jenkins |
| 2011/0166935 A1 | 6/2011 | Armentrout et al. |
| 2011/0182290 A1 | 7/2011 | Perkins |
| 2011/0191445 A1 | 7/2011 | Dazzi |
| 2011/0191446 A1 | 8/2011 | Dazzi et al. |
| 2011/0191447 A1 | 8/2011 | Dazzi et al. |
| 2011/0191449 A1 | 8/2011 | Swildens et al. |
| 2011/0191459 A1 | 8/2011 | Joshi |
| 2011/0196892 A1 | 8/2011 | Xia |
| 2011/0202705 A1 | 8/2011 | Hayashi et al. |
| 2011/0208876 A1 | 8/2011 | Richardson et al. |
| 2011/0208958 A1 | 8/2011 | Stuedi et al. |
| 2011/0209064 A1 | 8/2011 | Jorgensen et al. |
| 2011/0219120 A1 | 8/2011 | Farber et al. |
| 2011/0219372 A1 | 9/2011 | Agarwal et al. |
| 2011/0238501 A1 | 9/2011 | Almeida |
| 2011/0238793 A1 | 9/2011 | Bedare et al. |
| 2011/0239215 A1 | 9/2011 | Sugai |
| 2011/0252142 A1 | 9/2011 | Richardson et al. |
| 2011/0252143 A1 | 10/2011 | Baumback et al. |
| 2011/0255445 A1 | 10/2011 | Johnson et al. |
| 2011/0258049 A1 | 10/2011 | Ramer et al. |
| 2011/0258614 A1 | 10/2011 | Tamm |
| 2011/0270964 A1 | 10/2011 | Huang et al. |
| 2011/0276623 A1 | 11/2011 | Girbal |
| 2011/0296053 A1 | 11/2011 | Medved et al. |
| 2011/0295940 A1 | 12/2011 | Saleem et al. |
| 2011/0295942 A1 | 12/2011 | Raghunath et al. |
| 2011/0296370 A1 | 12/2011 | Ferris et al. |
| 2011/0296473 A1 | 12/2011 | Babic |
| 2011/0302304 A1 | 12/2011 | Baumback et al. |
| 2011/0307533 A1 | 12/2011 | Saeki |
| 2011/0320522 A1 | 12/2011 | Endres et al. |
| 2011/0320559 A1 | 12/2011 | Foti |
| 2012/0011190 A1 | 1/2012 | Driesen et al. |
| 2012/0014249 A1 | 1/2012 | Mao et al. |
| 2012/0023226 A1 | 1/2012 | Petersen et al. |
| 2012/0036238 A1 | 1/2012 | Sundaram et al. |
| 2012/0031626 A1 | 2/2012 | Clayton et al. |
| 2012/0041899 A1 | 2/2012 | Greene et al. |
| 2012/0041970 A1 | 2/2012 | Ghosh et al. |
| 2012/0042381 A1 | 2/2012 | Antonakakis et al. |
| 2012/0054860 A1 | 2/2012 | Wyschogrod et al. |
| 2012/0066360 A1 | 3/2012 | Ghosh |
| 2012/0072600 A1 | 3/2012 | Richardson et al. |
| 2012/0072608 A1 | 3/2012 | Peters et al. |
| 2012/0078998 A1 | 3/2012 | Son et al. |
| 2012/0079096 A1 | 3/2012 | Cowan et al. |
| 2012/0079115 A1 | 3/2012 | Richardson et al. |
| 2012/0089700 A1 | 3/2012 | Safruti et al. |
| 2012/0023090 A1 | 4/2012 | Holloway et al. |
| 2012/0089972 A1 | 4/2012 | Scheidel et al. |
| 2012/0096065 A1 | 4/2012 | Suit et al. |
| 2012/0096166 A1 | 4/2012 | Devarapalli et al. |
| 2012/0110515 A1 | 4/2012 | Abramoff et al. |
| 2012/0117621 A1 | 5/2012 | Kondamuru et al. |
| 2012/0124184 A1 | 5/2012 | Sakata et al. |
| 2012/0131177 A1 | 5/2012 | Brandt et al. |
| 2012/0136697 A1 | 5/2012 | Peles et al. |
| 2012/0142310 A1 | 5/2012 | Pugh et al. |
| 2012/0143688 A1 | 6/2012 | Alexander |
| 2012/0159476 A1 | 6/2012 | Ramteke et al. |
| 2012/0166516 A1 | 6/2012 | Simmons et al. |
| 2012/0169646 A1 | 6/2012 | Berkes et al. |
| 2012/0173760 A1 | 7/2012 | Jog et al. |
| 2012/0179796 A1 | 7/2012 | Nagaraj et al. |
| 2012/0179817 A1 | 7/2012 | Bade et al. |
| 2012/0179839 A1 | 7/2012 | Raciborski et al. |
| 2012/0198043 A1 | 7/2012 | Hesketh et al. |
| 2012/0198071 A1 | 8/2012 | Black et al. |
| 2012/0204176 A1 | 8/2012 | Tian et al. |
| 2012/0209942 A1 | 8/2012 | Zehavi et al. |
| 2012/0222005 A1 | 8/2012 | Harris et al. |
| 2012/0224516 A1 | 8/2012 | Stojanovski et al. |
| 2012/0226649 A1 | 9/2012 | Kovacs et al. |
| 2012/0233329 A1 | 9/2012 | Dickinson et al. |
| 2012/0233522 A1 | 9/2012 | Barton et al. |
| 2012/0233668 A1 | 9/2012 | Leafe et al. |
| 2012/0239725 A1 | 9/2012 | Hartrick et al. |
| 2012/0246129 A1 | 9/2012 | Rothschild et al. |
| 2012/0246257 A1 | 9/2012 | Brown |
| 2012/0254961 A1 | 9/2012 | Kim et al. |
| 2012/0257628 A1 | 10/2012 | Bu et al. |
| 2012/0259954 A1 | 10/2012 | McCarthy et al. |
| 2012/0272224 A1 | 10/2012 | Brackman |
| 2012/0278229 A1 | 10/2012 | Vishwanathan et al. |
| 2012/0278831 A1 | 11/2012 | van Coppenolle et al. |
| 2012/0278833 A1 | 11/2012 | Tam |
| 2012/0297009 A1 | 11/2012 | Amir et al. |
| 2012/0303785 A1 | 11/2012 | Sivasubramanian et al. |
| 2012/0303804 A1 | 11/2012 | Sundaram et al. |
| 2012/0311648 A1 | 11/2012 | Swildens et al. |
| 2012/0317573 A1 | 12/2012 | Osogami et al. |
| 2012/0324089 A1 | 12/2012 | Joshi |
| 2013/0003547 A1 | 1/2013 | Motwani et al. |
| 2013/0003735 A1 | 1/2013 | Chao et al. |
| 2013/0007100 A1 | 1/2013 | Trahan et al. |
| 2013/0007101 A1 | 1/2013 | Trahan et al. |
| 2013/0007102 A1 | 1/2013 | Trahan et al. |
| 2013/0007241 A1 | 1/2013 | Trahan et al. |
| 2013/0007273 A1 | 1/2013 | Baumback et al. |
| 2013/0013764 A1 | 1/2013 | Li et al. |
| 2013/0018945 A1 | 1/2013 | Vendrow et al. |
| 2013/0019311 A1 | 1/2013 | Swildens et al. |
| 2013/0034099 A1 | 1/2013 | Hikichi et al. |
| 2013/0036307 A1 | 2/2013 | Gagliano et al. |
| 2013/0041872 A1 | 2/2013 | Aizman et al. |
| 2013/0042328 A1 | 2/2013 | Padinjareveetil |
| 2013/0046869 A1 | 2/2013 | Jenkins et al. |
| 2013/0046883 A1 | 2/2013 | Lientz et al. |
| 2013/0054675 A1 | 2/2013 | Jenkins et al. |
| 2013/0055374 A1 | 2/2013 | Kustarz et al. |
| 2013/0067530 A1 | 2/2013 | Spektor et al. |
| 2013/0061306 A1 | 3/2013 | Sinn |
| 2013/0073808 A1 | 3/2013 | Puthalath et al. |
| 2013/0080420 A1 | 3/2013 | Taylor et al. |
| 2013/0080421 A1 | 3/2013 | Taylor et al. |
| 2013/0080576 A1 | 3/2013 | Taylor et al. |
| 2013/0080577 A1 | 3/2013 | Taylor et al. |
| 2013/0080623 A1 | 3/2013 | Thireault |
| 2013/0080627 A1 | 3/2013 | Kukreja et al. |

(56) References Cited

U.S. PATENT DOCUMENTS

| | | |
|---|---|---|
| 2013/0080636 A1 | 3/2013 | Friedman et al. |
| 2013/0086001 A1 | 3/2013 | Bhogal et al. |
| 2013/0084898 A1 | 4/2013 | Li et al. |
| 2013/0089005 A1 | 4/2013 | Li et al. |
| 2013/0095806 A1 | 4/2013 | Salkintzis et al. |
| 2013/0103834 A1 | 4/2013 | Dzerve et al. |
| 2013/0111035 A1 | 4/2013 | Alapati et al. |
| 2013/0117282 A1 | 5/2013 | Mugali, Jr. et al. |
| 2013/0117849 A1 | 5/2013 | Golshan et al. |
| 2013/0130221 A1 | 5/2013 | Kortemeyer et al. |
| 2013/0133057 A1 | 5/2013 | Yoon et al. |
| 2013/0151646 A1 | 5/2013 | Chidambaram et al. |
| 2013/0191499 A1 | 7/2013 | Ludin et al. |
| 2013/0198341 A1 | 8/2013 | Kim |
| 2013/0212300 A1 | 8/2013 | Eggleston et al. |
| 2013/0219020 A1 | 8/2013 | McCarthy et al. |
| 2013/0227165 A1 | 8/2013 | Liu |
| 2013/0246567 A1 | 8/2013 | Green et al. |
| 2013/0254269 A1 | 9/2013 | Sivasubramanian et al. |
| 2013/0254879 A1 | 9/2013 | Chesla et al. |
| 2013/0263256 A1 | 9/2013 | Dickinson et al. |
| 2013/0268616 A1 | 10/2013 | Sakata et al. |
| 2013/0275549 A1 | 10/2013 | Field et al. |
| 2013/0279335 A1 | 10/2013 | Ahmadi |
| 2013/0283266 A1 | 10/2013 | Basel et al. |
| 2013/0305046 A1 | 10/2013 | Mankovski et al. |
| 2013/0305083 A1 | 11/2013 | Machida |
| 2013/0311555 A1 | 11/2013 | Laoutaris et al. |
| 2013/0311583 A1 | 11/2013 | Humphreys et al. |
| 2013/0311605 A1 | 11/2013 | Richardson et al. |
| 2013/0311989 A1 | 11/2013 | Ota et al. |
| 2013/0339429 A1 | 11/2013 | Richardson et al. |
| 2013/0346465 A1 | 12/2013 | Maltz et al. |
| 2013/0346470 A1 | 12/2013 | Obstfeld et al. |
| 2013/0346567 A1 | 12/2013 | Richardson et al. |
| 2013/0346614 A1 | 12/2013 | Baughman et al. |
| 2014/0006465 A1 | 1/2014 | Davis et al. |
| 2014/0006577 A1 | 1/2014 | Joe et al. |
| 2014/0007239 A1 | 1/2014 | Sharpe et al. |
| 2014/0013403 A1 | 1/2014 | Shuster |
| 2014/0019605 A1 | 1/2014 | Boberg |
| 2014/0022951 A1 | 1/2014 | Lemieux |
| 2014/0032658 A1 | 1/2014 | Falls |
| 2014/0036675 A1 | 1/2014 | Wang et al. |
| 2014/0040478 A1 | 2/2014 | Hsu et al. |
| 2014/0047104 A1 | 2/2014 | Rodriguez |
| 2014/0053022 A1 | 2/2014 | Forgette et al. |
| 2014/0059198 A1 | 2/2014 | Richardson et al. |
| 2014/0059208 A1 | 2/2014 | Yan et al. |
| 2014/0059379 A1 | 2/2014 | Ren et al. |
| 2014/0082165 A1 | 2/2014 | Marr et al. |
| 2014/0082614 A1 | 3/2014 | Klein et al. |
| 2014/0089917 A1 | 3/2014 | Attalla et al. |
| 2014/0108672 A1 | 3/2014 | Ou et al. |
| 2014/0108474 A1 | 4/2014 | David et al. |
| 2014/0122698 A1 | 4/2014 | Batrouni et al. |
| 2014/0119194 A1 | 5/2014 | Raciborski et al. |
| 2014/0122725 A1 | 5/2014 | Batrouni et al. |
| 2014/0137111 A1 | 5/2014 | Dees et al. |
| 2014/0143305 A1 | 5/2014 | Choi et al. |
| 2014/0149601 A1 | 5/2014 | Carney et al. |
| 2014/0164817 A1 | 5/2014 | Bartholomy et al. |
| 2014/0164584 A1 | 6/2014 | Joe et al. |
| 2014/0165061 A1 | 6/2014 | Greene et al. |
| 2014/0172944 A1 | 6/2014 | Newton et al. |
| 2014/0181268 A1 | 6/2014 | Stevens et al. |
| 2014/0195686 A1 | 6/2014 | Yeager et al. |
| 2014/0189069 A1 | 7/2014 | Gero et al. |
| 2014/0200036 A1 | 7/2014 | Egner et al. |
| 2014/0215019 A1 | 7/2014 | Ahrens |
| 2014/0244937 A1 | 8/2014 | Bloomstein et al. |
| 2014/0258523 A1 | 9/2014 | Kazerani et al. |
| 2014/0269371 A1 | 9/2014 | Badea et al. |
| 2014/0279852 A1 | 9/2014 | Chen |
| 2014/0280606 A1 | 9/2014 | Long |
| 2014/0280679 A1 | 9/2014 | Dey et al. |
| 2014/0297870 A1 | 9/2014 | Eggleston et al. |
| 2014/0297866 A1 | 10/2014 | Ennaji et al. |
| 2014/0298021 A1 | 10/2014 | Kwon et al. |
| 2014/0310402 A1 | 10/2014 | Giaretta et al. |
| 2014/0310811 A1 | 10/2014 | Hentunen |
| 2014/0324774 A1 | 10/2014 | Chen et al. |
| 2014/0325155 A1 | 10/2014 | Marshall et al. |
| 2014/0331328 A1 | 10/2014 | Wang et al. |
| 2014/0337472 A1 | 11/2014 | Newton et al. |
| 2014/0351413 A1 | 11/2014 | Smith et al. |
| 2014/0351871 A1 | 11/2014 | Bomfim et al. |
| 2015/0006615 A1 | 1/2015 | Wainner et al. |
| 2015/0019686 A1 | 1/2015 | Backholm |
| 2015/0026407 A1 | 1/2015 | Mclellan et al. |
| 2015/0067171 A1 | 1/2015 | Yum |
| 2015/0036493 A1 | 2/2015 | Cj et al. |
| 2015/0074228 A1 | 3/2015 | Drake |
| 2015/0081877 A1 | 3/2015 | Sethi et al. |
| 2015/0088586 A1 | 3/2015 | Pavlas et al. |
| 2015/0088964 A1 | 3/2015 | Shiell et al. |
| 2015/0088972 A1 | 3/2015 | Brand et al. |
| 2015/0089621 A1 | 3/2015 | Khalid |
| 2015/0095516 A1 | 3/2015 | Bergman |
| 2015/0106864 A1 | 4/2015 | Li et al. |
| 2015/0154051 A1 | 4/2015 | Kruglick |
| 2015/0149600 A1 | 5/2015 | Thibeault et al. |
| 2015/0149631 A1 | 5/2015 | Lissack |
| 2015/0156172 A1 | 6/2015 | Nandi et al. |
| 2015/0156279 A1 | 6/2015 | Vaswani et al. |
| 2015/0180995 A1 | 6/2015 | Hofmann |
| 2015/0188734 A1 | 6/2015 | Petrov |
| 2015/0189042 A1 | 7/2015 | Sun et al. |
| 2015/0195244 A1 | 7/2015 | Richardson et al. |
| 2015/0200991 A1 | 7/2015 | Kwon |
| 2015/0215388 A1 | 7/2015 | Kontothanassis et al. |
| 2015/0215656 A1 | 7/2015 | Pulung et al. |
| 2015/0242397 A1 | 8/2015 | Zhuang |
| 2015/0244580 A1 | 8/2015 | Saavedra |
| 2015/0256647 A1 | 8/2015 | Richardson et al. |
| 2015/0264009 A1 | 9/2015 | Scharber et al. |
| 2015/0271031 A1 | 9/2015 | Beevers |
| 2015/0288647 A1 | 10/2015 | Chhabra et al. |
| 2015/0317118 A1 | 11/2015 | Orikasa et al. |
| 2015/0339136 A1 | 11/2015 | Suryanarayanan et al. |
| 2015/0341431 A1 | 11/2015 | Hartrick et al. |
| 2015/0358276 A1 | 11/2015 | Liu et al. |
| 2015/0347311 A1 | 12/2015 | Tanaka et al. |
| 2015/0350365 A1 | 12/2015 | Khakpour et al. |
| 2015/0358436 A1 | 12/2015 | Kim et al. |
| 2015/0363113 A1 | 12/2015 | Rahman et al. |
| 2015/0363282 A1 | 12/2015 | Rangasamy |
| 2016/0006672 A1 | 1/2016 | Saavedra |
| 2016/0021197 A1 | 1/2016 | Pogrebinsky et al. |
| 2016/0028598 A1 | 1/2016 | Khakpour et al. |
| 2016/0028755 A1 | 1/2016 | Vasseur et al. |
| 2016/0036857 A1 | 1/2016 | Foxhoven et al. |
| 2016/0065475 A1 | 2/2016 | Hilt et al. |
| 2016/0072669 A1 | 3/2016 | Saavedra |
| 2016/0072720 A1 | 3/2016 | Richardson et al. |
| 2016/0104346 A1 | 3/2016 | Ovalle et al. |
| 2016/0132600 A1 | 4/2016 | Woodhead et al. |
| 2016/0142251 A1 | 5/2016 | Contreras et al. |
| 2016/0182454 A1 | 5/2016 | Phonsa et al. |
| 2016/0164761 A1 | 6/2016 | Sathyanarayana et al. |
| 2016/0164799 A1 | 6/2016 | Popli et al. |
| 2016/0182542 A1 | 6/2016 | Staniford |
| 2016/0241639 A1 | 6/2016 | Brookins et al. |
| 2016/0253262 A1 | 8/2016 | Nadgowda |
| 2016/0255042 A1 | 9/2016 | Newton |
| 2016/0269927 A1 | 9/2016 | Kim et al. |
| 2016/0274929 A1 | 9/2016 | King |
| 2016/0294678 A1 | 9/2016 | Khakpour et al. |
| 2016/0337426 A1 | 10/2016 | Shribman et al. |
| 2016/0366202 A1 | 11/2016 | Phillips et al. |
| 2016/0373789 A1 | 12/2016 | Tsukagoshi |
| 2017/0041333 A1 | 2/2017 | Mahjoub et al. |
| 2017/0041428 A1 | 2/2017 | Katsev |
| 2017/0099345 A1 | 3/2017 | Leach |

(56) References Cited

U.S. PATENT DOCUMENTS

| | | | |
|---|---|---|---|
| 2017/0099254 | A1 | 4/2017 | Leach et al. |
| 2017/0109316 | A1 | 4/2017 | Hack et al. |
| 2017/0126796 | A1 | 4/2017 | Hollis et al. |
| 2017/0142062 | A1 | 5/2017 | Richardson et al. |
| 2017/0153980 | A1 | 6/2017 | Araújo et al. |
| 2017/0155678 | A1 | 6/2017 | Araújo et al. |
| 2017/0155732 | A1 | 6/2017 | Araújo et al. |
| 2017/0163425 | A1 | 6/2017 | Kaliski, Jr. |
| 2017/0170973 | A1 | 6/2017 | Gill et al. |
| 2017/0171146 | A1 | 6/2017 | Sharma et al. |
| 2017/0180217 | A1 | 6/2017 | Puchala et al. |
| 2017/0187768 | A1 | 6/2017 | Huang et al. |
| 2017/0214761 | A1 | 6/2017 | Hsu et al. |
| 2017/0257340 | A1 | 7/2017 | Richardson et al. |
| 2017/0374121 | A1 | 12/2017 | Phillips et al. |
| 2018/0011913 | A1 | 1/2018 | Kapanipathi et al. |
| 2018/0027040 | A1 | 1/2018 | Bae |
| 2018/0077109 | A1 | 1/2018 | Hoeme et al. |
| 2018/0063193 | A1 | 3/2018 | Chandrashekhar et al. |
| 2018/0077110 | A1 | 3/2018 | Huston, III et al. |
| 2018/0097631 | A1 | 3/2018 | Uppal et al. |
| 2018/0097634 | A1 | 4/2018 | Uppal et al. |
| 2018/0097831 | A1 | 4/2018 | Uppal et al. |
| 2018/0159757 | A1 | 4/2018 | Uppal et al. |
| 2018/0167444 | A1 | 6/2018 | Sivasubramanian et al. |
| 2018/0173526 | A1 | 6/2018 | Prinsloo et al. |
| 2018/0176615 | A1 | 6/2018 | Hannu et al. |
| 2018/0191817 | A1 | 6/2018 | Richardson et al. |
| 2018/0278717 | A1 | 7/2018 | Richardson et al. |
| 2018/0287916 | A1 | 9/2018 | Mizik et al. |
| 2018/0302322 | A1 | 10/2018 | Richardson et al. |
| 2018/0332107 | A1 | 10/2018 | Marr et al. |
| 2018/0337885 | A1 | 11/2018 | Singh et al. |
| 2018/0351904 | A1 | 11/2018 | Mizik et al. |
| 2018/0367498 | A1 | 12/2018 | Bliss et al. |
| 2019/0007515 | A1 | 1/2019 | Baldwin et al. |
| 2019/0020562 | A1 | 1/2019 | Richardson et al. |
| 2019/0028562 | A1 | 1/2019 | Watson et al. |
| 2019/0044787 | A1 | 1/2019 | Richardson et al. |
| 2019/0044846 | A1 | 2/2019 | Howard et al. |
| 2019/0073303 | A1 | 2/2019 | Marshall et al. |
| 2019/0089542 | A1 | 3/2019 | Richardson et al. |
| 2019/0089818 | A1 | 3/2019 | Choi |
| 2019/0098109 | A1 | 3/2019 | Watson |
| 2019/0121739 | A1 | 4/2019 | Richardson et al. |
| 2019/0129908 | A1 | 4/2019 | Kumarasamy |
| 2019/0140922 | A1 | 5/2019 | Ellsworth et al. |
| 2019/0173941 | A1 | 5/2019 | Puchala et al. |
| 2019/0173972 | A1 | 6/2019 | MacCarthaigh et al. |
| 2019/0190998 | A1 | 6/2019 | Sivasubramanian et al. |
| 2019/0222666 | A1 | 6/2019 | Uppal et al. |
| 2019/0268265 | A1 | 7/2019 | Richardson et al. |
| 2019/0297137 | A1 | 9/2019 | Richardson et al. |
| 2019/0032751 | A1 | 10/2019 | Kalagi et al. |
| 2019/0354484 | A1 | 11/2019 | Marshall et al. |
| 2020/0065132 | A1 | 2/2020 | Mercier et al. |
| 2020/0084268 | A1 | 3/2020 | Hollis et al. |
| 2020/0195677 | A1 | 6/2020 | Uppal et al. |
| 2020/0195753 | A1 | 6/2020 | Richardson et al. |
| 2020/0265096 | A1 | 8/2020 | Raftery |
| 2020/0287817 | A1 | 9/2020 | Howard et al. |
| 2020/0389534 | A1 | 12/2020 | Sivasubramanian et al. |
| 2020/0389541 | A1 | 12/2020 | Baldwin et al. |
| 2021/0021692 | A1 | 1/2021 | Richardson et al. |
| 2021/0042163 | A1 | 2/2021 | Radhakrishnan et al. |
| 2021/0119961 | A1 | 4/2021 | Thunga et al. |
| 2021/0185114 | A1 | 6/2021 | Baldwin et al. |
| 2021/0194806 | A1 | 6/2021 | Richardson et al. |
| 2021/0297365 | A1 | 9/2021 | Richardson et al. |

FOREIGN PATENT DOCUMENTS

| | | | |
|---|---|---|---|
| CN | 1422468 | A | 6/2003 |
| CN | 1511399 | A | 7/2004 |
| CN | 1605182 | A | 4/2005 |
| CN | 101189598 | A | 5/2008 |
| CN | 101431539 | A | 5/2009 |
| CN | 101460907 | A | 6/2009 |
| CN | 101631133 | A | 1/2010 |
| CN | 103152357 | A | 6/2013 |
| CN | 103731481 | A | 4/2014 |
| DE | 60318825 | T2 | 1/2009 |
| EP | 1351141 | A2 | 10/2003 |
| EP | 1603307 | A2 | 12/2005 |
| EP | 2008167 | A2 | 12/2008 |
| EP | 3156911 | A1 | 4/2017 |
| JP | 07-141305 | | 6/1995 |
| JP | 2001-0506093 | | 5/2001 |
| JP | 2001-249907 | | 9/2001 |
| JP | 2002-024192 | | 1/2002 |
| JP | 2002-044137 | | 2/2002 |
| JP | 2002-323986 | | 11/2002 |
| JP | 2003-167810 | A | 6/2003 |
| JP | 2003-167813 | A | 6/2003 |
| JP | 2003-188901 | A | 7/2003 |
| JP | 2003-522358 | A | 7/2003 |
| JP | 2004-070935 | | 3/2004 |
| JP | 2004-532471 | | 10/2004 |
| JP | 2004-533738 | A | 11/2004 |
| JP | 2005-537687 | | 12/2005 |
| JP | 3748216 | B2 | 2/2006 |
| JP | 2007-133896 | A | 5/2007 |
| JP | 2007-207225 | A | 8/2007 |
| JP | 2008-515106 | A | 5/2008 |
| JP | 2009-071538 | A | 4/2009 |
| JP | 2012-509623 | | 4/2012 |
| JP | 2012-209623 | | 10/2012 |
| WO | WO 2001/045349 | A2 | 6/2001 |
| WO | WO 2002/069608 | A2 | 9/2002 |
| WO | WO 2005/071560 | A1 | 8/2005 |
| WO | WO 2007/007960 | A1 | 1/2007 |
| WO | WO 2007/126837 | A2 | 11/2007 |
| WO | WO 2009124006 | A2 | 10/2009 |
| WO | WO 2010/002603 | A1 | 1/2010 |
| WO | WO 2012/044587 | | 4/2012 |
| WO | WO 2012065641 | A1 | 5/2012 |
| WO | WO 2014/047073 | A1 | 3/2014 |
| WO | WO 2017/106455 | A1 | 6/2017 |
| WO | WO 2018/236597 | A1 | 12/2018 |

OTHER PUBLICATIONS

Second Office Action in Chinese Application No. 201610828846.3 dated Aug. 5, 2020.
Office Action issued in connection with European Patent Application No. 18734734 dated Oct. 19, 2020.
"Non-Final Office Action dated Jan. 3, 2012," U.S. Appl. No. 12/652,541, filed Jan. 3, 2012; 35 pages.
"Final Office Action dated Sep. 5, 2012," U.S. Appl. No. 12/652,541, filed Sep. 5, 2012; 40 pages.
"Notice of Allowance dated Jan. 4, 2013," U.S. Appl. No. 12/652,541, filed Jan. 4, 2013; 11 pages.
"Non-Final Office Action dated Apr. 30, 2014," U.S. Appl. No. 13/842,970; 20 pages.
"Final Office Action dated Aug. 19, 2014," U.S. Appl. No. 13/842,970; 13 pages.
"Notice of Allowance dated Dec. 5, 2014," U.S. Appl. No. 13/842,970; 6 pages.
Canonical Name (CNAME) DNS Records, domainavenue.com, Feb. 1, 2001, XP055153783, Retrieved from the Internet: URL:http://www.domainavenue.com/cname.htm [retrieved on Nov. 18, 2014].
"Content delivery network", Wikipedia, the free encyclopedia, Retrieved from the Internet: URL:http://en.wikipedia.org/w/index.php?title=Contentdelivery network&oldid=6010099 70, XP055153445, Mar. 24, 2008.
"Global Server Load Balancing with ServerIron," Foundry Networks, retrieved Aug. 30, 2007, from http://www.foundrynet.com/pdf/an-global-server-load-bal.pdf, 7 pages.
"Grid Computing Solutions," Sun Microsystems, Inc., retrieved May 3, 2006, from http://www.sun.com/software/grid, 3 pages.

(56) References Cited

OTHER PUBLICATIONS

"Grid Offerings," Java.net, retrieved May 3, 2006, from http://wiki.java.net/bin/view/Sungrid/OtherGridOfferings, 8 pages.
"Recent Advances Boost System Virtualization," eWeek.com, retrieved from May 3, 2006, http://www.eWeek.eom/article2/0,1895,1772626,00.asp, 5 pages.
"Scaleable Trust of Next Generation Management (STRONG-MAN)," retrieved May 17, 2006, from http://www.cis.upenn.edu/~dsl/STRONGMAN/, 4 pages.
"Sun EDA Compute Ranch," Sun Microsystems, Inc., retrieved May 3, 2006, from http://sun.com/processors/ranch/brochure.pdf, 2 pages.
"Sun Microsystems Accelerates UltraSP ARC Processor Design Program With New Burlington, Mass. Compute Ranch," Nov. 6, 2002, Sun Microsystems, Inc., retrieved May 3, 2006, from http://www.sun.com/smi/Press/sunflash/2002-11/sunflash.20021106.3.xml, 2 pages.
"Sun N1 Grid Engine 6," Sun Microsystems, Inc., retrieved May 3, 2006, from http://www.sun.com/software/gridware/index.xml, 3 pages.
"Sun Opens New Processor Design Compute Ranch," Nov. 30, 2001, Sun Microsystems, Inc., retrieved May 3, 2006, from http://www.sun.com/smi/Press/sunflash/2001-11/sunflash.20011130.1.xml, 3 pages.
"The Softricity Desktop," Softricity, Inc., retrieved May 3, 2006, from http://www.softricity.com/products/, 3 pages.
"Xen—The Xen virtual Machine Monitor," University of Cambridge Computer Laboratory, retrieved Nov. 8, 2005, from http://www.cl.cam.ac.uk/Research/SRG/netos/xen/, 2 pages.
"XenFaq," retrieved Nov. 8, 2005, from http://wiki.xensource.com/xenwiki/XenFaq?action=print, 9 pages.
Abi, Issam, et al., "A Business Driven Management Framework for Utility Computing Environments," Oct. 12, 2004, HP Laboratories Bristol, HPL-2004-171, retrieved Aug. 30, 2007, from http://www.hpl.hp.com/techreports/2004/HPL-2004-171.pdf, 14 pages.
American Bar Association; Digital Signature Guidelines Tutorial [online]; Feb. 10, 2002 [retrieved on Mar. 2, 2010]; American Bar Association Section of Science and Technology Information Security Committee; Retrieved from the internet: (URL: http://web.archive.org/web/20020210124615/www.abanet.org/scitech/ec/isc/dsg-tutorial.html; pp. 1-8.
Arends et al., DNS Security Introduction and Requirements, RFC 4033, Mar. 2005, 21 pages.
Ariyapperuma et al., "Security Vulnerabilities in DNS and DNSSEC." The Second International Conference on Availability, Reliability and Security, IEEE, 2007, 8 pages.
Armour et al.: "A Heuristic Algorithm and Simulation Approach to Relative Location of Facilities"; Management Science, vol. 9, No. 2 (Jan. 1963); pp. 294-309.
Baglioni et al., "Preprocessing and Mining Web Log Data for Web Personalization", LNAI 2829, 2003, pp. 237-249.
Barbir, A., et al., "Known Content Network (CN) Request-Routing Mechanisms", Request for Comments 3568, [online], IETF, Jul. 2003, [retrieved on Feb. 26, 2013], Retrieved from the Internet: (URL: http://tools.ietf.org/rfc/rfc3568.txt).
Bellovin, S., "Distributed Firewalls," ;login;:37-39, Nov. 1999, http://www.cs.columbia.edu/-smb/papers/distfw. html, 10 pages, retrieved Nov. 11, 2005.
Blaze, M., "Using the KeyNote Trust Management System," Mar. 1, 2001, from http://www.crypto.com/trustmgt/kn.html, 4 pages, retrieved May 17, 2006.
Brenton, C., "What is Egress Filtering and How Can I Implement It?—Egress Filtering v 0.2," Feb. 29, 2000, SANS Institute, http://www.sans.org/infosecFAQ/firewall/egress.htm, 6 pages.
Byun et al., "A Dynamic Grid Services Deployment Mechanism for On-Demand Resource Provisioning", IEEE International Symposium on Cluster Computing and the Grid:863-870, 2005.
Chandramouli et al., "Challenges in Securing the Domain Name System." IEEE Security & Privacy4.1 (2006),pp. 84-87.
Chipara et al, "Realtime Power-Aware Routing in Sensor Network", IEEE, 2006, 10 pages.
Clark, C., "Live Migration of Virtual Machines," May 2005, NSDI '05: 2nd Symposium on Networked Systems Design and Implementation, Boston, MA, May 2-4, 2005, retrieved from http://www.usenix.org/events/nsdi05/tech/full_papers/clark/clark.pdf, 14 pages.
Cohen et al., "Proactive Caching of DNS Records: Addressing a Performance Bottleneck", Proceedings of Saint 2001 Symposium On Applications and the Internet; 8-12, Jan. 8, 2001, IEEE Computer Society, pp. 85-94.
Coulson, D., "Network Security Iptables," Apr. 2003, Linuxpro, Part 2, retrieved from http://davidcoulson.net/writing/lxf/38/iptables.pdf, 4 pages.
Coulson, D., "Network Security Iptables," Mar. 2003, Linuxpro, Part 1, retrieved from http://davidcoulson.net/writing/lxf/39/iptables.pdf, 4 pages.
Deleuze, C., et al., A DNS Based Mapping Peering System for Peering CDNs, draft-deleuze-cdnp-dnsmap-peer-00.txt, Nov. 20, 2000, 20 pages.
Demers, A., "Epidemic Algorithms For Replicated Database Maintenance," 1987, Proceedings of the sixth annual ACM Symposium on Principles of Distributed Computing, Vancouver, British Columbia, Canada, Aug. 10-12, 1987, 12 pages.
Eastlake, Donald, Domain Name System Security Extensions, RFC 2535, Mar. 1999, 47 pages.
Frangoudis et al., "PTPv2-based network load estimation and its application to QoE monitoring for Over-the-Top services", IEEE, The 5th International conference on Information, Intelligence, Systems and Applications, IISA 2014, XP032629858, Jul. 7, 2014, pp. 176-181.
Gruener, J., "A Vision Of Togetherness," May 24, 2004, NetworkWorld, retrieved May 3, 2006, from, http://www.networkworld.com/supp/2004/ndc3/0524virt.html, 9 pages.
Gunther et al, "Measuring Round Trip Times to determine the Distance between WLAN Nodes",May 2005, In Proc. Of Networking 2005, all pages.
Gunther et al, "Measuring Round Trip Times to determine the Distance between WLAN Nodes", Dec. 18, 2004, Technical University Berlin, all pages.
Guo, F., Understanding Memory Resource Management in Vmware vSphere 5.0, Vmware, 2011, pp. 1-29.
Hameed, CC, "Disk Fragmentation and System Performance", Mar. 14, 2008, 3 pages.
Hartung et al.; Digital rights management and watermarking of multimedia content for m-commerce applications; Published in: Communications Magazine, IEEE (vol. 38, Issue: 11 ); Date of Publication: Nov. 2000; pp. 78-84; IEEE Xplore.
Horvath et al., "Enhancing Energy Efficiency in Multi-tier Web Server Clusters via Prioritization," in Parallel and Distributed Processing Symposium, 2007. IPDPS 2007. IEEE International, vol., No., pp. 1-6, Mar. 26-30, 2007.
Ioannidis, S., et al., "Implementing a Distributed Firewall," Nov. 2000, (ACM) Proceedings of the ACM Computer and Communications Security (CCS) 2000, Athens, Greece, pp. 190-199, retrieved from http://www.cis.upenn.edu/~dls/STRONGMAN/Papers/df.pdf, 10 pages.
JH Software, Moving a DNS Server to a New IP Address, last updated Jan. 26, 2006, 1 page.
Joseph, Joshy, et al., "Introduction to Grid Computing," Apr. 16, 2004, retrieved Aug. 30, 2007, from http://www.informit.com/articles/printerfriendly.aspx?p=169508, 19 pages.
Kalafut et al., Understanding Implications of DNS Zone Provisioning., Proceeding IMG '08 Proceedings of the 8th AMC SIGCOMM conference on Internet measurement., pp. 211-216., ACM New York, NY, USA., 2008.
Kato, Yoshinobu , Server load balancer—Difference in distribution technique and supported protocol—Focus on function to meet the needs, Nikkei Communications, Japan, Nikkei Business Publications, Inc., Mar. 20, 2000, vol. 314, pp. 114 to 123.
Kenshi, P., "Help File Library: Iptables Basics," Justlinux, retrieved Dec. 1, 2005, from http://www.justlinux.com/nhf/Security/Iptables _ Basics.html, 4 pages.
Krsul et al., "VMPlants: Providing and Managing Virtual Machine Execution Environments for Grid Computing", Nov. 6, 2004 (Nov. 6, 2004), Supercomputing, 2004. Proceedings Of The ACM/IEEE

(56) References Cited

OTHER PUBLICATIONS

SC2004 Conference Pittsburgh, PA, USA Nov. 6-12, 2004, Piscataway, NJ, USA, IEEE, 1730 Massachusetts Ave., NW Washington, DC 20036-1992 USA, 12 pages.
Liu, "The Ultimate Guide to Preventing DNS-based DDoS Attacks", Retrieved from http://www.infoworld.com/article/2612835/security/the-ultimate-guide-to-preventing-dns-based-ddos-attacks.html, Published Oct. 30, 2013.
Liu et al., "Combined mining of Web server logs and web contents for classifying user navigation patterns and predicting users' future requests," Data & Knowledge Engineering 61 (2007) pp. 304-330.
Maesono, et al., "A Local Scheduling Method considering Data Transfer in Data Grid," Technical Report of IEICE, vol. 104, No. 692, pp. 435-440, The Institute of Electronics, Information and Communication Engineers, Japan, Feb. 2005.
Meng et al., "Improving the Scalability of Data Center Networks with Traffic-Aware Virtual Machine Placement"; Proceedings of the 29th Conference on Information Communications, INFOCOM'10, pp. 1154-1162. Piscataway, NJ. IEEE Press, 2010.
Mulligan et al.; How DRM-based content delivery systems disrupt expectations of "personal use"; Published in: Proceeding DRM '03 Proceedings of the 3rd ACM workshop on Digital rights management; 2003; pp. 77-89; ACM Digital Library.
Ragan, "Three Types of DNS Attacks and How to Deal with Them", Retrieved from http://www.csoonline.com/article/2133916/malware-cybercrime/three-types-of-dns-attacks-and-how-to-deal-with-them.html, Published Aug. 28, 2013.
Shankland, S., "Sun to buy start-up to bolster N1 ," Jul. 30, 2003, CNet News.com, retrieved May 3, 2006, http://news.zdnet.com/2100-3513_22-5057752.html, 8 pages.
Sharif et al., "Secure In-VM Monitoring Using Hardware Virtualization", Microsoft, Oct. 2009 http://research.microsoft.com/pubs/153179/sim-ccs09.pdf; 11 pages.
Strand, L., "Adaptive distributed firewall using intrusion detection, Nov. 1, 2004, University of Oslo Department of Informatics," retrieved Mar. 8, 2006, from http://gnist.org/~lars/studies/master/StrandLars-master.pdf, 158 pages.
Takizawa, et al., "Scalable MultiReplication Framework on The Grid," Report of Study of Information Processing Society of Japan, Information Processing Society, vol. 2004, No. 81, pp. 247-252, Japan, Aug. 1, 2004.
Tan et al., "Classification: Basic Concepts, Decision Tree, and Model Evaluation", Introduction in Data Mining; http://www-users.cs.umn.edu/~kumar/dmbook/ch4.pdf, 2005, pp. 245-205.
Van Renesse, R., "Astrolabe: A Robust And Scalable Technology For Distributed System Monitoring, Management, And Data Mining," May 2003, ACM Transactions On Computer Systems (TOCS), 21 (2): 164-206, 43 pages.
Vijayan, J., "Terraspring Gives Sun's N1 a Boost," Nov. 25, 2002, Computerworld, retrieved May 3, 2006, from http://www.computerworld.com/printthis/2002/0,4814,76159,00.html, 3 pages.
Virtual Iron Software Home, Virtual Iron, retrieved May 3, 2006, from http://www.virtualiron.com/, 1 page.
Waldspurger, CA., "Spawn: A Distributed Computational Economy," Feb. 1992, IEEE Transactions on Software Engineering, 18(2): 103-117, 15 pages.
Watanabe, et al., "Remote Program Shipping System for GridRPC Systems," Report of Study of Information Processing Society of Japan, Information Processing Society, vol. 2003, No. 102, pp. 73-78, Japan, Oct. 16, 2003.
Xu et al., "Decision tree regression for soft classification of remote sensing data", Remote Sensing of Environment 97 (2005) pp. 322-336.
Yamagata, et al., "A virtual-machine based fast deployment tool for Grid execution environment," Report of Study of Information Processing Society of Japan, Information Processing Society, vol. 2006, No. 20, pp. 127-132, Japan, Feb. 28, 2006.
Zaman et al., "Combinatorial Auction-Based Dynamic VM Provisioning and Allocation in Clouds", Department of Computer Science, Wayne State University, Sep. 2011 http://www.cs.wayne.edu/-dgrosu/pub/ccgrid12-symp.pdf.
Zhao et al., "Distributed file system support for virtual machines in grid computing", Jun. 4, 2004 (Jun. 4, 2004), High Performance Distributed Computing, 2004. Proceedings. 13th IEEE International Symposium On Honolulu, HI, USA Jun. 4-6, 2004, Piscataway, NJ, USA, IEEE, pp. 202-211.
Zhu, Xiaoyun, et al., "Utility-Driven Workload Management Using Nested Control Design," Mar. 29, 2006, HP Laboratories Palo Alto, HPL-2005-193(R.1), retrieved Aug. 30, 2007, from http://www.hpl.hp.com/techreports/2005/HPL-2005-193R1.pdf, 9 pages.
Supplementary European Search Report in Application No. 09729072.0 2266064 dated Dec. 10, 2014.
Office Action in Application No. 09729072.0 dated May 14, 2018.
Office Action in Application No. 09729072.0 dated Dec. 7, 2018.
First Singapore Written Opinion in Application No. 201006836-9, dated Oct. 12, 2011 in 12 pages.
Singapore Written Opinion in Application No. 201006836-9, dated Apr. 30, 2012 in 10 pages.
First Office Action in Chinese Application No. 200980111422.3 dated Apr. 13, 2012.
First Office Action in Japanese Application No. 2011-502138 dated Feb. 1, 2013.
Singapore Written Opinion in Application No. 201006837-7, dated Oct. 12, 2011 in 11 pages.
Supplementary European Search Report in Application No. 09727694.3 dated Jan. 30, 2012 in 6 pages.
Singapore Examination Report in Application No. 201006837-7 dated Mar. 16, 2012.
First Office Action in Chinese Application No. 200980111426.1 dated Feb. 16, 2013.
Second Office Action in Chinese Application No. 200980111426.1 dated Dec. 25, 2013.
Third Office Action in Chinese Application No. 200980111426.1 dated Jul. 7, 2014.
Fourth Office Action in Chinese Application No. 200980111426.1 dated Jan. 15, 2015.
Fifth Office Action in Chinese Application No. 200980111426.1 dated Aug. 14, 2015.
First Office Action in Japanese Application No. 2011-502139 dated Nov. 5, 2013.
Decision of Rejection in Application No. 2011-502139 dated Jun. 30, 2014.
Office Action in Japanese Application No. 2011-502139 dated Aug. 17, 2015.
Office Action in Indian Application No. 5937/CHENP/2010 dated Jan. 19, 2018.
Singapore Written Opinion in Application No. 201006874-0, dated Oct. 12, 2011 in 10 pages.
First Office Action in Japanese Application No. 2011-502140 dated Dec. 7, 2012.
First Office Action in Chinese Application No. 200980119995.0 dated Jul. 6, 2012.
Second Office Action in Chinese Application No. 200980119995.0 dated Apr. 15, 2013.
Examination Report in Singapore Application No. 201006874-0 dated May 16, 2012.
Search Report in European Application No. 09839809.2 dated May 11, 2015.
Office Action in European Application No. 09839809.2 dated Dec. 8, 2016.
Office Action in Indian Application No. 6210/CHENP/2010 dated Mar. 27, 2018.
First Office Action in Chinese Application No. 200980119993.1 dated Jul. 4, 2012.
Second Office Action in Chinese Application No. 200980119993.1 dated Mar. 12, 2013.
Third Office Action in Chinese Application No. 200980119993.1 dated Oct. 21, 2013.
Supplementary European Search Report in Application No. 09728756.9 dated Jan. 8, 2013.
First Office Action in Japanese Application No. 2011-503091 dated Nov. 18, 2013.

(56) References Cited

OTHER PUBLICATIONS

Office Action in Japanese Application No. 2014-225580 dated Oct. 26, 2015.
Office Action in Japanese Application No. 2014-225580 dated Oct. 3, 2016.
Search Report and Written Opinion issued in Singapore Application No. 201006873-2 dated Oct. 12, 2011.
Examination Report in Indian Application No. 6213/CHENP/2010 dated May 23, 2018.
First Office Action is Chinese Application No. 200980125551.8 dated Jul. 4, 2012.
First Office Action in Japanese Application No. 2011-516466 dated Mar. 6, 2013.
Second Office Action in Japanese Application No. 2011-516466 dated Mar. 17, 2014.
Decision of Refusal in Japanese Application No. 2011-516466 dated Jan. 16, 2015.
Office Action in Japanese Application No. 2011-516466 dated May 30, 2016.
Office Action in Canadian Application No. 2726915 dated May 13, 2013.
First Office Action in Korean Application No. 10-2011-7002461 dated May 29, 2013.
First Office Action in Chinese Application No. 200980145872.4 dated Nov. 29, 2012.
First Office Action in Canadian Application No. 2741895 dated Feb. 25, 2013.
Second Office Action in Canadian Application No. 2741895 dated Oct. 21, 2013.
Partial Supplementary Search Report in European Application No. 09826977.2 dated Oct. 4, 2016.
Search Report and Written Opinion in Singapore Application No. 201103333-9 dated Nov. 19, 2012.
Examination Report in Singapore Application No. 201103333-9 dated Aug. 13, 2013.
Office Action in Chinese Application No. 201310717573.1 dated Jul. 29, 2016.
Office Action in European Application No. 11767118.0 dated Feb. 3, 2017.
Office Action in European Application No. 11767118.0 dated Jul. 25, 2018.
Office Action in European Application No. 11767118.0 dated Jan. 29, 2019.
International Search Report and Written Opinion in PCT/US2011/053302 dated Nov. 28, 2011 in 11 pages.
International Preliminary Report on Patentability in PCT/US2011/053302 dated Apr. 2, 2013.
First Office Action in Japanese Application No. 2013-529454 dated Feb. 3, 2014 in 6 pages.
Office Action in Japanese Application No. 2013-529454 dated Mar. 9, 2015 in 8 pages.
First Office Action issued in Australian Application No. 2011307319 dated Mar. 6, 2014 in 5 pages.
Search Report and Written Opinion in Singapore Application No. 201301573-0 dated Jul. 1, 2014.
First Office Action in Chinese Application No. 201180046104.0 dated Nov. 3, 2014.
Second Office Action in Chinese Application No. 201180046104.0 dated Sep. 29, 2015.
Third Office Action in Chinese Application No. 201180046104.0 dated Apr. 14, 2016.
Decision of Rejection in Chinese Application No. 201180046104.0 dated Oct. 17, 2016.
Examination Report in Singapore Application No. 201301573-0 dated Dec. 22, 2014.
Examination Report in Indian Application No. 3105/DELNP/2013, dated Feb. 19, 2019.
International Preliminary Report on Patentability in PCT/US2011/061486 dated May 22, 2013.
International Search Report and Written Opinion in PCT/US2011/061486 dated Mar. 30, 2012 in 11 pages.
Office Action in Canadian Application No. 2816612 dated Nov. 3, 2015.
Office Action in Canadian Application No. 2816612 dated Oct. 7, 2016.
Office Action in Canadian Application No. 2816612 dated Aug. 8, 2017.
First Office Action in Chinese Application No. 201180053405.6 dated Feb. 10, 2015.
Second Office Action in Chinese Application No. 201180053405.6 dated Dec. 4, 2015.
Office Action in Japanese Application No. 2013-540982 dated Jun. 2, 2014.
Written Opinion in Singapore Application No. 201303521-7 dated May 20, 2014.
Extended Search Report in European Application No. 18156163 dated Sep. 3, 2018.
Examination Report in Indian Application No. 4487/DELNP/2013 dated Dec. 28, 2018.
Office Action in Japanese Application No. 2015-533132 dated Apr. 25, 2016.
Office Action in Canadian Application No. 2884796 dated Apr. 28, 2016.
Office Action in Russian Application No. 2015114568 dated May 16, 2016.
Supplementary Examination Report in Singapore Application No. 11201501987U dated May 17, 2017.
Office Action in Chinese Application No. 2013800492635 dated Aug. 30, 2017.
Office Action in European Application No. 13770602.4 dated Mar. 11, 2019.
International Search Report and Written Opinion in PCT/US07/07601 dated Jul. 18, 2008 in 11 pages.
International Preliminary Report on Patentability in PCT/US2007/007601 dated Sep. 30, 2008 in 8 pages.
Supplementary European Search Report in Application No. 07754164.7 dated Dec. 20, 2010 in 7 pages.
Office Action in Chinese Application No. 200780020255.2 dated Mar. 4, 2013.
Office Action in Chinese Application No. 201310537815.9 dated Feb. 1, 2018.
Office Action in Indian Application No. 3742/KOLNP/2008 dated Nov. 22, 2013.
Office Action in Japanese Application No. 2012-052264 dated Dec. 11, 2012 in 26 pages.
Office Action in Japanese Application No. 2013-123086 dated Apr. 15, 2014 in 3 pages.
Office Action in Japanese Application No. 2013-123086 dated Dec. 2, 2014 in 4 pages.
Office Action in Japanese Application No. 2015-075644 dated Apr. 5, 2016.
Office Action in European Application No. 07754164.7 dated Dec. 14, 2015.
Office Action in European Application No. 07754164.7 dated Jan. 25, 2018.
Office Action in Chinese Application No. 201310537815.9 dated Jul. 5, 2016.
Office Action in Chinese Application No. 201310537815.9 dated Jun. 2, 2017.
International Search Report and Written Opinion in PCT/US/2016/066848 dated May 1, 2017.
International Preliminary Reporton Patentability in PCT/US/2016/066848 dated Jun. 19, 2018.
Partial Search Report in European Application No. 16876655.8 dated May 15, 2019.
International Search Report and Written Opinion in PCT/US2017/055156 dated Dec. 13, 2017.
International Preliminary Reporton Patentability and Written Opinion in PCT/US2017/055156 dated Apr. 9, 2019.
International Search Report and Written Opinion in PCT/US2018/036634 dated Sep. 11, 2018.

(56) References Cited

OTHER PUBLICATIONS

Extended Search Report in European Applicaton No. 19184826.6 dated Jan. 17, 2020.
Office Action in Indian Application No. 2823/DELNP/2015 dated Oct. 25, 2019.
Office Action in Brazilian Application No. BR112015005588-5 dated Jan. 14, 2020.
Extended European Search Report in Application No. 16876655.8 dated Aug. 20, 2019.
International Preliminary Report on Patentability and Written Opinion in PCT/US2018/036634 dated Dec. 24, 2019.
Office Action issued in connection with U.S. Appl. No. 12/059,997 dated Jun. 9, 2010.
Final Office Action issued in connection with U.S. Appl. No. 12/059,997 dated Jan. 7, 2011.
Notice of Allowance issued in connection with U.S. Appl. No. 12/059,997 dated Nov. 14, 2011.
Office Action issued in connection with U.S. Appl. No. 13/419,233 dated Jan. 9, 2014.
Final Office Action issued in connection with U.S. Appl. No. 13/419,233 dated Aug. 19, 2014.
Office Action issued in connection with U.S. Appl. No. 13/419,233 dated Jan. 2, 2015.
Final Office Action issued in connection with U.S. Appl. No. 13/419,233 dated Apr. 24, 2015.
Office Action issued in connection with U.S. Appl. No. 13/419,233 dated Aug. 28, 2015.
Final Office Action issued in connection with U.S. Appl. No. 13/419,233 dated Feb. 12, 2016.
Notice of Allowance issued in connection with U.S. Appl. No. 13/419,233 dated Jun. 22, 2016.
Office Action issued in connection with U.S. Appl. No. 12/060,013 dated Dec. 1, 2009.
Final Office Action issued in connection with U.S. Appl. No. 12/060,013 dated Aug. 23, 2010.
Notice of Allowance issued in connection with U.S. Appl. No. 12/060,013 dated Aug. 13, 2013.
Notice of Allowance issued in connection with U.S. Appl. No. 14/066,516 dated Aug. 25, 2014.
Office Action issued in connection with U.S. Appl. No. 14/548,221 dated Jun. 16, 2015.
Final Office Action issued in connection with U.S. Appl. No. 14/548,221 dated Nov. 23, 2015.
Notice of Allowance issued in connection with U.S. Appl. No. 14/548,221 dated Sep. 8, 2016.
Office Action issued in connection with U.S. Appl. No. 15/402,131 dated Sep. 20, 2017.
Final Office Action issued in connection with U.S. Appl. No. 15/402,131 dated Apr. 13, 2018.
Office Action issued in connection with U.S. Appl. No. 15/402,131 dated Sep. 17, 2018.
Final Office Action issued in connection with U.S. Appl. No. 15/402,131 dated Mar. 18, 2019.
Notice of Allowance issued in connection with U.S. Appl. No. 15/402,131 dated Aug. 8, 2019.
Office Action issued in connection with U.S. Appl. No. 12/060,015 dated Nov. 3, 2010.
Final Office Action issued in connection with U.S. Appl. No. 12/060,015 dated Mar. 31, 2011.
Office Action issued in connection with U.S. Appl. No. 12/060,015 dated Apr. 11, 2013.
Notice of Allowance issued in connection with U.S. Appl. No. 12/060,015 dated Aug. 9, 2013.
Office Action issued in connection with U.S. Appl. No. 14/078,274 dated May 5, 2015.
Notice of Allowance issued in connection with U.S. Appl. No. 14/078,274 dated Aug. 21, 2015.
Office Action issued in connection with U.S. Appl. No. 14/886,937 dated Sep. 29, 2016.
Final Office Action issued in connection with U.S. Appl. No. 14/886,937 dated Feb. 9, 2017.
Office Action issued in connection with U.S. Appl. No. 14/886,937 dated May 26, 2017.
Final Office Action issued in connection with U.S. Appl. No. 14/886,937 dated Sep. 15, 2017.
Office Action issued in connection with U.S. Appl. No. 14/886,937 dated Jan. 8, 2018.
Final Office Action issued in connection with U.S. Appl. No. 14/886,937 dated Jun. 20, 2018.
Notice of Allowance issued in connection with U.S. Appl. No. 14/886,937 dated Aug. 15, 2018.
Office Action issued in connection with U.S. Appl. No. 16/221,176 dated Jan. 6, 2020.
Office Action issued in connection with U.S. Appl. No. 12/060,143 dated Jun. 24, 2010.
Final Office Action issued in connection with U.S. Appl. No. 12/060,143 dated Feb. 4, 2011.
Office Action issued in connection with U.S. Appl. No. 12/060,143 dated Jul. 20, 2012.
Notice of Allowance issued in connection with U.S. Appl. No. 12/060,143 dated Jan. 25, 2013.
Office Action issued in connection with U.S. Appl. No. 14/693,819 dated Oct. 27, 2015.
Final Office Action issued in connection with U.S. Appl. No. 14/693,819 dated Feb. 16, 2016.
Office Action issued in connection with U.S. Appl. No. 14/693,819 dated Jun. 17, 2016.
Final Office Action issued in connection with U.S. Appl. No. 14/693,819 dated Nov. 4, 2016.
Office Action issued in connection with U.S. Appl. No. 14/693,819 dated May 11, 2017.
Notice of Allowance issued in connection with U.S. Appl. No. 14/693,819 dated Dec. 10, 2017.
Office Action issued in connection with U.S. Appl. No. 15/891,176 dated Jun. 15, 2018.
Final Office Action issued in connection with U.S. Appl. No. 15/891,176 dated Dec. 20, 2018.
Office Action issued in connection with U.S. Appl. No. 15/891,176 dated May 31, 2019.
Final Office Action issued in connection with U.S. Appl. No. 15/891,176 dated Sep. 19, 2019.
Notice of Allowance issued in connection with U.S. Appl. No. 15/891,176 dated Jan. 8, 2020.
Office Action issued in connection with U.S. Appl. No. 13/897,027 dated Aug. 20, 2014.
Notice of Allowance issued in connection with U.S. Appl. No. 13/897,027 dated Jan. 22, 2015.
Office Action issued in connection with U.S. Appl. No. 12/060,124 dated Jul. 12, 2010.
Notice of Allowance issued in connection with U.S. Appl. No. 12/060,124 dated Feb. 23, 2011.
Notice of Allowance issued in connection with U.S. Appl. No. 13/170,102 dated Aug. 8, 2011.
Office Action issued in connection with U.S. Appl. No. 13/296,189 dated Feb. 22, 2012.
Notice of Allowance issued in connection with U.S. Appl. No. 13/296,189 dated May 11, 2012.
Office Action issued in connection with U.S. Appl. No. 3/614,714 dated Nov. 27, 2012.
Notice of Allowance issued in connection with U.S. Appl. No. 13/614,714 dated Jan. 10, 2013.
Office Action issued in connection with U.S. Appl. No. 13/888,283 dated Mar. 18, 2014.
Office Action issued in connection with U.S. Appl. No. 13/888,283 dated Sep. 15, 2014.
Notice of Allowance issued in connection with U.S. Appl. No. 13/888,283 dated Dec. 17, 2014.
Office Action issued in connection with U.S. Appl. No. 14/639,933 dated Aug. 17, 2015.
Notice of Allowance issued in connection with U.S. Appl. No. 14/639,933 dated Jan. 14, 2016.

(56) References Cited

OTHER PUBLICATIONS

Office Action issued in connection with U.S. Appl. No. 15/139,239 dated Aug. 25, 2016.
Notice of Allowance issued in connection with U.S. Appl. No. 15/139,239 dated Dec. 12, 2016.
Office Action issued in connection with U.S. Appl. No. 15/483,659 dated Aug. 31, 2017.
Notice of Allowance issued in connection with U.S. Appl. No. 15/483,659 dated Oct. 17, 2017.
Office Action issued in connection with U.S. Appl. No. 15/891,995 dated May 9, 2018.
Notice of Allowance issued in connection with U.S. Appl. No. 15/891,995 dated Aug. 9, 2018.
Office Action issued in connection with U.S. Appl. No. 16/222,389 dated May 1, 2019.
Notice of Allowance issued in connection with U.S. Appl. No. 16/222,389 dated Aug. 28, 2019.
Office Action issued in connection with U.S. Appl. No. 12/060,173 dated Jul. 8, 2010.
Notice of Allowance issued in connection with U.S. Appl. No. 12/060,173 dated Feb. 1, 2011.
Office Action issued in connection with U.S. Appl. No. 13/098,366 dated Aug. 8, 2011.
Notice of Allowance issued in connection with U.S. Appl. No. 13/098,366 dated Nov. 7, 2011.
Office Action issued in connection with U.S. Appl. No. 13/418,239 dated Aug. 8, 2012.
Notice of Allowance issued in connection with U.S. Appl. No. 13/418,239 dated Oct. 16, 2012.
Office Action issued in connection with U.S. Appl. No. 13/766,574 dated Sep. 6, 2013.
Notice of Allowance issued in connection with U.S. Appl. No. 13/766,574 dated Dec. 23, 2013.
Office Action issued in connection with U.S. Appl. No. 14/263,824 dated Jul. 15, 2016.
Notice of Allowance issued in connection with U.S. Appl. No. 14/263,824 dated Oct. 18, 2016.
Office Action issued in connection with U.S. Appl. No. 15/408,362 dated May 8, 2017.
Notice of Allowance issued in connection with U.S. Appl. No. 15/408,362 dated Oct. 5, 2017.
Office Action issued in connection with U.S. Appl. No. 15/888,860 dated May 9, 2018.
Notice of Allowance issued in connection with U.S. Appl. No. 15/888,860 dated Aug. 10, 2018.
Office Action issued in connection with U.S. Appl. No. 16/405,779 dated Sep. 6, 2019.
Office Action issued in connection with U.S. Appl. No. 12/060,202 dated May 13, 2010.
Final Office Action issued in connection with U.S. Appl. No. 12/060,202 dated Nov. 9, 2010.
Office Action issued in connection with U.S. Appl. No. 12/060,202 dated Jan. 19, 2012.
Final Office Action issued in connection with U.S. Appl. No. 12/060,202 dated Jun. 28, 2012.
Notice of Allowance issued in connection with U.S. Appl. No. 12/060,202 dated Jun. 7, 2013.
Office Action issued in connection with U.S. Appl. No. 14/012,387 dated Jan. 5, 2015.
Final Office Action issued in connection with U.S. Appl. No. 14/012,387 dated Jun. 8, 2015.
Notice of Allowance issued in connection with U.S. Appl. No. 14/012,387 dated Aug. 14, 2015.
Office Action issued in connection with U.S. Appl. No. 14/961,343 dated Jul. 28, 2016.
Final Office Action issued in connection with U.S. Appl. No. 14/961,343 dated Jan. 19, 2017.
Office Action issued in connection with U.S. Appl. No. 14/961,343 dated Jun. 21, 2017.
Notice of Allowance issued in connection with U.S. Appl. No. 14/961,343 dated Oct. 10, 2017.
Office Action issued in connection with U.S. Appl. No. 12/060,213 dated Jun. 17, 2010.
Final Office Action issued in connection with U.S. Appl. No. 12/060,213 dated Nov. 10, 2010.
Office Action issued in connection with U.S. Appl. No. 12/060,213 dated Mar. 22, 2012.
Notice of Allowance issued in connection with U.S. Appl. No. 12/060,213 dated Jul. 20, 2012.
Notice of Allowance issued in connection with U.S. Appl. No. 13/720,955 dated Sep. 10, 2013.
Office Action issued in connection with U.S. Appl. No. 13/793,886 dated Nov. 7, 2013.
Notice of Allowance issued in connection with U.S. Appl. No. 13/793,886 dated Feb. 19, 2014.
Notice of Allowance issued in connection with U.S. Appl. No. 14/165,329 dated Apr. 11, 2016.
Office Action issued in connection with U.S. Appl. No. 13/621,084 dated May 30, 2014.
Final Office Action issued in connection with U.S. Appl. No. 13/621,084 dated Oct. 23, 2014.
Office Action issued in connection with U.S. Appl. No. 13/621,084 dated Feb. 11, 2015.
Final Office Action issued in connection with U.S. Appl. No. 13/621,084 dated Jun. 16, 2015.
Office Action issued in connection with U.S. Appl. No. 13/621,084 dated Nov. 6, 2015.
Final Office Action issued in connection with U.S. Appl. No. 13/621,084 dated Mar. 4, 2016.
Office Action issued in connection with U.S. Appl. No. 13/621,084 dated Sep. 21, 2016.
Final Office Action issued in connection with U.S. Appl. No. 13/621,084 dated Feb. 15, 2017.
Office Action issued in connection with U.S. Appl. No. 13/621,084 dated Jun. 22, 2017.
Final Office Action issued in connection with U.S. Appl. No. 13/621,084 dated Oct. 27, 2017.
Office Action issued in connection with U.S. Appl. No. 13/621,084 dated Apr. 4, 2018.
Final Office Action issued in connection with U.S. Appl. No. 13/621,084 dated Sep. 11, 2018.
Office Action issued in connection with U.S. Appl. No. 13/621,084 dated Mar. 19, 2019.
Final Office Action issued in connection with U.S. Appl. No. 13/621,084 dated Aug. 14, 2019.
Office Action issued in connection with U.S. Appl. No. 13/621,085 dated May 15, 2014.
Final Office Action issued in connection with U.S. Appl. No. 13/621,085 dated Oct. 23, 2014.
Office Action issued in connection with U.S. Appl. No. 13/621,085 dated Mar. 26, 2015.
Final Office Action issued in connection with U.S. Appl. No. 13/621,085 dated Jul. 10, 2015.
Office Action issued in connection with U.S. Appl. No. 13/621,085 dated Dec. 4, 2015.
Final Office Action issued in connection with U.S. Appl. No. 13/621,085 dated Apr. 4, 2016.
Office Action issued in connection with U.S. Appl. No. 13/621,085 dated Sep. 30, 2016.
Final Office Action issued in connection with U.S. Appl. No. 13/621,085 dated Feb. 28, 2017.
Office Action issued in connection with U.S. Appl. No. 13/621,085 dated Jul. 13, 2017.
Final Office Action issued in connection with U.S. Appl. No. 13/621,085 dated Jan. 19, 2018.
Office Action issued in connection with U.S. Appl. No. 13/621,085 dated Aug. 9, 2018.
Final Office Action issued in connection with U.S. Appl. No. 13/621,085 dated Jan. 18, 2019.
Notice of Allowance issued in connection with U.S. Appl. No. 13/621,085 dated Sep. 25, 2019.

(56) References Cited

OTHER PUBLICATIONS

Office Action issued in connection with U.S. Appl. No. 12/189,019 dated Jul. 30, 2010.
Office Action issued in connection with U.S. Appl. No. 12/189,019 dated Feb. 8, 2011.
Final Office Action issued in connection with U.S. Appl. No. 12/189,019 dated Aug. 19, 2011.
Notice of Allowance issued in connection with U.S. Appl. No. 12/189,019 dated Nov. 5, 2012.
Office Action issued in connection with U.S. Appl. No. 12/956,823 dated Aug. 5, 2011.
Final Office Action issued in connection with U.S. Appl. No. 12/956,823 dated Jan. 6, 2012.
Notice of Allowance issued in connection with U.S. Appl. No. 12/956,823 dated Sep. 18, 2012.
Office Action issued in connection with U.S. Appl. No. 12/956,647 dated Aug. 5, 2011.
Office Action issued in connection with U.S. Appl. No. 12/956,647 dated Jan. 13, 2012.
Notice of Allowance issued in connection with U.S. Appl. No. 12/956,647 dated Nov. 9, 2012.
Office Action issued in connection with U.S. Appl. No. 12/956,748 dated Jun. 23, 2011.
Final Office Action issued in connection with U.S. Appl. No. 12/956,748 dated Nov. 10, 2011.
Notice of Allowance issued in connection with U.S. Appl. No. 12/956,748 dated Nov. 6, 2012.
Office Action issued in connection with U.S. Appl. No. 12/596,566 dated Jul. 8, 2011.
Final Office Action issued in connection with U.S. Appl. No. 12/596,566 dated Jan. 5, 2012.
Notice of Allowance issued in connection with U.S. Appl. No. 12/596,566 dated Oct. 2, 2012.
Office Action issued in connection with U.S. Appl. No. 12/165,343 dated Mar. 22, 2010.
Notice of Allowance issued in connection with U.S. Appl. No. 12/165,343 dated Dec. 21, 2010.
Office Action issued in connection with U.S. Appl. No. 13/568,005 dated Nov. 5, 2012.
Notice of Allowance issued in connection with U.S. Appl. No. 13/568,005 dated Mar. 19, 2013.
Office Action issued in connection with U.S. Appl. No. 13/896,840 dated Sep. 23, 2014.
Notice of Allowance issued in connection with U.S. Appl. No. 13/896,840 dated Jan. 5, 2015.
Office Action issued in connection with U.S. Appl. No. 14/683,019 dated Aug. 11, 2015.
Final Office Action issued in connection with U.S. Appl. No. 14/683,019 dated Dec. 4, 2015.
Office Action issued in connection with U.S. Appl. No. 14/683,019 dated May 9, 2016.
Final Office Action issued in connection with U.S. Appl. No. 14/683,019 dated Sep. 15, 2016.
Notice of Allowance issued in connection with U.S. Appl. No. 14/683,019 dated Nov. 25, 2016.
Office Action issued in connection with U.S. Appl. No. 13/042,301 dated Aug. 24, 2011.
Notice of Allowance issued in connection with U.S. Appl. No. 13/042,301 dated Apr. 2, 2012.
Office Action issued in connection with U.S. Appl. No. 12/412,456 dated May 16, 2011.
Final Office Action issued in connection with U.S. Appl. No. 12/412,456 dated Mar. 12, 2012.
Notice of Allowance issued in connection with U.S. Appl. No. 12/412,456 dated Feb. 12, 2014.
Office Action issued in connection with U.S. Appl. No. 13/909,882 dated Aug. 21, 2014.
Final Office Action issued in connection with U.S. Appl. No. 13/909,882 dated Jan. 14, 2015.
Notice of Allowance issued in connection with U.S. Appl. No. 13/909,882 dated Mar. 24, 2015.
Office Action issued in connection with U.S. Appl. No. 14/010,438 dated Sep. 11, 2014.
Notice of Allowance issued in connection with U.S. Appl. No. 14/010,438 dated Dec. 11, 2014.
Office Action issued in connection with U.S. Appl. No. 14/297,558 dated Sep. 30, 2014.
Final Office Action issued in connection with U.S. Appl. No. 14/297,558 dated Apr. 7, 2015.
Notice of Allowance issued in connection with U.S. Appl. No. 14/297,558 dated Jul. 21, 2015.
Office Action issued in connection with U.S. Appl. No. 14/630,516 dated Nov. 3, 2016.
Office Action issued in connection with U.S. Appl. No. 14/630,516 dated May 8, 2017.
Final Office Action issued in connection with U.S. Appl. No. 14/630,516 dated Nov. 9, 2017.
Office Action issued in connection with U.S. Appl. No. 14/630,516 dated Apr. 5, 2018.
Notice of Allowance issued in connection with U.S. Appl. No. 14/630,516 dated Nov. 2, 2018.
Office Action issued in connection with U.S. Appl. No. 14/718,037 dated Oct. 26, 2016.
Office Action issued in connection with U.S. Appl. No. 14/718,037 dated May 5, 2017.
Final Office Action issued in connection with U.S. Appl. No. 14/718,037 dated Nov. 9, 2017.
Office Action issued in connection with U.S. Appl. No. 14/718,037 dated Mar. 28, 2018.
Office Action issued in connection with U.S. Appl. No. 14/718,037 dated Oct. 29, 2018.
Final Office Action issued in connection with U.S. Appl. No. 14/718,037 dated Apr. 25, 2019.
Notice of Allowance issued in connection with U.S. Appl. No. 14/718,037 dated Oct. 17, 2019.
Office Action issued in connection with U.S. Appl. No. 14/935,228 dated Mar. 8, 2018.
Final Office Action issued in connection with U.S. Appl. No. 14/935,228 dated Sep. 12, 2018.
Notice of Allowance issued in connection with U.S. Appl. No. 14/935,228 dated Dec. 11, 2018.
Office Action issued in connection with U.S. Appl. No. 12/412,467 dated May 22, 2013.
Notice of Allowance issued in connection with U.S. Appl. No. 12/412,467 dated Nov. 8, 2013.
Office Action issued in connection with U.S. Appl. No. 13/621,062 dated Dec. 5, 2012.
Notice of Allowance issued in connection with U.S. Appl. No. 13/621,062 dated Feb. 22, 2013.
Office Action issued in connection with U.S. Appl. No. 13/621,066 dated Feb. 14, 2013.
Notice of Allowance issued in connection with U.S. Appl. No. 13/621,066 dated May 8, 2013.
Office Action issued in connection with U.S. Appl. No. 12/485,783 dated Aug. 30, 2012.
Office Action issued in connection with U.S. Appl. No. 12/485,783 dated Mar. 26, 2013.
Final Office Action issued in connection with U.S. Appl. No. 12/485,783 dated Oct. 7, 2013.
Notice of Allowance issued in connection with U.S. Appl. No. 12/485,783 dated Mar. 31, 2014.
Office Action issued in connection with U.S. Appl. No. 14/331,067 dated Nov. 26, 2014.
Final Office Action issued in connection with U.S. Appl. No. 14/331,067 dated Apr. 27, 2015.
Notice of Allowance issued in connection with U.S. Appl. No. 14/331,067 dated Jul. 7, 2015.
Office Action issued in connection with U.S. Appl. No. 14/871,872 dated Apr. 11, 2016.
Final Office Action issued in connection with U.S. Appl. No. 14/871,872 dated Oct. 17, 2016.

(56) References Cited

OTHER PUBLICATIONS

Office Action issued in connection with U.S. Appl. No. 14/871,872 dated Feb. 10, 2017.
Final Office Action issued in connection with U.S. Appl. No. 14/871,872 dated Aug. 8, 2017.
Office Action issued in connection with U.S. Appl. No. 14/871,872 dated Feb. 7, 2018.
Notice of Allowance issued in connection with U.S. Appl. No. 14/871,872 dated Aug. 15, 2018.
Office Action issued in connection with U.S. Appl. No. 14/297,558 dated Jan. 3, 2019.
Notice of Allowance issued in connection with U.S. Appl. No. 14/297,558 dated May 8, 2019.
Office Action issued in connection with U.S. Appl. No. 13/620,868 dated Nov. 23, 2012.
Notice of Allowance issued in connection with U.S. Appl. No. 13/620,868 dated Apr. 15, 2013.
Office Action issued in connection with U.S. Appl. No. 12/412,431 dated Mar. 8, 2012.
Office Action issued in connection with U.S. Appl. No. 12/412,431 dated Nov. 23, 2012.
Notice of Allowance issued in connection with U.S. Appl. No. 12/412,431 dated May 10, 2013.
Office Action issued in connection with U.S. Appl. No. 13/973,883 dated Oct. 23, 2015.
Final Office Action issued in connection with U.S. Appl. No. 13/973,883 dated May 5, 2016.
Office Action issued in connection with U.S. Appl. No. 13/973,883 dated Sep. 30, 2016.
Final Office Action issued in connection with U.S. Appl. No. 13/973,883 dated Apr. 18, 2017.
Notice of Allowance issued in connection with U.S. Appl. No. 13/973,883 dated Nov. 20, 2019.
Office Action issued in connection with U.S. Appl. No. 12/272,681 dated Nov. 26, 2010.
Final Office Action issued in connection with U.S. Appl. No. 12/272,681 dated Apr. 27, 2011.
Office Action issued in connection with U.S. Appl. No. 12/272,681 dated Oct. 11, 2012.
Notice of Allowance issued in connection with U.S. Appl. No. 12/272,681 dated Apr. 18, 2013.
Office Action issued in connection with U.S. Appl. No. 14/010,461 dated May 2, 2014.
Final Office Action issued in connection with U.S. Appl. No. 14/010,461 dated Oct. 9, 2014.
Office Action issued in connection with U.S. Appl. No. 14/010,461 dated Jan. 15, 2015.
Final Office Action issued in connection with U.S. Appl. No. 14/010,461 dated Jul. 9, 2015.
Notice of Allowance issued in connection with U.S. Appl. No. 14/010,461 dated Oct. 7, 2015.
Office Action issued in connection with U.S. Appl. No. 15/003,699 dated Jul. 8, 2016.
Notice of Allowance issued in connection with U.S. Appl. No. 15/003,699 dated Nov. 4, 2016.
Office Action issued in connection with U.S. Appl. No. 12/272,666 dated Feb. 23, 2011.
Notice of Allowance issued in connection with U.S. Appl. No. 12/272,666 dated Aug. 25, 2011.
Office Action issued in connection with U.S. Appl. No. 13/296,156 dated May 15, 2012.
Notice of Allowance issued in connection with U.S. Appl. No. 13/296,156 dated Jun. 8, 2012.
Office Action issued in connection with U.S. Appl. No. 13/620,945 dated Dec. 13, 2012.
Notice of Allowance issued in connection with U.S. Appl. No. 13/620,945 dated May 1, 2013.
Office Action issued in connection with U.S. Appl. No. 13/948,087 dated Feb. 10, 2016.
Office Action issued in connection with U.S. Appl. No. 12/412,443 dated Mar. 15, 2012.
Notice of Allowance issued in connection with U.S. Appl. No. 12/412,443 dated Nov. 27, 2012.
Office Action issued in connection with U.S. Appl. No. 13/829,586 dated May 28, 2015.
Notice of Allowance issued in connection with U.S. Appl. No. 13/829,586 dated Sep. 15, 2015.
Office Action issued in connection with U.S. Appl. No. 14/942,728 dated Feb. 28, 2017.
Final Office Action issued in connection with U.S. Appl. No. 14/942,728 dated Aug. 15, 2017.
Office Action issued in connection with U.S. Appl. No. 14/942,728 dated Dec. 29, 2017.
Final Office Action issued in connection with U.S. Appl. No. 14/942,728 dated Jul. 27, 2018.
Office Action issued in connection with U.S. Appl. No. 14/942,728 dated Mar. 1, 2019.
Notice of Allowance issued in connection with U.S. Appl. No. 14/942,728 dated Jul. 31, 2019.
Office Action issued in connection with U.S. Appl. No. 12/272,687 dated Sep. 9, 2010.
Office Action issued in connection with U.S. Appl. No. 12/272,687 dated Feb. 3, 2011.
Notice of Allowance issued in connection with U.S. Appl. No. 12/272,687 dated May 27, 2011.
Notice of Allowance issued in connection with U.S. Appl. No. 12/272,687 dated Aug. 17, 2012.
Office Action issued in connection with U.S. Appl. No. 14/886,937 dated Nov. 9, 2012.
Final Office Action issued in connection with U.S. Appl. No. 14/886,937 dated Jan. 10, 2013.
Notice of Allowance issued in connection with U.S. Appl. No. 14/886,937 dated Mar. 21, 2013.
Office Action issued in connection with U.S. Appl. No. 13/908,830 dated Sep. 23, 2014.
Notice of Allowance issued in connection with U.S. Appl. No. 13/908,830 dated Dec. 15, 2014.
Office Action issued in connection with U.S. Appl. No. 14/631,556 dated Aug. 23, 2016.
Final Office Action issued in connection with U.S. Appl. No. 14/631,556 dated Jan. 26, 2017.
Office Action issued in connection with U.S. Appl. No. 14/631,556 dated May 26, 2017.
Final Office Action issued in connection with U.S. Appl. No. 14/631,556 dated Dec. 21, 2017.
Notice of Allowance issued in connection with U.S. Appl. No. 14/631,556 dated Feb. 22, 2018.
Office Action issued in connection with U.S. Appl. No. 15/993,109 dated Jun. 26, 2019.
Notice of Allowance issued in connection with U.S. Appl. No. 15/993,109 dated Aug. 19, 2019.
Office Action issued in connection with U.S. Appl. No. 12/272,655 dated Mar. 4, 2011.
Final Office Action issued in connection with U.S. Appl. No. 12/272,655 dated Oct. 28, 2011.
Notice of Allowance issued in connection with U.S. Appl. No. 12/272,655 dated Jan. 16, 2014.
Office Action issued in connection with U.S. Appl. No. 14/281,165 dated Aug. 5, 2015.
Final Office Action issued in connection with U.S. Appl. No. 14/281,165 dated Feb. 16, 2016.
Office Action issued in connection with U.S. Appl. No. 14/281,165 dated Jun. 23, 2016.
Final Office Action issued in connection with U.S. Appl. No. 14/281,165 dated Dec. 30, 2016.
Notice of Allowance issued in connection with U.S. Appl. No. 14/281,165 dated Apr. 24, 2017.
Office Action issued in connection with U.S. Appl. No. 12/272,699 dated Dec. 14, 2010.
Notice of Allowance issued in connection with U.S. Appl. No. 12/272,699 dated Jul. 25, 2011.

(56) References Cited

OTHER PUBLICATIONS

Office Action issued in connection with U.S. Appl. No. 13/299,169 dated Feb. 3, 2012.
Notice of Allowance issued in connection with U.S. Appl. No. 13/299,169 dated Mar. 27, 2012.
Office Action issued in connection with U.S. Appl. No. 13/567,429 dated Nov. 16, 2012.
Notice of Allowance issued in connection with U.S. Appl. No. 13/567,429 dated Jul. 25, 2013.
Office Action issued in connection with U.S. Appl. No. 14/062,614 dated Jul. 6, 2015.
Final Office Action issued in connection with U.S. Appl. No. 14/062,614 dated Jan. 6, 2016.
Office Action issued in connection with U.S. Appl. No. 14/062,614 dated Apr. 22, 2016.
Notice of Allowance issued in connection with U.S. Appl. No. 14/062,614 dated Aug. 16, 2016.
Office Action issued in connection with U.S. Appl. No. 15/369,758 dated Feb. 28, 2017.
Notice of Allowance issued in connection with U.S. Appl. No. 15/369,758 dated Jun. 5, 2017.
Office Action issued in connection with U.S. Appl. No. 15/682,383 dated Mar. 9, 2018.
Notice of Allowance issued in connection with U.S. Appl. No. 15/682,383 dated Jul. 17, 2018.
Office Action issued in connection with U.S. Appl. No. 12/272,683 dated Sep. 9, 2010.
Final Office Action issued in connection with U.S. Appl. No. 12/272,683 dated Jan. 14, 2011.
Notice of Allowance issued in connection with U.S. Appl. No. 12/272,683 dated Mar. 18, 2011.
Notice of Allowance issued in connection with U.S. Appl. No. 13/165,484 dated Mar. 22, 2012.
Office Action issued in connection with U.S. Appl. No. 13/529,831 dated Oct. 4, 2012.
Notice of Allowance issued in connection with U.S. Appl. No. 13/529,831 dated Dec. 13, 2012.
Office Action issued in connection with U.S. Appl. No. 13/829,518 dated Sep. 19, 2014.
Notice of Allowance issued in connection with U.S. Appl. No. 13/829,518 dated Jan. 15, 2015.
Office Action issued in connection with U.S. Appl. No. 14/673,743 dated Aug. 23, 2016.
Final Office Action issued in connection with U.S. Appl. No. 14/673,743 dated Jan. 5, 2017.
Office Action issued in connection with U.S. Appl. No. 14/673,743 dated May 5, 2017.
Final Office Action issued in connection with U.S. Appl. No. 14/673,743 dated Nov. 9, 2017.
Notice of Allowance issued in connection with U.S. Appl. No. 14/673,743 dated Mar. 27, 2018.
Office Action issued in connection with U.S. Appl. No. 16/018,507 dated Nov. 19, 2019.
Office Action issued in connection with U.S. Appl. No. 12/272,715 dated Jan. 24, 2011.
Final Office Action issued in connection with U.S. Appl. No. 12/272,715 dated Jun. 28, 2011.
Notice of Allowance issued in connection with U.S. Appl. No. 12/272,715 dated Oct. 21, 2011.
Office Action issued in connection with U.S. Appl. No. 13/358,478 dated Apr. 26, 2012.
Final Office Action issued in connection with U.S. Appl. No. 13/358,478 dated Oct. 12, 2012.
Office Action issued in connection with U.S. Appl. No. 13/358,478 dated Mar. 28, 2013.
Final Office Action issued in connection with U.S. Appl. No. 13/358,478 dated Sep. 11, 2013.
Notice of Allowance issued in connection with U.S. Appl. No. 13/358,478 dated Apr. 2, 2014.
Office Action issued in connection with U.S. Appl. No. 14/337,021 dated Jun. 30, 2016.
Final Office Action issued in connection with U.S. Appl. No. 14/337,021 dated Jan. 6, 2017.
Notice of Allowance issued in connection with U.S. Appl. No. 14/337,021 dated Jan. 16, 2018.
Office Action issued in connection with U.S. Appl. No. 15/923,732 dated Oct. 3, 2018.
Final Office Action issued in connection with U.S. Appl. No. 15/923,732 dated May 1, 2019.
Office Action issued in connection with U.S. Appl. No. 15/923,732 dated Sep. 6, 2019.
Office Action issued in connection with U.S. Appl. No. 12/272,641 dated Feb. 23, 2011.
Notice of Allowance issued in connection with U.S. Appl. No. 12/272,641 dated Aug. 25, 2011.
Office Action issued in connection with U.S. Appl. No. 13/299,229 dated May 7, 2012.
Office Action issued in connection with U.S. Appl. No. 13/299,229 dated May 16, 2012.
Notice of Allowance issued in connection with U.S. Appl. No. 13/299,229 dated Jun. 6, 2012.
Office Action issued in connection with U.S. Appl. No. 13/614,971 dated Dec. 13, 2012.
Notice of Allowance issued in connection with U.S. Appl. No. 13/614,971 dated May 31, 2013.
Office Action issued in connection with U.S. Appl. No. 13/964,973 dated Feb. 11, 2016.
Notice of Allowance issued in connection with U.S. Appl. No. 13/964,973 dated May 19, 2016.
Office Action issued in connection with U.S. Appl. No. 12/722,454 dated May 31, 2012.
Notice of Allowance issued in connection with U.S. Appl. No. 12/722,454 dated Nov. 26, 2012.
Notice of Allowance issued in connection with U.S. Appl. No. 13/794,415 dated Apr. 14, 2015.
Office Action issued in connection with U.S. Appl. No. 14/800,591 dated Oct. 6, 2016.
Notice of Allowance issued in connection with U.S. Appl. No. 14/800,591 dated Mar. 24, 2017.
Notice of Allowance issued in connection with U.S. Appl. No. 15/597,841 dated Jul. 16, 2018.
Office Action issued in connection with U.S. Appl. No. 16/195,628 dated Dec. 31, 2019.
Office Action issued in connection with U.S. Appl. No. 12/892,777 dated Mar. 22, 2013.
Final Office Action issued in connection with U.S. Appl. No. 12/892,777 dated Jan. 30, 2014.
Office Action issued in connection with U.S. Appl. No. 12/892,777 dated Mar. 25, 2015.
Final Office Action issued in connection with U.S. Appl. No. 12/892,777 dated Oct. 5, 2015.
Office Action issued in connection with U.S. Appl. No. 12/892,777 dated Apr. 6, 2016.
Final Office Action issued in connection with U.S. Appl. No. 12/892,777 dated Oct. 4, 2016.
Notice of Allowance issued in connection with U.S. Appl. No. 12/892,777 dated Mar. 27, 2017.
Office Action issued in connection with U.S. Appl. No. 15/604,451 dated Oct. 5, 2017.
Final Office Action issued in connection with U.S. Appl. No. 15/604,451 dated May 17, 2018.
Office Action issued in connection with U.S. Appl. No. 15/604,451 dated Jan. 22, 2019.
Final Office Action issued in connection with U.S. Appl. No. 15/604,451 dated Sep. 19, 2019.
Office Action issued in connection with U.S. Appl. No. 12/892,794 dated Jul. 23, 2012.
Final Office Action issued in connection with U.S. Appl. No. 12/892,764 dated Feb. 15, 2013.
Office Action issued in connection with U.S. Appl. No. 12/892,794 dated Jul. 24, 2014.

(56) References Cited

OTHER PUBLICATIONS

Final Office Action issued in connection with U.S. Appl. No. 12/892,794 dated Feb. 13, 2015.
Office Action issued in connection with U.S. Appl. No. 12/892,794 dated Sep. 18, 2015.
Final Office Action issued in connection with U.S. Appl. No. 12/892,794 dated Mar. 24, 2016.
Office Action issued in connection with U.S. Appl. No. 12/892,794 dated Jan. 12, 2017.
Final Office Action issued in connection with U.S. Appl. No. 12/892,794 dated May 5, 2017.
Office Action issued in connection with U.S. Appl. No. 12/892,794 dated Oct. 5, 2017.
Final Office Action issued in connection with U.S. Appl. No. 12/892,794 dated May 18, 2018.
Office Action issued in connection with U.S. Appl. No. 12/892,794 dated Oct. 4, 2018.
Final Office Action issued in connection with U.S. Appl. No. 12/892,794 dated May 30, 2019.
Office Action issued in connection with U.S. Appl. No. 12/892,822 dated Oct. 11, 2012.
Notice of Allowance issued in connection with U.S. Appl. No. 12/892,822 dated Mar. 4, 2013.
Office Action issued in connection with U.S. Appl. No. 13/919,912 dated Feb. 20, 2015.
Final Office Action issued in connection with U.S. Appl. No. 13/919,912 dated Jul. 22, 2015.
Office Action issued in connection with U.S. Appl. No. 13/919,912 dated Apr. 29, 2016.
Final Office Action issued in connection with U.S. Appl. No. 13/919,912 dated Sep. 29, 2016.
Office Action issued in connection with U.S. Appl. No. 13/919,912 dated Jan. 13, 2017.
Final Office Action issued in connection with U.S. Appl. No. 13/919,912 dated May 8, 2017.
Office Action issued in connection with U.S. Appl. No. 13/919,912 dated Aug. 30, 2017.
Final Office Action issued in connection with U.S. Appl. No. 13/919,912 dated Feb. 2, 2018.
Office Action issued in connection with U.S. Appl. No. 13/919,912 dated Jun. 1, 2018.
Notice of Allowance issued in connection with U.S. Appl. No. 13/919,912 dated Oct. 30, 2018.
Office Action issued in connection with U.S. Appl. No. 16/243,977 dated Sep. 20, 2019.
Office Action issued in connection with U.S. Appl. No. 13/620,976 dated Jan. 10, 2013.
Final Office Action issued in connection with U.S. Appl. No. 13/620,976 dated Aug. 13, 2013.
Notice of Allowance issued in connection with U.S. Appl. No. 13/620,976 dated Nov. 6, 2013.
Office Action issued in connection with U.S. Appl. No. 12/892,818 dated Oct. 22, 2012.
Final Office Action issued in connection with U.S. Appl. No. 12/892,818 dated Feb. 13, 2013.
Office Action issued in connection with U.S. Appl. No. 12/892,818 dated Apr. 11, 2014.
Final Office Action issued in connection with U.S. Appl. No. 12/892,818 dated Oct. 10, 2014.
Notice of Allowance issued in connection with U.S. Appl. No. 12/892,818 dated Dec. 19, 2014.
Office Action issued in connection with U.S. Appl. No. 14/629,411 dated Sep. 1, 2015.
Final Office Action issued in connection with U.S. Appl. No. 14/629,411 dated Dec. 23, 2015.
Office Action issued in connection with U.S. Appl. No. 14/629,411 dated May 2, 2016.
Final Office Action issued in connection with U.S. Appl. No. 14/629,411 dated Sep. 26, 2016.
Office Action issued in connection with U.S. Appl. No. 14/629,411 dated Jan. 18, 2017.
Final Office Action issued in connection with U.S. Appl. No. 14/629,411 dated May 9, 2017.
Office Action issued in connection with U.S. Appl. No. 14/629,411 dated Sep. 8, 2017.
Notice of Allowance issued in connection with U.S. Appl. No. 14/629,411 dated Mar. 15, 2018.
Office Action issued in connection with U.S. Appl. No. 13/621,010 dated Jan. 10, 2013.
Final Office Action issued in connection with U.S. Appl. No. 13/621,010 dated May 21, 2013.
Office Action issued in connection with U.S. Appl. No. 13/621,010 dated Apr. 8, 2014.
Final Office Action issued in connection with U.S. Appl. No. 13/621,010 dated Oct. 10, 2014.
Office Action issued in connection with U.S. Appl. No. 13/621,010 dated Feb. 5, 2015.
Final Office Action issued in connection with U.S. Appl. No. 13/621,010 dated Jul. 10, 2015.
Office Action issued in connection with U.S. Appl. No. 13/621,010 dated Feb. 8, 2016.
Final Office Action issued in connection with U.S. Appl. No. 13/621,010 dated Jun. 2, 2016.
Notice of Allowance issued in connection with U.S. Appl. No. 13/621,010 dated Jul. 19, 2016.
Office Action issued in connection with U.S. Appl. No. 12/892,819 dated Oct. 11, 2012.
Final Office Action issued in connection with U.S. Appl. No. 12/892,819 dated Feb. 15, 2013.
Office Action issued in connection with U.S. Appl. No. 12/892,819 dated Apr. 15, 2014.
Final Office Action issued in connection with U.S. Appl. No. 12/892,819 dated Oct. 28, 2014.
Office Action issued in connection with U.S. Appl. No. 12/892,819 dated Feb. 18, 2015.
Final Office Action issued in connection with U.S. Appl. No. 12/892,819 dated Jul. 24, 2015.
Office Action issued in connection with U.S. Appl. No. 12/892,819 dated Mar. 18, 2016.
Final Office Action issued in connection with U.S. Appl. No. 12/892,819 dated Aug. 2, 2016.
Office Action issued in connection with U.S. Appl. No. 12/892,819 dated Dec. 22, 2016.
Final Office Action issued in connection with U.S. Appl. No. 12/892,819 dated Apr. 11, 2017.
Office Action issued in connection with U.S. Appl. No. 12/892,819 dated Aug. 10, 2017.
Final Office Action issued in connection with U.S. Appl. No. 12/892,819 dated Jan. 17, 2018.
Notice of Allowance issued in connection with U.S. Appl. No. 12/892,819 dated Jun. 1, 2018.
Office Action issued in connection with U.S. Appl. No. 13/620,979 dated Jan. 16, 2013.
Final Office Action issued in connection with U.S. Appl. No. 13/620,979 dated May 28, 2013.
Office Action issued in connection with U.S. Appl. No. 13/620,979 dated Feb. 11, 2014.
Final Office Action issued in connection with U.S. Appl. No. 13/620,979 dated Jul. 15, 2014.
Office Action issued in connection with U.S. Appl. No. 13/620,979 dated Nov. 13, 2014.
Final Office Action issued in connection with U.S. Appl. No. 13/620,979 dated Feb. 23, 2015.
Office Action issued in connection with U.S. Appl. No. 13/620,979 dated Dec. 23, 2015.
Final Office Action issued in connection with U.S. Appl. No. 13/620,979 dated Apr. 8, 2016.
Office Action issued in connection with U.S. Appl. No. 13/620,979 dated Jul. 28, 2016.
Final Office Action issued in connection with U.S. Appl. No. 13/620,979 dated Dec. 7, 2016.

(56) References Cited

OTHER PUBLICATIONS

Office Action issued in connection with U.S. Appl. No. 13/620,979 dated Mar. 20, 2017.
Notice of Allowance issued in connection with U.S. Appl. No. 13/620,979 dated Jun. 19, 2017.
Office Action issued in connection with U.S. Appl. No. 16/154,597 dated Sep. 19, 2019.
Office Action issued in connection with U.S. Appl. No. 12/892,852 dated Oct. 11, 2012.
Final Office Action issued in connection with U.S. Appl. No. 12/892,852 dated Feb. 21, 2013.
Office Action issued in connection with U.S. Appl. No. 12/892,852 dated Feb. 24, 2014.
Final Office Action issued in connection with U.S. Appl. No. 12/892,852 dated Aug. 8, 2014.
Office Action issued in connection with U.S. Appl. No. 12/892,852 dated Dec. 1, 2014.
Final Office Action issued in connection with U.S. Appl. No. 12/892,852 dated Mar. 20, 2015.
Office Action issued in connection with U.S. Appl. No. 12/892,852 dated Dec. 23, 2015.
Notice of Allowance issued in connection with U.S. Appl. No. 12/892,852 dated Apr. 11, 2016.
Office Action issued in connection with U.S. Appl. No. 13/621,022 dated Jan. 2, 2013.
Final Office Action issued in connection with U.S. Appl. No. 13/621,022 dated May 22, 2013.
Office Action issued in connection with U.S. Appl. No. 13/621,022 dated Feb. 12, 2014.
Final Office Action issued in connection with U.S. Appl. No. 13/621,022 dated Jul. 17, 2014.
Office Action issued in connection with U.S. Appl. No. 13/621,022 dated Nov. 14, 2014.
Final Office Action issued in connection with U.S. Appl. No. 13/621,022 dated Feb. 23, 2015.
Office Action issued in connection with U.S. Appl. No. 13/621,022 dated Dec. 15, 2015.
Final Office Action issued in connection with U.S. Appl. No. 13/621,022 dated Apr. 5, 2016.
Office Action issued in connection with U.S. Appl. No. 13/621,022 dated Aug. 25, 2016.
Final Office Action issued in connection with U.S. Appl. No. 13/621,022 dated Dec. 22, 2016.
Office Action issued in connection with U.S. Appl. No. 13/621,022 dated Mar. 24, 2017.
Final Office Action issued in connection with U.S. Appl. No. 13/621,022 dated Jul. 26, 2017.
Office Action issued in connection with U.S. Appl. No. 13/621,022 dated Dec. 18, 2017.
Notice of Allowance issued in connection with U.S. Appl. No. 13/621,022 dated May 17, 2018.
Office Action issued in connection with U.S. Appl. No. 15/191,240 dated Nov. 2, 2016.
Final Office Action issued in connection with U.S. Appl. No. 15/191,240 dated Apr. 3, 2017.
Office Action issued in connection with U.S. Appl. No. 15/191,240 dated Jul. 18, 2017.
Notice of Allowance issued in connection with U.S. Appl. No. 15/191,240 dated Nov. 7, 2017.
Office Action issued in connection with U.S. Appl. No. 15/908,576 dated Dec. 20, 2018.
Final Office Action issued in connection with U.S. Appl. No. 15/908,576 dated Jun. 13, 2019.
Final Office Action issued in connection with U.S. Appl. No. 15/908,576 dated Sep. 27, 2019.
Office Action issued in connection with U.S. Appl. No. 12/892,873 dated Aug. 21, 2012.
Final Office Action issued in connection with U.S. Appl. No. 12/892,873 dated Jan. 7, 2013.
Office Action issued in connection with U.S. Appl. No. 12/892,873 dated May 7, 2014.
Notice of Allowance issued in connection with U.S. Appl. No. 12/892,873 dated Sep. 12, 2014.
Office Action issued in connection with U.S. Appl. No. 14/550,889 dated Mar. 12, 2015.
Notice of Allowance issued in connection with U.S. Appl. No. 14/550,889 dated Jul. 17, 2015.
Office Action issued in connection with U.S. Appl. No. 12/892,861 dated Aug. 21, 2012.
Final Office Action issued in connection with U.S. Appl. No. 12/892,861 dated Jan. 4, 2013.
Office Action issued in connection with U.S. Appl. No. 12/892,681 dated May 7, 2014.
Notice of Allowance issued in connection with U.S. Appl. No. 12/892,681 dated Aug. 29, 2014.
Office Action issued in connection with U.S. Appl. No. 14/550,892 dated Apr. 27, 2015.
Final Office Action issued in connection with U.S. Appl. No. 14/550,892 dated Aug. 17, 2015.
Notice of Allowance issued in connection with U.S. Appl. No. 14/550,892 dated Oct. 15, 2015.
Office Action issued in connection with U.S. Appl. No. 12/892,889 dated Oct. 10, 2012.
Final Office Action issued in connection with U.S. Appl. No. 12/892,889 dated May 1, 2013.
Office Action issued in connection with U.S. Appl. No. 12/892,889 dated Jul. 3, 2014.
Notice of Allowance issued in connection with U.S. Appl. No. 12/892,889 dated Oct. 3, 2014.
Notice of Allowance issued in connection with U.S. Appl. No. 14/566,615 dated Jun. 19, 2015.
Office Action issued in connection with U.S. Appl. No. 12/892,880 dated Sep. 20, 2012.
Final Office Action issued in connection with U.S. Appl. No. 12/892,880 dated Apr. 5, 2013.
Notice of Allowance issued in connection with U.S. Appl. No. 12/892,880 dated Jul. 17, 2013.
Office Action issued in connection with U.S. Appl. No. 14/071,276 dated Aug. 25, 2014.
Final Office Action issued in connection with U.S. Appl. No. 14/071,276 dated Feb. 4, 2015.
Notice of Allowance issued in connection with U.S. Appl. No. 14/071,276 dated Apr. 2, 2015.
Office Action issued in connection with U.S. Appl. No. 14/807,726 dated Jan. 9, 2017.
Final Office Action issued in connection with U.S. Appl. No. 14/807,726 dated Apr. 24, 2017.
Notice of Allowance issued in connection with U.S. Appl. No. 114/807,726 dated Jun. 29, 2017.
Office Action issued in connection with U.S. Appl. No. 12/892,877 dated Nov. 6, 2012.
Final Office Action issued in connection with U.S. Appl. No. 12/892,877 dated Mar. 19, 2013.
Notice of Allowance issued in connection with U.S. Appl. No. 12/892,877 dated Jun. 2, 2014.
Office Action issued in connection with U.S. Appl. No. 14/467,774 dated Mar. 27, 2015.
Notice of Allowance issued in connection with U.S. Appl. No. 14/467,774 dated Jul. 23, 2015.
Office Action issued in connection with U.S. Appl. No. 14/871,941 dated Feb. 2, 2016.
Final Office Action issued in connection with U.S. Appl. No. 14/871,941 dated Jul. 21, 2016.
Office Action issued in connection with U.S. Appl. No. 14/871,941 dated Nov. 16, 2016.
Final Office Action issued in connection with U.S. Appl. No. 14/871,941 dated Apr. 11, 2017.
Notice of Allowance issued in connection with U.S. Appl. No. 14/871,941 dated Jun. 21, 2017.
Office Action issued in connection with U.S. Appl. No. 12/695,537 dated Mar. 30, 2012.

(56) References Cited

OTHER PUBLICATIONS

Final Office Action issued in connection with U.S. Appl. No. 12/695,537 dated Oct. 15, 2012.
Office Action issued in connection with U.S. Appl. No. 12/695,537 dated Jul. 8, 2014.
Office Action issued in connection with U.S. Appl. No. 12/695,537 dated Jan. 29, 2015.
Final Office Action issued in connection with U.S. Appl. No. 12/695,537 dated Aug. 14, 2015.
Office Action issued in connection with U.S. Appl. No. 12/695,537 dated Jan. 8, 2016.
Notice of Allowance issued in connection with U.S. Appl. No. 12/695,537 dated Jul. 18, 2016.
Office Action issued in connection with U.S. Appl. No. 15/351,074 dated Feb. 8, 2018.
Final Office Action issued in connection with U.S. Appl. No. 15/351,074 dated Aug. 28, 2018.
Office Action issued in connection with U.S. Appl. No. 15/351,074 dated Jan. 2, 2019.
Final Office Action issued in connection with U.S. Appl. No. 15/351,074 dated Jul. 11, 2019.
Notice of Allowance issued in connection with U.S. Appl. No. 15/351,074 dated Aug. 7, 2019.
Notice of Allowance issued in connection with U.S. Appl. No. 12/952,118 dated Feb. 4, 2013.
Office Action issued in connection with U.S. Appl. No. 13/873,040 dated Jul. 18, 2014.
Notice of Allowance issued in connection with U.S. Appl. No. 13/873,040 dated Dec. 1, 2014.
Office Action issued in connection with U.S. Appl. No. 14/629,433 dated Nov. 6, 2015.
Final Office Action issued in connection with U.S. Appl. No. 14/629,433 dated May 18, 2016.
Office Action issued in connection with U.S. Appl. No. 14/629,433 dated Oct. 7, 2016.
Final Office Action issued in connection with U.S. Appl. No. 14/629,433 dated May 19, 2017.
Notice of Allowance issued in connection with U.S. Appl. No. 14/629,433 dated Nov. 22, 2017.
Notice of Allowance issued in connection with U.S. Appl. No. 15/936,205 dated Oct. 9, 2018.
Office Action issued in connection with U.S. Appl. No. 16/267,128 dated Jul. 17, 2019.
Office Action issued in connection with U.S. Appl. No. 12/960,421 dated May 10, 2013.
Notice of Allowance issued in connection with U.S. Appl. No. 12/960,421 dated Sep. 3, 2013.
Office Action issued in connection with U.S. Appl. No. 12/960,402 dated Jun. 20, 2013.
Final Office Action issued in connection with U.S. Appl. No. 12/960,402 dated May 8, 2014.
Office Action issued in connection with U.S. Appl. No. 12/960,402 dated Oct. 23, 2014.
Final Office Action issued in connection with U.S. Appl. No. 12/960,402 dated May 19, 2015.
Office Action issued in connection with U.S. Appl. No. 12/960,402 dated Sep. 24, 2015.
Notice of Allowance issued in connection with U.S. Appl. No. 12/960,402 dated Mar. 22, 2016.
Office Action issued in connection with U.S. Appl. No. 11/771,679 dated Apr. 30, 2010.
Final Office Action issued in connection with U.S. Appl. No. 11/771,679 dated Sep. 1, 2010.
Notice of Allowance issued in connection with U.S. Appl. No. 11/771,679 dated Jan. 24, 2011.
Office Action issued in connection with U.S. Appl. No. 13/401,715 dated Jun. 26, 2013.
Final Office Action issued in connection with U.S. Appl. No. 13/401,715 dated Jan. 14, 2014.
Office Action issued in connection with U.S. Appl. No. 13/401,715 dated Jul. 18, 2014.
Final Office Action issued in connection with U.S. Appl. No. 13/401,715 dated Feb. 27, 2015.
Office Action issued in connection with U.S. Appl. No. 13/401,715 dated Jul. 8, 2015.
Final Office Action issued in connection with U.S. Appl. No. 13/401,715 dated Mar. 1, 2016.
Office Action issued in connection with U.S. Appl. No. 13/401,715 dated Jan. 27, 2017.
Final Office Action issued in connection with U.S. Appl. No. 13/401,715 dated Oct. 3, 2017.
Notice of Allowance issued in connection with U.S. Appl. No. 13/401,715 dated Mar. 16, 2018.
Office Action issued in connection with U.S. Appl. No. 14/556,647 dated Oct. 19, 2015.
Office Action issued in connection with U.S. Appl. No. 14/556,647 dated Mar. 18, 2016.
Final Office Action issued in connection with U.S. Appl. No. 14/556,647 dated Aug. 25, 2016.
Notice of Allowance issued in connection with U.S. Appl. No. 14/556,647 dated Dec. 16, 2016.
Office Action issued in connection with U.S. Appl. No. 13/437,274 dated Jun. 6, 2014.
Final Office Action issued in connection with U.S. Appl. No. 13/437,274 dated Jan. 2, 2015.
Office Action issued in connection with U.S. Appl. No. 13/437,274 dated Jul. 29, 2015.
Final Office Action issued in connection with U.S. Appl. No. 13/437,274 dated Feb. 1, 2016.
Office Action issued in connection with U.S. Appl. No. 13/437,274 dated Oct. 7, 2016.
Final Office Action issued in connection with U.S. Appl. No. 13/437,274 dated May 11, 2017.
Office Action issued in connection with U.S. Appl. No. 13/437,274 dated Dec. 14, 2017.
Final Office Action issued in connection with U.S. Appl. No. 13/437,274 dated Jul. 11, 2018.
Notice of Allowance issued in connection with U.S. Appl. No. 13/437,274 dated Dec. 12, 2019.
Office Action issued in connection with U.S. Appl. No. 13/493,839 dated Jan. 14, 2014.
Office Action issued in connection with U.S. Appl. No. 13/493,839 dated Jan. 15, 2015.
Notice of Allowance issued in connection with U.S. Appl. No. 13/493,839 dated May 8, 2015.
Office Action issued in connection with U.S. Appl. No. 14/800,540 dated May 23, 2017.
Office Action issued in connection with U.S. Appl. No. 14/800,540 dated Jan. 24, 2018.
Notice of Allowance issued in connection with U.S. Appl. No. 14/800,540 dated Oct. 10, 2018.
Office Action issued in connection with U.S. Appl. No. 16/203,405 dated Jul. 10, 2019.
Office Action issued in connection with U.S. Appl. No. 16/203,405 dated Jan. 30, 2020.
Office Action issued in connection with U.S. Appl. No. 13/623,845 dated May 22, 2015.
Final Office Action issued in connection with U.S. Appl. No. 13/623,845 dated Sep. 9, 2015.
Notice of Allowance issued in connection with U.S. Appl. No. 13/623,845 dated Jan. 11, 2016.
Office Action issued in connection with U.S. Appl. No. 15/138,071 dated Feb. 2, 2017.
Final Office Action issued in connection with U.S. Appl. No. 15/138,071 dated Sep. 9, 2015.
Notice of Allowance issued in connection with U.S. Appl. No. 15/138,071 dated Mar. 12, 2018.
Office Action issued in connection with U.S. Appl. No. 16/020,477 dated Jun. 17, 2019.
Final Office Action issued in connection with U.S. Appl. No. 16/020,477 dated Sep. 9, 2015.

(56) References Cited

OTHER PUBLICATIONS

Notice of Allowance issued in connection with U.S. Appl. No. 16/020,477 dated Sep. 11, 2019.
Office Action issued in connection with U.S. Appl. No. 13/623,847 dated Jun. 19, 2014.
Final Office Action issued in connection with U.S. Appl. No. 13/623,847 dated Jan. 28, 2015.
Notice of Allowance issued in connection with U.S. Appl. No. 13/623,847 dated May 22, 2015.
Office Action issued in connection with U.S. Appl. No. 13/528,674 dated Aug. 20, 2014.
Notice of Allowance issued in connection with U.S. Appl. No. 13/528,674 dated Mar. 20, 2015.
Office Action issued in connection with U.S. Appl. No. 13/528,664 dated Sep. 12, 2014.
Final Office Action issued in connection with U.S. Appl. No. 13/528,664 dated Mar. 26, 2015.
Notice of Allowance issued in connection with U.S. Appl. No. 13/528,664 dated Jul. 8, 2015.
Office Action issued in connection with U.S. Appl. No. 13/603,369 dated Jan. 22, 2015.
Office Action issued in connection with U.S. Appl. No. 13/603,369 dated Jun. 11, 2015.
Final Office Action issued in connection with U.S. Appl. No. 13/603,369 dated Nov. 17, 2015.
Notice of Allowance issued in connection with U.S. Appl. No. 13/603,369 dated Aug. 25, 2016.
Office Action issued in connection with U.S. Appl. No. 11/395,463 dated Sep. 8, 2010.
Office Action issued in connection with U.S. Appl. No. 11/395,463 dated Nov. 13, 2009.
Final Office Action issued in connection with U.S. Appl. No. 11/395,463 dated Dec. 29, 2010.
Office Action issued in connection with U.S. Appl. No. 11/395,463 dated Jul. 19, 2011.
Notice of Allowance issued in connection with U.S. Appl. No. 11/395,463 dated Nov. 1, 2011.
Office Action issued in connection with U.S. Appl. No. 14/091,272 dated Aug. 4, 2015.
Final Office Action issued in connection with U.S. Appl. No. 14/091,272 dated Feb. 17, 2016.
Final Office Action issued in connection with U.S. Appl. No. 14/091,272 dated Jun. 9, 2017.
Notice of Allowance issued in connection with U.S. Appl. No. 14/091,272 dated Sep. 26, 2018.
Notice of Allowance issued in connection with U.S. Appl. No. 16/271,211 dated Jan. 9, 2020.
Office Action issued in connection with U.S. Appl. No. 13/909,705 dated Jun. 25, 2015.
Notice of Allowance issued in connection with U.S. Appl. No. 13/909,705 dated Nov. 27, 2015.
Office Action issued in connection with U.S. Appl. No. 15/075,728 dated Aug. 2, 2017.
Notice of Allowance issued in connection with U.S. Appl. No. 15/075,728 dated Nov. 24, 2017.
Office Action issued in connection with U.S. Appl. No. 15/935,615 dated Aug. 23, 2018.
Notice of Allowance issued in connection with U.S. Appl. No. 15/935,615 dated Feb. 4, 2019.
Office Action issued in connection with U.S. Appl. No. 13/095,554 dated Sep. 4, 2012.
Final Office Action issued in connection with U.S. Appl. No. 13/095,554 dated Jun. 20, 2013.
Office Action issued in connection with U.S. Appl. No. 13/095,554 dated Oct. 7, 2014.
Final Office Action issued in connection with U.S. Appl. No. 13/095,554 dated Jun. 30, 2015.
Office Action issued in connection with U.S. Appl. No. 13/095,554 dated Nov. 12, 2015.
Final Office Action issued in connection with U.S. Appl. No. 13/095,554 dated May 19, 2016.
Office Action issued in connection with U.S. Appl. No. 13/095,554 dated May 18, 2017.
Final Office Action issued in connection with U.S. Appl. No. 13/095,554 dated Sep. 21, 2017.
Office Action issued in connection with U.S. Appl. No. 13/095,554 dated Mar. 9, 2018.
Final Office Action issued in connection with U.S. Appl. No. 13/095,554 dated Jun. 28, 2018.
Office Action issued in connection with U.S. Appl. No. 13/095,554 dated Oct. 5, 2018.
Office Action issued in connection with U.S. Appl. No. 16/261,401 dated Apr. 12, 2019.
Notice of Allowance issued in connection with U.S. Appl. No. 16/261,401 dated Jun. 28, 2019.
Office Action issued in connection with U.S. Appl. No. 14/575,798 dated Sep. 19, 2016.
Final Office Action issued in connection with U.S. Appl. No. 14/575,798 dated May 3, 2017.
Office Action issued in connection with U.S. Appl. No. 14/575,798 dated Aug. 23, 2017.
Notice of Allowance issued in connection with U.S. Appl. No. 14/575,798 dated Mar. 30, 2018.
Office Action issued in connection with U.S. Appl. No. 14/575,816 dated Sep. 22, 2016.
Final Office Action issued in connection with U.S. Appl. No. 14/575,816 dated May 3, 2017.
Office Action issued in connection with U.S. Appl. No. 14/575,816 dated Aug. 23, 2017.
Final Office Action issued in connection with U.S. Appl. No. 14/575,816 dated Mar. 22, 2018.
Notice of Allowance issued in connection with U.S. Appl. No. 14/575,816 dated May 30, 2018.
Office Action issued in connection with U.S. Appl. No. 16/154,580 dated Aug. 23, 2017.
Office Action issued in connection with U.S. Appl. No. 14/575,834 dated Sep. 30, 2016.
Final Office Action issued in connection with U.S. Appl. No. 14/575,834 dated Apr. 18, 2017.
Office Action issued in connection with U.S. Appl. No. 14/575,834 dated Nov. 9, 2017.
Notice of Allowance issued in connection with U.S. Appl. No. 14/575,834 dated May 17, 2018.
Office Action issued in connection with U.S. Appl. No. 14/666,205 dated May 10, 2017.
Final Office Action issued in connection with U.S. Appl. No. 14/666,205 dated Nov. 3, 2017.
Office Action issued in connection with U.S. Appl. No. 14/666,205 dated May 9, 2018.
Notice of Allowance issued in connection with U.S. Appl. No. 14/666,205 dated Oct. 29, 2018.
Office Action issued in connection with U.S. Appl. No. 14/673,305 dated Feb. 21, 2017.
Notice of Allowance issued in connection with U.S. Appl. No. 14/673,305 dated Jul. 19, 2017.
Office Action issued in connection with U.S. Appl. No. 15/811,437 dated Feb. 25, 2019.
Notice of Allowance issued in connection with U.S. Appl. No. 15/811,437 dated Jul. 16, 2019.
Office Action issued in connection with U.S. Appl. No. 14/673,121 dated Jan. 26, 2017.
Final Office Action issued in connection with U.S. Appl. No. 14/673,121 dated Jun. 1, 2017.
Notice of Allowance issued in connection with U.S. Appl. No. 14/673,121 dated Oct. 11, 2017.
Office Action issued in connection with U.S. Appl. No. 14/673,159 dated Feb. 13, 2017.
Final Office Action issued in connection with U.S. Appl. No. 14/673,159 dated Jun. 1, 2017.
Notice of Allowance issued in connection with U.S. Appl. No. 14/673,159 dated Oct. 4, 2017.

(56) References Cited

OTHER PUBLICATIONS

Office Action issued in connection with U.S. Appl. No. 14/711,502 dated Mar. 24, 2017.
Notice of Allowance issued in connection with U.S. Appl. No. 14/711,502 dated Aug. 1, 2017.
Office Action issued in connection with U.S. Appl. No. 15/788,657 dated Mar. 28, 2018.
Notice of Allowance issued in connection with U.S. Appl. No. 15/788,657 dated Sep. 20, 2018.
Office Action issued in connection with U.S. Appl. No. 16/232,421 dated Oct. 4, 2019.
Notice of Allowance issued in connection with U.S. Appl. No. 16/232,421 dated Feb. 10, 2020.
Office Action issued in connection with U.S. Appl. No. 12/652,541 dated Jan. 3, 2012.
Final Office Action issued in connection with U.S. Appl. No. 12/652,541 dated Sep. 5, 2012.
Notice of Allowance issued in connection with U.S. Appl. No. 12/652,541 dated Jan. 4, 2013.
Office Action issued in connection with U.S. Appl. No. 13/842,970 dated Apr. 30, 2014.
Final Office Action issued in connection with U.S. Appl. No. 13/842,970 dated Aug. 19, 2014.
Notice of Allowance issued in connection with U.S. Appl. No. 13/842,970 dated Dec. 5, 2014.
Notice of Allowance issued in connection with U.S. Appl. No. 14/644,031 dated Sep. 28, 2015.
Notice of Allowance issued in connection with U.S. Appl. No. 14/994,974 dated Sep. 27, 2017.
Notice of Allowance issued in connection with U.S. Appl. No. 15/844,371 dated Oct. 15, 2018.
Office Action issued in connection with U.S. Appl. No. 14/815,863 dated Jul. 13, 2017.
Notice of Allowance issued in connection with U.S. Appl. No. 14/815,863 dated Mar. 1, 2018.
Office Action issued in connection with U.S. Appl. No. 14/815,843 dated Mar. 20, 2018.
Office Action issued in connection with U.S. Appl. No. 14/864,684 dated Mar. 15, 2017.
Notice of Allowance issued in connection with U.S. Appl. No. 14/864,684 dated Jun. 22, 2017.
Office Action issued in connection with U.S. Appl. No. 14/864,638 dated Feb. 23, 2017.
Notice of Allowance issued in connection with U.S. Appl. No. 14/864,638 dated Jun. 8, 2017.
Office Action issued in connection with U.S. Appl. No. 15/714,993 dated Apr. 5, 2018.
Notice of Allowance issued in connection with U.S. Appl. No. 15/714,993 dated Jun. 8, 2017.
Office Action issued in connection with U.S. Appl. No. 14/864,683 dated Dec. 16, 2016.
Notice of Allowance issued in connection with U.S. Appl. No. 14/864,683 dated Apr. 25, 2017.
Office Action issued in connection with U.S. Appl. No. 14/975,157 dated Nov. 2, 2017.
Final Office Action issued in connection with U.S. Appl. No. 14/975,157 dated Jun. 15, 2018.
Notice of Allowance issued in connection with U.S. Appl. No. 14/975,157 dated Mar. 1, 2019.
Office Action issued in connection with U.S. Appl. No. 14/975,341 dated Nov. 29, 2017.
Final Office Action issued in connection with U.S. Appl. No. 14/975,341 dated Mar. 22, 2018.
Office Action issued in connection with U.S. Appl. No. 14/975,341 dated Feb. 21, 2019.
Office Action issued in connection with U.S. Appl. No. 14/937,762 dated Sep. 8, 2017.
Final Office Action issued in connection with U.S. Appl. No. 14/937,762 dated Apr. 18, 2018.
Notice of Allowance issued in connection with U.S. Appl. No. 14/937,762 dated Dec. 5, 2018.
Office Action issued in connection with U.S. Appl. No. 14/967,218 dated May 18, 2017.
Final Office Action issued in connection with U.S. Appl. No. 14/967,218 dated Nov. 29, 2017.
Notice of Allowance issued in connection with U.S. Appl. No. 14/967,218 dated Apr. 25, 2018.
Office Action issued in connection with U.S. Appl. No. 14/967,227 dated Dec. 21, 2017.
Final Office Action issued in connection with U.S. Appl. No. 14/967,227 dated Aug. 2, 2018.
Notice of Allowance issued in connection with U.S. Appl. No. 14/967,227 dated Nov. 28, 2018.
Notice of Allowance issued in connection with U.S. Appl. No. 15/174,913 dated May 18, 2018.
Office Action issued in connection with U.S. Appl. No. 16/126,437 dated Aug. 21, 2019.
Notice of Allowance issued in connection with U.S. Appl. No. 16/126,437 dated Jan. 23, 2020.
Notice of Allowance issued in connection with U.S. Appl. No. 15/197,438 dated Jun. 27, 2018.
Office Action issued in connection with U.S. Appl. No. 16/143,892 dated Jan. 29, 2020.
Notice of Allowance issued in connection with U.S. Appl. No. 15/245,089 dated Jan. 17, 2018.
Notice of Allowance issued in connection with U.S. Appl. No. 15/994,631 dated Aug. 22, 2019.
Notice of Allowance issued in connection with U.S. Appl. No. 15/245,847 dated Apr. 4, 2018.
Notice of Allowance issued in connection with U.S. Appl. No. 16/042,584 dated Jun. 17, 2019.
Office Action issued in connection with U.S. Appl. No. 15/389,276 dated Dec. 6, 2018.
Final Office Action issued in connection with U.S. Appl. No. 15/389,276 dated Jun. 13, 2019.
Notice of Allowance issued in connection with U.S. Appl. No. 15/389,276 dated Dec. 2, 2019.
Office Action issued in connection with U.S. Appl. No. 15/389,302 dated Sep. 26, 2018.
Final Office Action issued in connection with U.S. Appl. No. 15/389,302 dated Mar. 22, 2019.
Notice of Allowance issued in connection with U.S. Appl. No. 15/389,302 dated Aug. 6, 2019.
Office Action issued in connection with U.S. Appl. No. 15/389,314 dated Aug. 10, 2018.
Final Office Action issued in connection with U.S. Appl. No. 15/389,314 dated Feb. 6, 2019.
Notice of Allowance issued in connection with U.S. Appl. No. 15/389,314 dated Jul. 3, 2019.
Office Action issued in connection with U.S. Appl. No. 15/419,880 dated Aug. 8, 2019.
Final Office Action issued in connection with U.S. Appl. No. 15/419,880 dated Feb. 6, 2020.
Office Action issued in connection with U.S. Appl. No. 15/391,673 dated Nov. 21, 2018.
Final Office Action issued in connection with U.S. Appl. No. 15/391,673 dated Apr. 24, 2019.
Office Action issued in connection with U.S. Appl. No. 15/391,673 dated Sep. 10, 2019.
Final Office Action issued in connection with U.S. Appl. No. 15/391,673 dated Dec. 17, 2019.
Office Action issued in connection with U.S. Appl. No. 15/391,696 dated Jun. 20, 2018.
Final Office Action issued in connection with U.S. Appl. No. 15/391,696 dated Nov. 19, 2018.
Notice of Allowance issued in connection with U.S. Appl. No. 15/391,696 dated Mar. 26, 2019.
Notice of Allowance issued in connection with U.S. Appl. No. 15/627,132 dated Apr. 10, 2019.
Office Action issued in connection with U.S. Appl. No. 15/494,382 dated Jan. 8, 2019.

(56) References Cited

OTHER PUBLICATIONS

Notice of Allowance issued in connection with U.S. Appl. No. 15/494,382 dated Jul. 31, 2019.
Office Action issued in connection with U.S. Appl. No. 15/620,472 dated Mar. 21, 2019.
Final Office Action issued in connection with U.S. Appl. No. 15/620,472 dated Aug. 6, 2019.
Office Action issued in connection with U.S. Appl. No. 15/914,823 dated Jul. 15, 2019.
Notice of Allowance issued in connection with U.S. Appl. No. 15/914,823 dated Dec. 27, 2019.
First Office Action in Chinese Applicaton No. 201610112984.1 dated Mar. 20, 2018.
Second Office Action in Chinese Application No. 201610112984.1 dated Feb. 2, 2019.
Office Action issued in connection with Chinese Patent Application No. 2021062502179540 dated Jun. 30, 2021.

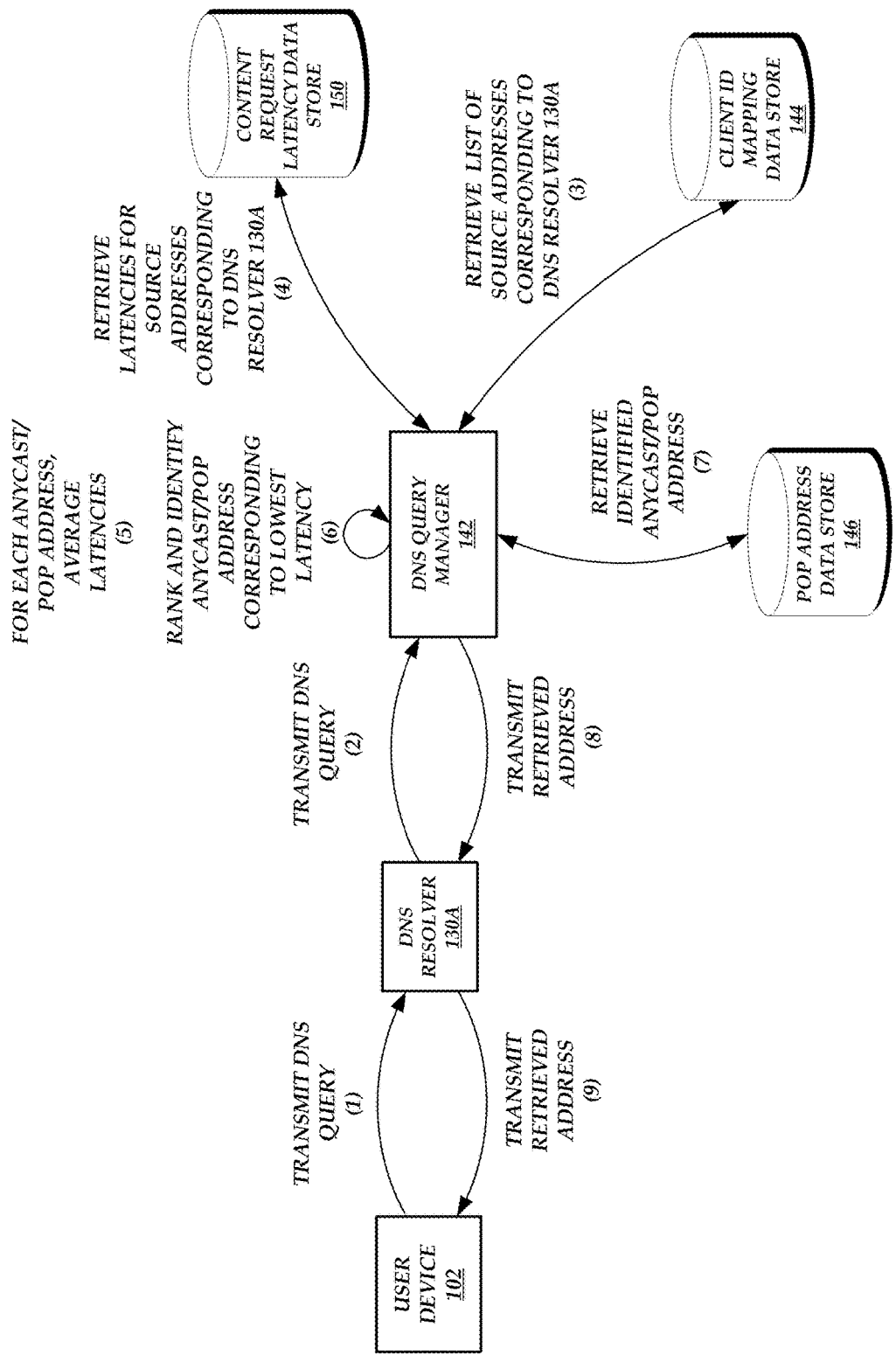

HYBRID CONTENT REQUEST ROUTING SYSTEM

CROSS-REFERENCE TO RELATED APPLICATIONS

This application is a continuation of U.S. patent application Ser. No. 15/714,799, entitled "HYBRID CONTENT REQUEST ROUTING SYSTEM" and filed on Sep. 25, 2017, the entire disclosure of which is hereby incorporated by reference herein.

BACKGROUND

Generally described, computing devices and communication networks can be utilized to exchange information. In a common application, a computing device can request content from another computing device via the communication network. For example, a user at a personal computing device can utilize a browser application to request a content page (e.g., a network page, a Web page, etc.) from a server computing device via a network (e.g., the Internet). In such embodiments, the user computing device can be referred to as a client computing device and the server computing device can be referred to as a content provider.

Content providers are generally motivated to provide requested content to client computing devices often with consideration of efficient transmission of the requested content to the client computing device and/or consideration of a cost associated with the transmission of the content. For larger scale implementations, a content provider may receive content requests from a high volume of client computing devices which can place a strain on the content provider's computing resources. Additionally, the content requested by the client computing devices may have a number of components, which can further place additional strain on the content provider's computing resources.

Some content providers attempt to facilitate the delivery of requested content through the utilization of a content delivery network ("CDN") service provider. As with content providers, CDN service providers are also generally motivated to provide requested content to client computing devices often with consideration of efficient transmission of the requested content to the client computing device and/or consideration of a cost associated with the transmission of the content. Accordingly, CDN service providers often consider factors such as latency of delivery of requested content in order to meet service level agreements or to generally improve the quality of delivery service.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

FIG. 4 is a block diagram of the operating environment of FIGS. 1A-1B illustrating the operations performed by the components of the operating environment to resolve a DNS query submitted by a user device, according to one embodiment.

DETAILED DESCRIPTION

Figure 1A:
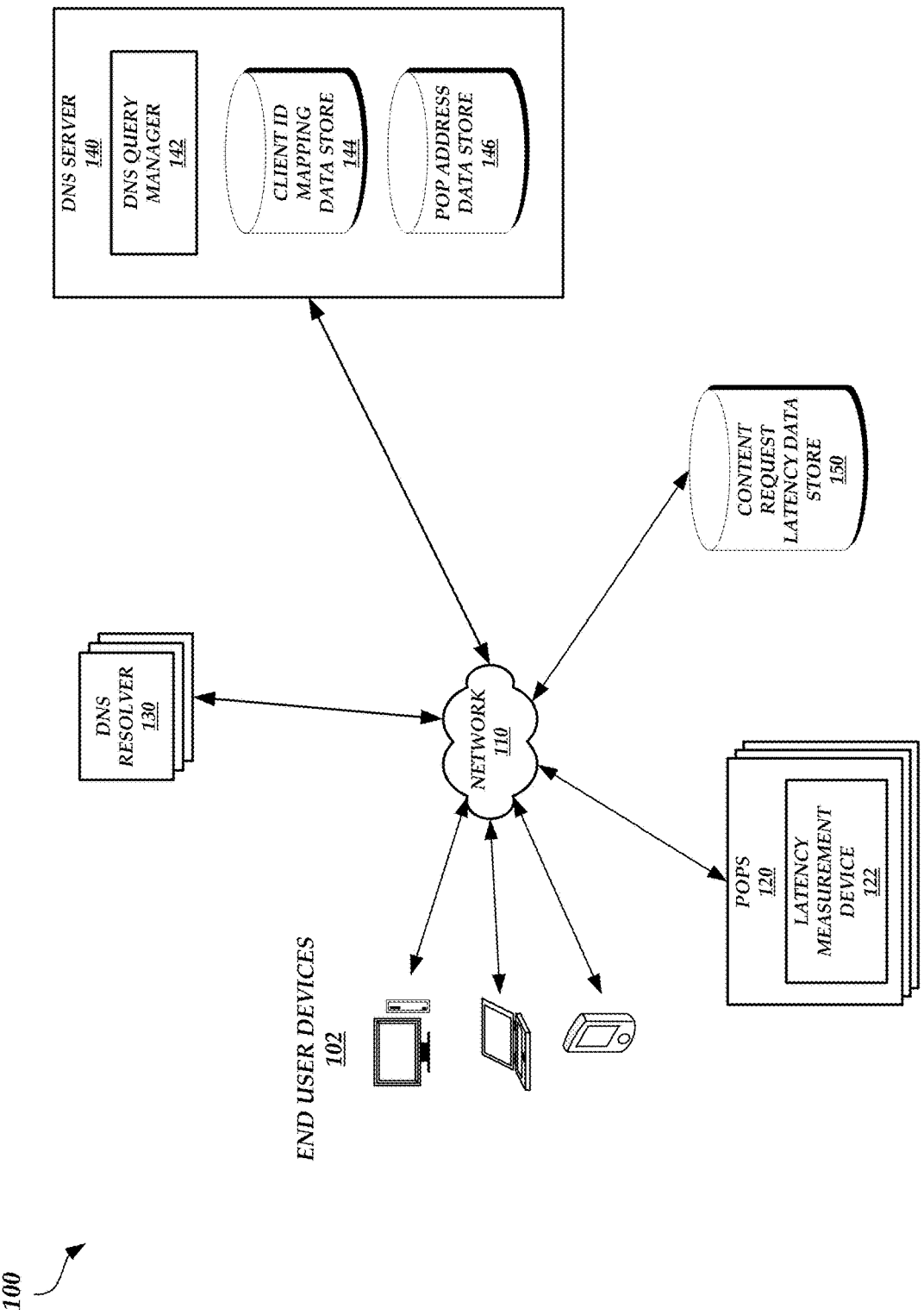
FIG. 1A is a block diagram of an illustrative operating environment in which one or more user devices communicate with one or more DNS resolvers via a network to receive network addresses for obtaining content.

As described above, content delivery network ("CDN") service providers often consider factors such as latency of delivery of requested content in order to meet service level agreements or to generally improve the quality of delivery service. Additionally, in embodiments in which computing devices utilize an Internet service provider ("ISP") to provide connectivity, the CDN service provider can consider additional factors associated with the interaction between the CDN service provider, the user devices, and ISP devices (e.g., domain name server (DNS) resolver components).

For example, a user operating a user device may provide a domain name to access a content page or to otherwise retrieve content provided by a CDN service provider. In order to identify a network address (e.g., Internet protocol (IP) address) corresponding to the domain name, the user device may submit a DNS query. A DNS query originating from a user device may be forwarded, relayed, and/or re-generated by one or more DNS resolvers present between the originating user device and a DNS service (e.g., a DNS server) authoritative for resolving the DNS query. Because the DNS service may receive the DNS query from a DNS resolver rather than directly from a user device, the DNS service may not have information corresponding to the user device from which the DNS query originated. In particular, the DNS service may not have the network address of the user device (e.g., a source network address of the DNS query), and thus may not have information identifying a location from where the DNS query originated.

In some cases, a CDN service provider may include multiple edge locations from which a user device can retrieve content. An edge location may be referred to herein as a point of presence (POP), where a POP is intended to refer to any collection of related computing devices utilized to implement functionality on behalf of one or many providers. POPs are generally associated with a specific geographic location in which the computing devices implementing the POP are located, or with a region serviced by the POP. For example, a data center or a collection of computing devices within a data center may form a POP. In some instances, the POPs may implement one or more services, such as CDN services, data storage services, data processing services, etc. A CDN service provider may include multiple POPs located in different geographic locations so that user devices can communicate with a nearby a POP to retrieve content, thereby reducing the latency of delivering requested content. However, without knowing the location of a user device from where a DNS query originates, the DNS service may not be able to determine accurately which POP network address to provide to a user device (via a DNS resolver) that would result in the lowest latency for delivering requested content.

One option for overcoming the lack of user device location information may be to implement an anycast routing technique. For example, a CDN service provider can assign some or all of the POPs the same anycast network address. Multiple routes from a source network address to the anycast network address may be announced through the border gateway protocol (BGP) networking protocol. While it may appear to a user device or routing device that the announced routes are all routes to the same computing device, the announced routes may in fact be routes to different POPs (e.g., to each POP assigned the anycast network address). Thus, the DNS service can return the anycast network address upon receiving a DNS query. When a user device attempts to retrieve content from the anycast network address, routing devices in the network may use the BGP networking protocol to identify a route to the nearest POP and forward the content request to the nearest POP using the identified route.

However, the nearest POP identified using the BGP networking protocol may not necessarily be the POP that can serve the requested content with the lowest latency. For example, the BGP networking protocol may identify the route to a POP that has the fewest number of hops. Routing devices along this route, though, may be congested or otherwise process data more slowly than other routing devices. Thus, a route that has a higher number of hops may actually result in a lower latency for delivering requested content.

Another option for overcoming the lack of user device location information may be to implement a DNS resolver-based routing technique. For example, a CDN service provider may identify user devices that use a first DNS resolver to submit DNS queries, measure the latency of content requests from these user devices to various POPs, and identify, on average, the POP that results in the lowest content request latency. The POP that, on average, results in the lowest content request latency can then be associated with the first DNS resolver. Thus, when the DNS service receives a request from the first DNS resolver, the DNS service can provide the network address of the associated POP that, on average, results in the lowest content request latency.

The above approach may be accurate in situations in which user devices that use a particular DNS resolver are located within a similar geographic location. However, in some cases, user devices that use the same DNS resolver are located in widely disparate geographic locations. As an illustrative example, a first user device that uses a DNS resolver may be in Europe and a second user device that uses a DNS resolver may be in Japan. The POP associated with the DNS resolver that, on average, results in the lowest content request latency may be located in the United States. Other POPs may exist in Europe and Japan, though, and so the POP selected for the Europe user device or the Japan user device (e.g., the United States POP) may not actually be the POP that results in the lowest latency.

Accordingly, a hybrid content request routing system is described herein. The hybrid content request routing system may use aspects of the anycast routing technique and aspects of the DNS resolver-based routing technique to identify the appropriate POP to serve content (e.g., the appropriate network address to provide to a user device in response to receiving a DNS query). For example, the hybrid content request routing system may include one or more POPs, one or more DNS resolvers, and one or more DNS servers. A set of POPs may be grouped together to form a virtual POP, where each POP in the virtual POP may be assigned an anycast network address. Thus, a request sent to the anycast network address may be routed to one of the POPs in the virtual POP. The hybrid content request routing system may have one or more virtual POPs. In addition, some or all of the POPs may be assigned an individual network address.

Initially, the hybrid content request routing system may implement techniques for determining which source network addresses use specific DNS resolvers. For example, when a user device transmits a content request in some situations, a unique ID generation system (e.g., a recon service) may receive the content request, generate a unique client identifier for the user device, and send the unique client identifier back to the user device. The unique client identifier may be included in a message that functions as a redirect, causing the user device to first transmit a DNS query to a DNS resolver so that a network address can be provided for retrieving the desired content. The DNS query may include the unique client identifier. The DNS resolver can forward the DNS query to a DNS server and the DNS server can map at least a portion of the unique client identifier (e.g., the portion that includes the source address of the user device) included in the DNS query to the DNS resolver that forwarded the DNS query. The DNS resolver can then resolve the DNS query and provide the user device with a network address via the DNS resolver.

The network address provided by the DNS server may be a network address of a POP or a network address of a virtual POP (e.g., an anycast network address). The user device may send a content request to the provided network address, and the POP that receives the content request (e.g., either a standalone POP or a POP that forms part of a virtual POP) can measure the request routing performance (e.g., the latency associated with the transmission of the content request) from the source address of the user device to the POP. The POP can then retrieve the requested content and provide the user device with the requested content.

The above process can be repeated for a plurality of user devices, DNS resolvers, POPs, and/or virtual POPs. Thus, the latencies from various user devices to various POPs and/or virtual POPs may be measured. Using the measured latencies, the DNS server can determine which network address to provide in response to a DNS query. For example, a DNS server can receive a DNS query from a user device via DNS resolver. The DNS server can retrieve the mappings of source addresses to DNS resolvers. Using these mappings, the DNS server can identify which source addresses use the DNS resolver from which the DNS query was received. The DNS server can then retrieve the measured latencies corresponding to the identified source addresses. Because each measured latency is associated with both a source address and a POP or virtual POP network address, the DNS server can determine, for each POP network address (e.g., individual network addresses and/or anycast network addresses), an average latency. The DNS server can then rank the individual and/or anycast network addresses by average latency and provide the user device, via the DNS resolver, with the highest ranked network address.

Thus, the hybrid content request routing system described herein takes advantage of both the benefits of the anycast routing technique and the benefits of the DNS resolver-based routing technique. If a virtual POP network address determined as a result of the anycast routing technique would result in a latency that is lower than a latency associated with an individual POP network address determined as a result of the DNS resolver-based routing technique, then the DNS server provides the user device with the virtual POP network address. Likewise, if an individual POP network address determined as a result of the DNS resolver-based routing technique would result in a latency that is lower than a latency associated with a virtual POP network address determined as a result of the anycast routing technique, then the DNS server provides the user device with the individual POP network address. Given that user device location information is missing and there therefore may be no straightforward mechanism for accurately comparing the performance of the two routing techniques, the techniques described herein for measuring latencies and comparing the performance of the two techniques allows the hybrid content request routing system to overcome difficulties that otherwise may be present in attempting to combine the benefits of the anycast routing technique and the DNS resolver-based routing technique. Accordingly, the present disclosure represents an improvement over existing network request routing systems and computing systems in general.

While the techniques described herein are disclosed as being performed by a DNS server, this is not meant to be limiting. For example, any system that selects a POP to serve content or receive content can implement the techniques described herein as being performed by a DNS server. Such a system may be referred to herein as a "POP selection system." Because the POP selection system may not necessarily be a DNS server, the POP selection system may generically receive a "POP selection query" instead of a DNS query. Furthermore, the POP selection system may receive the POP selection query from a user device or a POP selection resolver (e.g., a system that serves as an intermediary between a user device and the POP selection system) instead of from a DNS resolver. Examples of a POP selection system can include an intermediate system that receives or intercepts content requests from user devices, a POP load balancer, a system that receives data from user devices for remote storage, or any other system that can receive a message (e.g., a POP selection query) from a user device directly or indirectly via a POP selection resolver, select a POP for the user device to contact, and transmit a reply message for receipt by the user device that includes an instruction to contact the selected POP.

The foregoing aspects and many of the attendant advantages of this disclosure will become more readily appreciated as the same become better understood by reference to the following detailed description, when taken in conjunction with the accompanying drawings.

Example Hybrid Content Request Routing Environment

FIG. 1A is a block diagram of an illustrative operating environment 100 in which one or more user devices 102 communicate with one or more DNS resolvers 130 via a network 110 to receive network addresses for obtaining content. The operating environment 100 further includes a DNS server 140, one or more points of presence (POPs) 120, and a content request latency data store 150. While a single DNS server 140 is illustrated, this is merely for simplicity and is not meant to be limiting. For example, the operating environment 100 may include any number of DNS servers 140.

While the POPs 120, the DNS resolvers 130, the DNS server 140, and the content request latency data store 150 are illustrated as separate components, this is not meant to be limiting. Any one or all of these components may be associated with each other to form a CDN service provider, not shown. For example, any one or all of these components may implemented by a single computing device, or by multiple distinct computing devices, such as computer servers, logically or physically grouped together to collectively operate as a server system. Any one or all of these components may communicate via a shared network internal to the CDN service provider, not shown, and the CDN service provider may communicate with one or more of the user devices 102 via the network 110.

As used herein, a POP 120 is intended to refer to any collection of related computing devices utilized to implement functionality on behalf of one or many providers. POPs 120 are generally associated with a specific geographic location in which the computing devices implementing the respective POP 120 are located, or with a region serviced by the respective POP 120. For example, a data center or a collection of computing devices within a data center may form a POP 120. In some instances, the POPs 120 may implement one or more services, such as CDN services, data storage services, data processing services, etc. For the purposes of the present disclosure, the POPs 120 implement at least CDN services. The CDN services can include one or more servers communicatively coupled to a cache data store, not shown. The server(s) and cache data store may operate in conjunction to implement functionalities of the CDN services. For example, the server(s) and cache data store may operate to cache distributed content (e.g., as provided by the one or more origin servers) and respond to requests from end users (e.g., via user devices 102) for such cached content.

As described in greater detail below with respect to FIG. 1B, some or all of the POPs 120 may form a virtual POP. The virtual POP may be associated with an anycast network address. Thus, a request sent by a user device 102 to the anycast network address may be routed to one of the POPs 120 that forms the virtual POP. The operating environment 100 may include one or more virtual POPs.

Each POP 120 may include various modules, components, data stores, and/or the like to assist the DNS server 140 in resolving a DNS query. For example, each POP 120 may include a latency measurement device 122. The latency measurement device 122 may measure the latency of a content request submitted by a user device 102 and received by the respective POP 120. The latency measurement device 122 may measure the latency and store the latency in the content request latency data store 150 in an entry associated with the source network address of the user device 102 that submitted the content request and an identification of the POP 120 that received the content request.

The DNS resolvers 130 may be computing devices with hardware components (e.g., processor(s), memory, network interfaces, etc.) that submit DNS queries to the DNS server 140 on behalf of user devices 102. As described herein, individual user devices 102 may be associated with a particular DNS resolver 130 and thus may use the associated DNS resolver 130 to submit DNS queries to the DNS server 140. In one embodiment, some or all of the DNS resolvers 130 may be provided by individual enterprise networks to which individual user devices 102 belong. Thus, user devices 102 that belong to an enterprise network may use the DNS resolver 130 provided by that enterprise network to submit DNS queries to the DNS server 140. In another embodiment, some or all of the DNS resolvers 130 may be provided by individual Internet Service Providers (ISPs) that provide the communication network connection to individual user devices 102. Thus, user devices 102 that receive a communication network connection from an ISP may use the DNS resolver 130 provided by that ISP to submit DNS queries to the DNS server 140.

The DNS server 140 may determine the appropriate network address to retrieve and deliver in response to a received DNS query. The DNS server 140 may include various modules, components, data stores, and/or the like to provide the hybrid anycast routing/DNS resolver-based routing functionality described herein. For example, the DNS server 140 may include a DNS query manager 142, a client ID mapping data store 144, and a POP address data store 146. The DNS query manager 142 may map source network addresses to different DNS resolvers 130, average latencies stored in the content request latency data store 150, and use the mappings and average latencies to identify the appropriate network address to retrieve in response to a DNS query. Alternatively, the DNS query manager 142 can combine latencies stored in the content request latency data store 150 using another aggregation function, such as by taking a median latency stored in the content request latency data store 150, taking a mode latency stored in the content request latency data store 150, taking a minimum latency in the content request latency data store 150, taking a maximum latency in the content request latency data store 150, and/or the like, and use the mappings and combined latencies to identify the appropriate network address to retrieve in response to a DNS query. Additional details on the operations performed by the DNS query manager 142 are described in greater detail below with respect to FIGS. 2 and 5.

The client ID mapping data store 144 stores mappings of source network addresses to identifications of DNS resolvers 130. Thus, the client ID mapping data store 144 stores data indicating which source network addresses of user devices 102 use a particular DNS resolver 130 when DNS queries are submitted. While the client ID mapping data store 144 is depicted as being located internal to the DNS server 140, this is not meant to be limiting. For example, not shown, the client ID mapping data store 144 can be located external to the DNS server 140.

The POP address data store 146 stores the network addresses of one or more of the POPs 120 and the anycast network addresses of one or more virtual POPs. While the POP address data store 146 is depicted as being located internal to the DNS server 140, this is not meant to be limiting. For example, not shown, the POP address data store 146 can be located external to the DNS server 140.

The DNS server 140 may be a single computing device, or it may include multiple distinct computing devices, such as computer servers, logically or physically grouped together to collectively operate as a server system. The components of the DNS server 140 can each be implemented in application-specific hardware (e.g., a server computing device with one or more ASICs) such that no software is necessary, or as a combination of hardware and software. In addition, the modules and components of the DNS server 140 can be combined on one server computing device or separated individually or into groups on several server computing devices. In some embodiments, the DNS server 140 may include additional or fewer components than illustrated in FIG. 1A.

In some embodiments, the features and services provided by the POPs 120 and/or the DNS server 140 may be implemented as web services consumable via the communication network 110. In further embodiments, the POPs 120 and/or the DNS server 140 are provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

The content request latency data store 150 stores, for a content request submitted by a particular user device 102 to a particular POP 120 or virtual POP, a latency associated with the submitted request. In particular, the stored latency may be a latency measured from a time that a user device 102 transmits a content request to a time that a POP 120 or virtual POP receives the transmitted content request. While the content request latency data store 150 is depicted as being located external to the POPs 120 and the DNS server 140, this is not meant to be limiting. For example, not shown, the content request latency data store 150 can be located internal to the POPs 120 and/or the DNS server 140.

Various example user devices 102 are shown in FIG. 1, including a desktop computer, laptop, and a mobile phone, each provided by way of illustration. In general, the user devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. The user devices 102 may execute an application (e.g., a browser, a media player, etc.) that generates and transmits DNS queries to a DNS resolver 130 and that generates and transmits content requests to one or more POPs 120.

The network 110 may include any wired network, wireless network, or combination thereof. For example, the network 110 may be a personal area network, local area network, wide area network, over-the-air broadcast network (e.g., for radio or television), cable network, satellite network, cellular telephone network, or combination thereof. As a further example, the network 110 may be a publicly accessible network of linked networks, possibly operated by various distinct parties, such as the Internet. In some embodiments, the network 110 may be a semi-private or private network, such as a corporate or university intranet. The network 110 may include one or more wireless networks, such as a Global System for Mobile Communications (GSM) network, a Code Division Multiple Access (CDMA) network, a Long Term Evolution (LTE) network, or any other type of wireless network. The network 110 can use protocols and components for communicating via the Internet or any of the other aforementioned types of networks. For example, the protocols used by the public network 110 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Figure 1B:
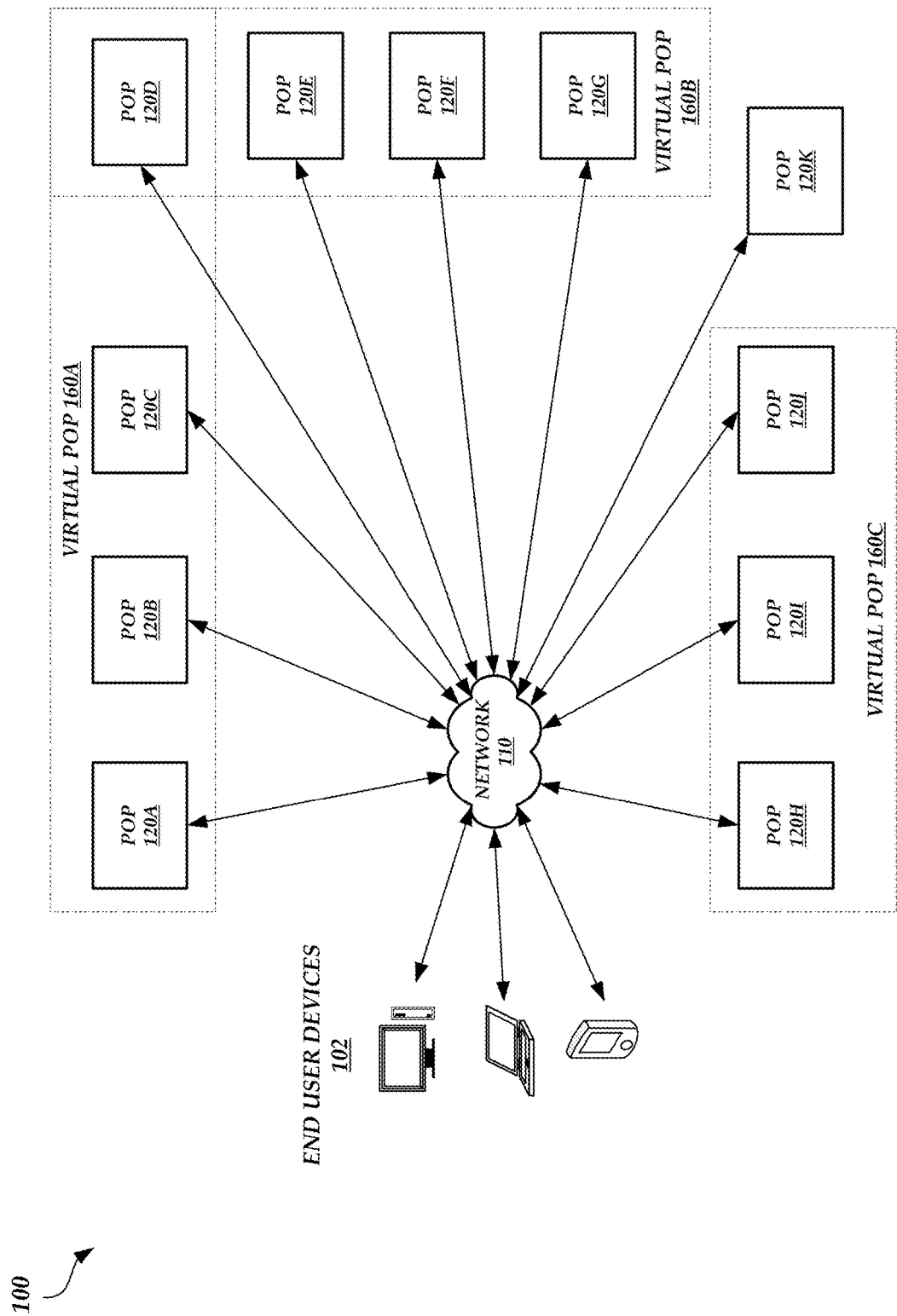
FIG. 1B is a block diagram of the illustrative operating environment of FIG. 1A in which virtual POPs are depicted.

FIG. 1B is a block diagram of the illustrative operating environment 100 of FIG. 1A in which virtual POPs 160A-C are depicted. While three virtual POPs 160A-C are depicted in FIG. 1B, this is merely for illustrative purposes and is not meant to be limiting. For example, any number of virtual POPs (e.g., one, two, three, four, five, etc.) may be present in the operating environment 100.

As illustrated in FIG. 1B, the virtual POP 160A is formed by four physical POPs 120A-D. Each POP 120A-D in the virtual POP 160A may be assigned the same anycast network address. If a user device 102 sends a request to the anycast network address assigned to the POPs 120A-D, the request may be routed to one of the POPs 120A-D according to the BGP routing protocol. For example, the BGP routing protocol may determine that the request will be routed to the POP 120A, 120B, 120C, or 120D that is the fewest number of hops away from the location of the user device 102 (e.g., as determined by the source network address of the user device 102). As used herein, a hop may occur when an intermediate routing device in the network 110 forwards the request to another routing device in the network 110 or the destination POP 120A-D.

Similar to the virtual POP 160A, the virtual POP 160B may be formed by four physical POPs 120D-120G and the virtual POP 160C may be formed by three physical POPs 120H-120J. Each POP 120D-G in the virtual POP 160B may be assigned the same anycast network address and each POP 120H-J in the virtual POP 160C may be assigned the same anycast network address. As illustrated in FIG. 1B, some POPs 120, such as POP 120D, may be part of two or more different virtual POPs. Thus, POPs 120 that are a part of two or more different virtual POPs may be assigned two or more corresponding anycast network addresses. As an illustrative example, the POP 120D may be assigned the same anycast network address as POPs 120A-C and may also be assigned the same anycast network address as POPs 120E-120G. Accordingly, the POPs 120A-D may share the same, first anycast network address, the POPs 120D-G may share the same, second anycast network address, and the POPs 120H-J may share the same, third anycast network address.

The POPs 120A-J that form a virtual POP 160A-C may be located in the same geographic region (e.g., the same city, state, country, continent, etc.). Alternatively, some or all of the POPs 120A-J that form a virtual POP 160A-C may be located in different geographic regions.

While each virtual POP 160A-C is depicted as being formed by three or four physical POPs, this is merely for illustrative purposes and is not meant to be limiting. Any virtual POP 160A-C may be formed from any number of physical POPs (e.g., one, two, three, four, five, etc.). For example, one virtual POP in the operating environment 100 may be formed from a large number of physical POPs (e.g., 20) and another virtual POP in the operating environment 100 may be formed from a small number of physical POPs (e.g., 2). Accordingly, a first virtual POP may not share any physical POPs with a second virtual POP. Alternatively, a first virtual POP may share some, but not all, of the physical POPs that form the first virtual POP with a second virtual POP. In another alternative, all of the physical POPs that form a first virtual POP may be a subset of all of the physical POPs that form a second virtual POP.

In addition to being assigned one or more anycast network addresses, one or more of the POPs 120A-J may be assigned a unique, individual network address. Thus, a request transmitted by the user device 102 to an individual network address may be routed to the POP 120A-J associated with the indicated individual network address. Moreover, any number of other POPs 120 that do not form any part of a virtual POP may be present in the operating environment 100. For example, the operating environment 100 may include POP 120K. The POP 120K may not form any part of a virtual POP. These POPs that do not form any part of a virtual POP, such as the POP 120K, may be assigned a unique, individual network address.

Example Block Diagrams for Resolving a DNS Query

Figure 2:
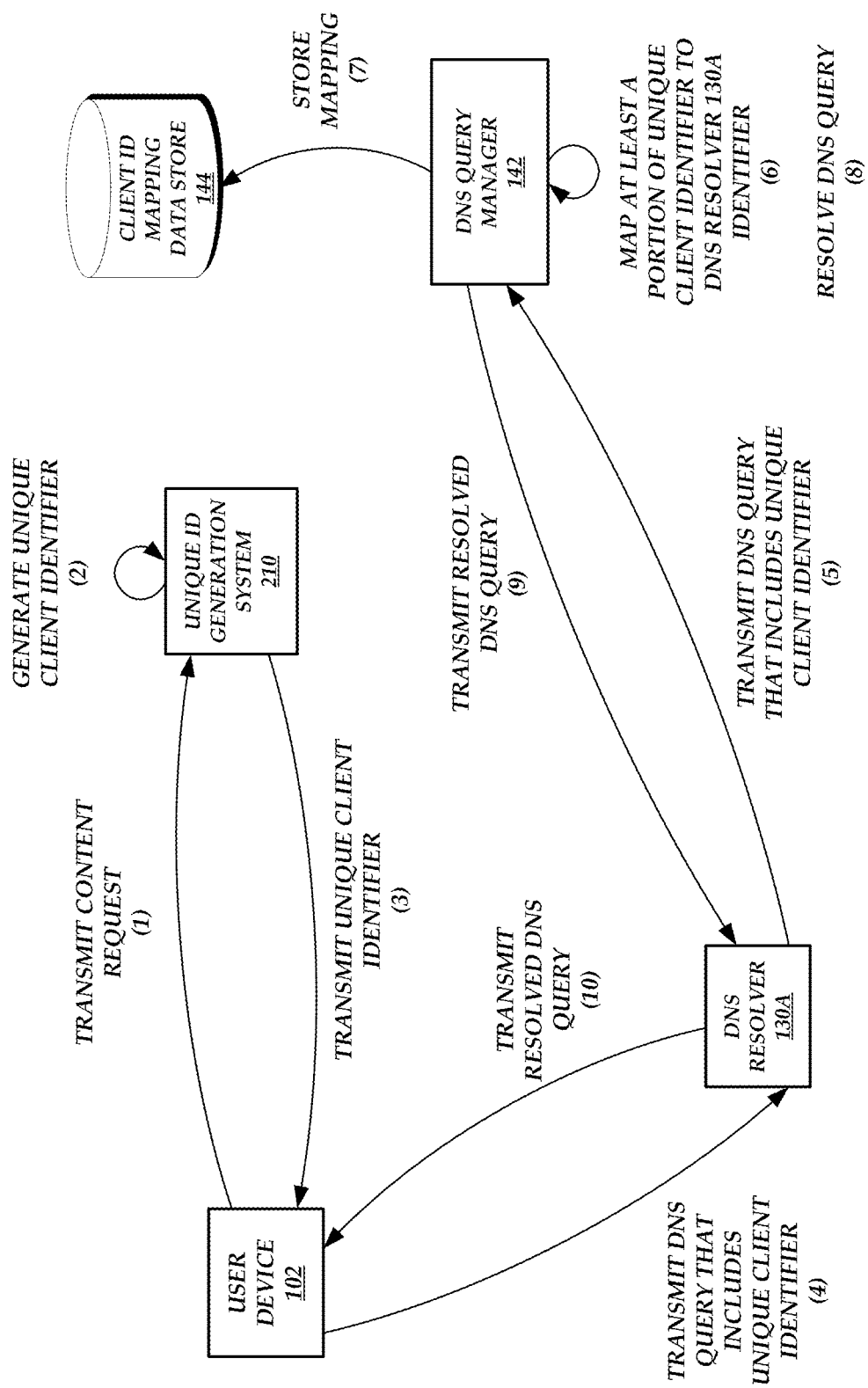
FIG. 2 is a block diagram of the operating environment of FIGS. 1A-1B illustrating the operations performed by the components of the operating environment to identify which user devices use the DNS resolver, according to one embodiment.

FIG. 2 is a block diagram of the operating environment 100 of FIGS. 1A-1B illustrating the operations performed by the components of the operating environment 100 to identify which user devices 102 use the DNS resolver 130A, according to one embodiment. As illustrated in FIG. 2, the user device 102 may transmit a content request to a unique ID generation system 210 (e.g., a recon service) at (1). The unique ID generation system 210 may be a POP 120 or a separate computing system. The user device 102 may be directed to the unique ID generation system 210 in an attempt to resolve a link previously provided to the user device 102.

Upon receipt of the content request, the unique ID generation system 210 may generate a unique client identifier at (2). The unique client identifier may be an identifier, such as a network address, that is used to track the requesting user device 102 in subsequent requests to a POP 120. Specifically, the unique client identifier may include at least a portion of the identifier associated with the requesting user device 102 (e.g., the source network address of the requesting user device 102, a media access control (MAC) address of the requesting user device 102, etc.). As an illustrative example, the unique client identifier generated by the unique ID generation system 210 may be in the form of a uniform resource locator (URL). For purposes of the illustrative example, the URL can identify a domain of the unique ID generation system 210 and/or a POP 120 (e.g., "serviceprovider.com"), an identification of the unique ID generation system 210 that generated the unique client identifier, and/or at least a portion of the identifier associated with the requesting user device 102. The URL can also include timestamp information associated with a time corresponding to the request (e.g., an absolute time or a time relative to another time, such as a time a content request is first received by the unique ID generation system 210) and/or additional processing information. In this illustrative example, the URL may be in the following form:

http://uniqueID.additional_information.IDgen_identification.serviceprovider.com Here, the label "uniqueID" can include at least a portion of the identifier associated with the requesting user device 102 (e.g., the source network address of the requesting user device 102). Alternatively or in addition, the label "uniqueID" may include timestamp information. The unique ID generation system 210 can then transmit the unique client identifier to the user device 102 at (3).

The unique client identifier may be a command (e.g., a redirect) that causes the user device 102 to request the content from another location. For example, the unique ID generation system 210 can generate a LOCATION command in accordance with the hypertext transfer protocol (HTTP) that identifies an alternate location for the requested content. Accordingly, the location included in the response sent by the unique ID generation system 210 to the user device 102 may be the unique client identifier, which may be in the form of a URL as depicted above.

The user device 102 can then process the unique client identifier, which causes the user device 102 to eventually request the content from an alternative location. For example, the user device 102 can transmit a DNS query that includes the unique client identifier to the DNS resolver 130A at (4) to request a network address of a POP corresponding to the location indicated by the unique client identifier. As an example, the URL representing the unique client identifier may include an identification of a DNS server authoritative to the "." and the "com" portions of the URL. The DNS resolver 130A can partially resolve the URL (e.g., resolve the "." and "com" portions of the URL) and, in response, submit a DNS query (not shown) for the resource URL that results in the identification of the authoritative DNS server, which is the DNS server corresponding to the ".serviceprovider" portion of the URL. Here, the DNS server 140 may be authoritative. Thus, the DNS resolver 130A can then forward the DNS query to the DNS query manager 142 of the DNS server 140 at (5) on behalf of the user device 102.

The DNS query manager 142 can then process the DNS query. For example, the DNS query manager 142 identifies an identifier associated with the DNS resolver 130A based on the received DNS query. The DNS query manager 142 also extracts at least a portion of the unique client identifier by parsing the unique client identifier. In particular, the DNS query manager 142 may extract the portion of the unique client identifier corresponding to the identifier associated with the requesting user device 102 (e.g., the "uniqueID," which may be the source network address of the requesting user device 102). The DNS query manager 142 can then map at least a portion of the unique client identifier to the DNS resolver 130A identifier at (6). For example, the DNS query manager 142 can map the identifier associated with the requesting user device 102 (e.g., the source network address of the requesting user device 102) to the DNS resolver 130A identifier. Thus, the DNS query manager 142 has determined that the requesting user device 102 (and therefore the corresponding source network address of the requesting user device 102) uses the DNS resolver 130A when submitting DNS queries. In addition, because source network addresses are generally associated with a geographic location, the DNS query manager 142 may also have determined the location of the requesting user device 102 and therefore a location of a user device 102 that uses the DNS resolver 130A. The DNS query manager 142 can then store the mapping in the client ID mapping data store 144 at (7).

The DNS query manager 142 can also resolve the DNS query at (8). For example, the DNS query manager 142 can retrieve a network address for a POP 120 that can provide requested content. The retrieved network address may be an individual network address of a POP 120 or an anycast network address corresponding to the POPs 120 that form a virtual POP. The DNS query manager 142 can then transmit the resolved DNS query to the DNS resolver 130A at (9), where the resolved DNS query includes the retrieved network address. The DNS resolver 130A can then transmit the resolved the DNS query to the user device 102 at (10). Additional details regarding the process for generating the unique client identifier and for using the unique client identifier to resolve a DNS query are described in U.S. Pat. No. 9,712,484, titled "MANAGING REQUEST ROUTING INFORMATION UTILIZING CLIENT IDENTIFIERS" and issued on Jul. 18, 2017, the entire contents of which are hereby incorporated herein by reference.

Figure 3A:
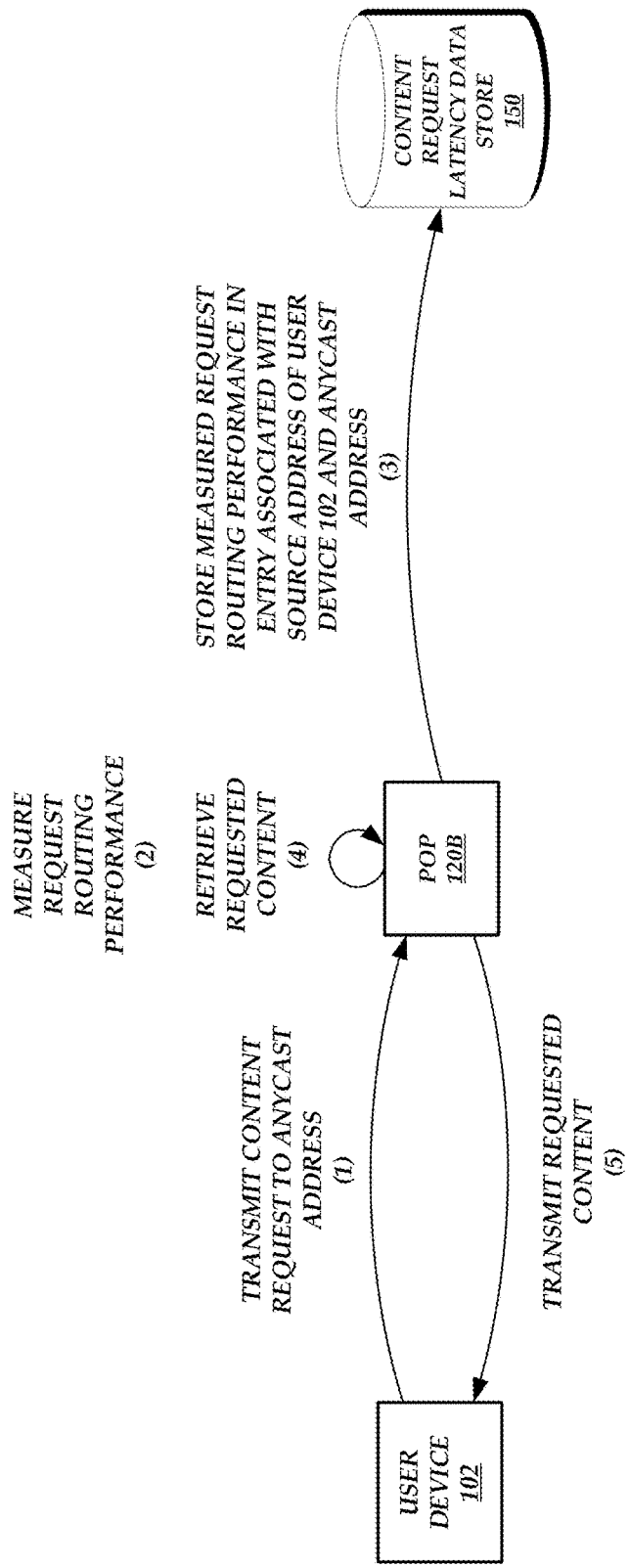
FIG. 3A is a block diagram of the operating environment of FIGS. 1A-1B illustrating the operations performed by the components of the operating environment in response to the resolved DNS query including an anycast network address, according to one embodiment.

FIG. 3A is a block diagram of the operating environment 100 of FIGS. 1A-1B illustrating the operations performed by the components of the operating environment 100 in response to the resolved DNS query including an anycast network address, according to one embodiment. As illustrated in FIG. 3A, after receiving the resolved DNS query (as depicted in FIG. 2), the user device 102 transmits a content request to the anycast network address included in the resolved DNS query at (1). The anycast network address may be associated with several POPs that form a virtual POP. For example, the anycast network address may be associated with the POPs 120A-D that form the virtual POP 160A. The BGP routing protocol may determine which POP 120A-D receives the content request. Here, the fewest number of hops between the user device 102 and a POP 120A-D of the virtual POP 160A may be between the user device 102 and the POP 120B. Thus, the user device 102 transmits the content request to the POP 120B.

The POP 120B (e.g., the latency measurement device 122) may measure the request routing performance at (2). For example, the latency measurement device 122 may measure the latency of the transmission of the content request from the user device 102 to the POP 120B. The content request may include a timestamp indicating a time when the user device 102 transmitted the content request. Thus, the latency measurement device 122 can compare a current time with the time indicated by the timestamp to determine the latency. The POP 120B can then store the measured request routing performance in the content request latency data store 150 at (3) in an entry associated with the source network address of the user device 102 and the anycast network address.

Before, during, or after measuring the request routing performance, the POP 120B can retrieve the requested content at (4). For example, the POP 120B may retrieve the requested content from a cache local to the POP 120B or from an origin server (not shown). The POP 120B can then transmit the requested content to the user device 102 at (5) to satisfy the content request.

Figure 3B:
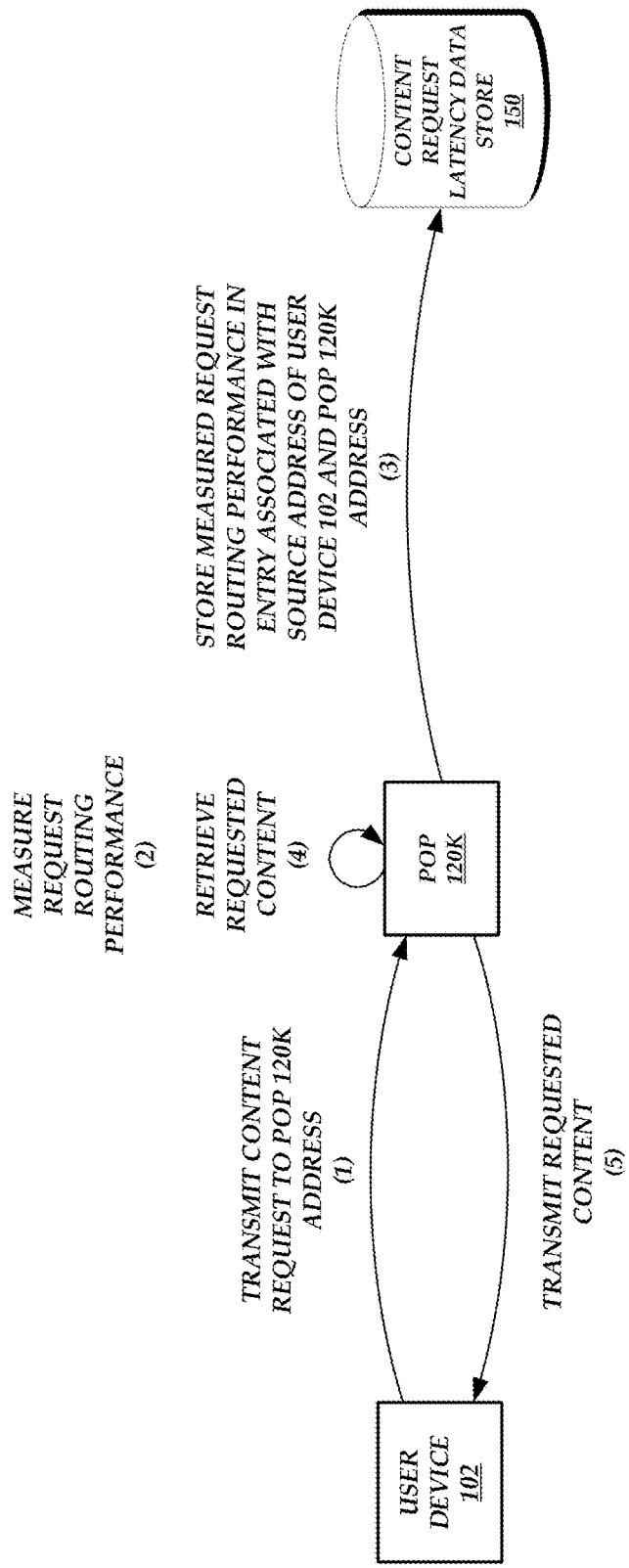
FIG. 3B is a block diagram of the operating environment of FIGS. 1A-1B illustrating the operations performed by the components of the operating environment in response to the resolved DNS query including an individual network address corresponding to a single POP, according to one embodiment.

FIG. 3B is a block diagram of the operating environment 100 of FIGS. 1A-1B illustrating the operations performed by the components of the operating environment 100 in response to the resolved DNS query including an individual network address corresponding to a single POP 120, according to one embodiment. As illustrated in FIG. 3B, after receiving the resolved DNS query (as depicted in FIG. 2), the user device 102 transmits a content request to the individual network address included in the resolved DNS query at (1). The individual network address may not be an anycast network address. Rather, the individual network address may be a unique network address associated with a POP. For example, the individual network address may be the network address of the POP 120K. Thus, the user device 102 transmits the content request to the POP 120K.

The POP 120K (e.g., the latency measurement device 122) may measure the request routing performance at (2). For example, the latency measurement device 122 may measure the latency of the transmission of the content request from the user device 102 to the POP 120K. The content request may include a timestamp indicating a time when the user device 102 transmitted the content request. Thus, the latency measurement device 122 can compare a current time with the time indicated by the timestamp to determine the latency. The POP 120K can then store the measured request routing performance in the content request latency data store 150 at (3) in an entry associated with the source network address of the user device 102 and the network address of the POP 120K.

Before, during, or after measuring the request routing performance, the POP 120K can retrieve the requested content at (4). For example, the POP 120K may retrieve the requested content from a cache local to the POP 120K or from an origin server (not shown). The POP 120K can then transmit the requested content to the user device 102 at (5) to satisfy the content request.

Some or all of the operations depicted in FIGS. 2 through 3B may be repeated over time for many different combinations of user devices 102, POPs 120, DNS resolvers 130, and/or DNS servers 140. Thus, the DNS query manager 142 may determine which source network addresses (e.g., user devices 102) use a particular DNS resolver and this information may then be stored in the client ID mapping data store 144. In addition, the content request latency data store 150 may therefore include latency measurements for different combinations of user devices 102 and POPs 120, such as latency measurements for content requests transmitted by user devices 102 to individual POP network addresses and latency measurements for content requests transmitted by user devices 102 to anycast POP network addresses.

FIG. 4 is a block diagram of the operating environment 100 of FIGS. 1A-1B illustrating the operations performed by the components of the operating environment 100 to resolve a DNS query submitted by a user device 102, according to one embodiment. As illustrated in FIG. 4, the user device 102 transmits a DNS query to an associated DNS resolver at (1). For example, the DNS resolver associated with the user device 102 may be the DNS resolver 130A. The DNS resolver 130A may then forward the DNS query to the DNS query manager 142 at (2).

The DNS query manager 142 may identify the DNS resolver that provided the DNS query using an identifier included in the DNS query. Thus, the DNS query manager 142 may determine that the DNS resolver 130A provided the DNS query. The DNS query manager 142 may then retrieve a list of source network addresses corresponding to the DNS resolver 130A from the client IP mapping data store 144 at (3). In other words, the DNS query manager 142 may query the client IP mapping data store 144 for the source network addresses that use the DNS resolver identified by the identifier in the DNS query (e.g., the DNS resolver 130A). Once the source network addresses that use the DNS resolver 130A are identified, the DNS query manager 142 can retrieve latencies for the identified source network addresses from the content request latency data store 150 at (4). Thus, the DNS query manager 142 may have some or all of the latencies that were measured for content requests submitted by the source network addresses that use the DNS resolver 130A.

As described herein, each latency may be associated with a source network address and a POP network address (e.g., either an anycast network address or an individual POP network address) corresponding to a POP 120 that measured the latency. Thus, the DNS query manager 142 can then, for each POP network address, average the latencies associated with the respective POP network address at (5). Alternatively, the DNS query manager 142 can, for each POP network address, combine the latencies associated with the respective POP network address using another aggregation function, such as by taking a median, a mode, a minimum, a maximum, and/or the like. Accordingly, the DNS query manager 142 may generate, for each individual POP network address and each anycast network address, an average latency value that represents the average latency of content requests submitted by source network addresses to the respective POP network address.

Alternatively, the DNS query manager 142 or another component in the operating environment 100 (not shown) can perform the latency averaging operations prior to the reception of a DNS query. The average latencies can be stored by the DNS query manager 142 or the other component in the content request latency data store 150 or another data store (not shown) for later retrieval when a DNS query is received.

The DNS query manager 142 can then rank the average latencies and, based on the ranking, identify the POP network address corresponding to the lowest latency at (6). For example, the DNS query manager 142 can rank the average latencies by average latency value. The highest ranked average latency value (e.g., the lowest average latency value) may be associated with an individual POP network address or an anycast network address. The associated POP network address may be the POP network address that the DNS query manager 142 provides to the user device 102 to resolve the DNS query. Optionally, the DNS query manager 142 may retrieve the POP network address that is associated with the highest ranked average latency value and/or corresponding information from the POP address data sore 146 at (7) (e.g., if the latency data retrieved from the content request latency data store 150 does not provide the entire POP network address or the information necessary to completely resolve the DNS query). The DNS query manager 142 can then transmit the retrieved POP network address to the DNS resolver 130A at (8), which then transmits the retrieved POP network address to the user device 102 at (9) to resolve the DNS query.

In some embodiments, the DNS query manager 142 does not transmit the POP network address associated with the highest ranked average latency value. For example, the DNS server 140 or another component in the operating environment 100 may monitor the load on individual POPs 120 and/or virtual POPs 160A-C. If the highest ranked average latency value corresponds with a POP network address for an individual POP 120 or a virtual POP 160 that is at request processing capacity or is nearly at request processing capacity (e.g., the POP is processing 90% of a total number of requests the POP is capable of processing), then the DNS query manager 142 may identify the next highest ranked average latency value that corresponds with a POP network address for an individual POP 120 or virtual POP 160 that is not at request processing capacity or that is not nearly at request processing capacity and provide this POP network address to resolve a DNS query. As another example, if the highest ranked average latency value corresponds with a POP network address for an individual POP 120 or a virtual POP 160 that has received a number of content requests over a threshold value during a set period of time, then the DNS query manager 142 can identify the next highest ranked average latency value that corresponds with a POP network address for an individual POP 120 or virtual POP 160 that has not received a number of content requests over the threshold value during the set period of time. The DNS query manager 142 may then transmit the POP network address associated with the next highest ranked average latency value if the next highest ranked average latency value is within a threshold value (e.g., 20 ms, 50 ms, 100 ms, etc.) of the highest ranked average latency value. If it turns out that the next highest ranked average latency value is not within a threshold value of the highest ranked average latency value, then the DNS query manager 142 can transmit the POP network address associated with the highest ranked average latency value despite the fact that the corresponding individual POP 120 or virtual POP 160 may have received a number of content requests over a threshold value during a set period of time. Thus, the DNS query manager 142 can still provide the POP network address associated with the highest ranked average latency value if there are substantial performance benefits over providing the POP network address associated with the next highest ranked average latency value that satisfies the conditions described above.

In some cases, it may be difficult to identify the exact load on the POPs 120 that form a virtual POP 160 because the BGP routing protocol ultimately determines which POP 120 receives the content request and this may be unknown to the DNS server 140 or other component. Thus, the DNS server 140 or other component can set a content request threshold for the virtual POP 160. If the DNS server 140 (e.g., DNS query manager 142) or other component determines that an anycast network address corresponding to a virtual POP 160 is associated with the highest ranked average latency value and determines that the number of content requests that are sent to this anycast network address in a given period of time exceeds a threshold value (e.g., the number of times the anycast network address is provided to resolve a DNS query in a given period of time exceeds a threshold value), then the DNS query manager 142 may temporarily stop responding to DNS queries with the anycast network address of the virtual POP 160. Rather, the DNS query manager 142 may identify the next highest ranked average latency value that corresponds with a POP network address for an individual POP 120 or virtual POP 160 that is not at request processing capacity, that is not nearly at request processing capacity, and/or that has not received a number of content requests that has exceeded a threshold value and provide this POP network address to resolve a DNS query.

Similarly, the DNS server 140 or other component may monitor the health of one or more POPs 120. For example, the DNS server 140 or other component can periodically transmit messages to the POPs 120 requesting an acknowledgement and/or the POPs 120 may periodically transmit beacon messages to the DNS server 140 or other component. If an individual POP 120 does not transmit an acknowledgement or beacon message for a threshold period of time, then the DNS server 140 or other component may determine that the POP 120 has malfunctioned, is offline, or is otherwise unavailable. If the highest ranked average latency value corresponds with a POP network address for an individual POP 120 that is unavailable, then the DNS query manager 142 may identify the next highest ranked average latency value that corresponds with a POP network address for an individual POP 120 that is available and provide this POP network address to resolve a DNS query. Likewise, if some or all of the POPs 120 that form a virtual POP 160 are unavailable and the DNS query manager 142 had otherwise determined that the highest ranked average latency value corresponds with the anycast network address corresponding to the virtual POP 160, then the DNS query manager 142 may identify the next highest ranked average latency value that corresponds with a POP network address for an individual POP 120 or virtual POP 160 that is available and provide this POP network address to resolve a DNS query.

Optionally, the DNS query manager 142 may select a POP network address that is not associated with the highest ranked average latency value and provide this POP network address to the user device 102 via the DNS resolver 130 so that the content request latency data store 150 includes an entry for a latency between the user device 102 and this POP network address.

In other embodiments, the DNS query manager 142 does not average and rank latencies for all of the POP network addresses. For example, a threshold number of latency values associated with a first POP network address may not be available. Thus, the DNS query manager 142 may not average the latency values associated with the first POP network address and therefore may not consider average latency values associated with the first POP network address in identifying the lowest average latency value. As another example, the DNS query manager 142 may not rank the average latencies. Rather, the DNS query manager 142 may simplify identify the lowest average latency value from a list of average latency values. As another example, the DNS query manager 142 may begin averaging latency values. Once the DNS query manager 142 identifies an average latency value that falls below a threshold value, then the DNS query manager 142 may select the associated POP network address as the POP network address to provide to the user device 102 to resolve the DNS query and can cease averaging any additional set of latency values.

Thus, even though the DNS server 140 is unaware of the user device 102 that submitted the DNS query, the DNS server 140 can nonetheless provide the user device 102 via the DNS resolver 130 with a POP network address that may reduce the latency associated with the delivery of requested content.

Example DNS Query Resolving Routine

Figure 5:
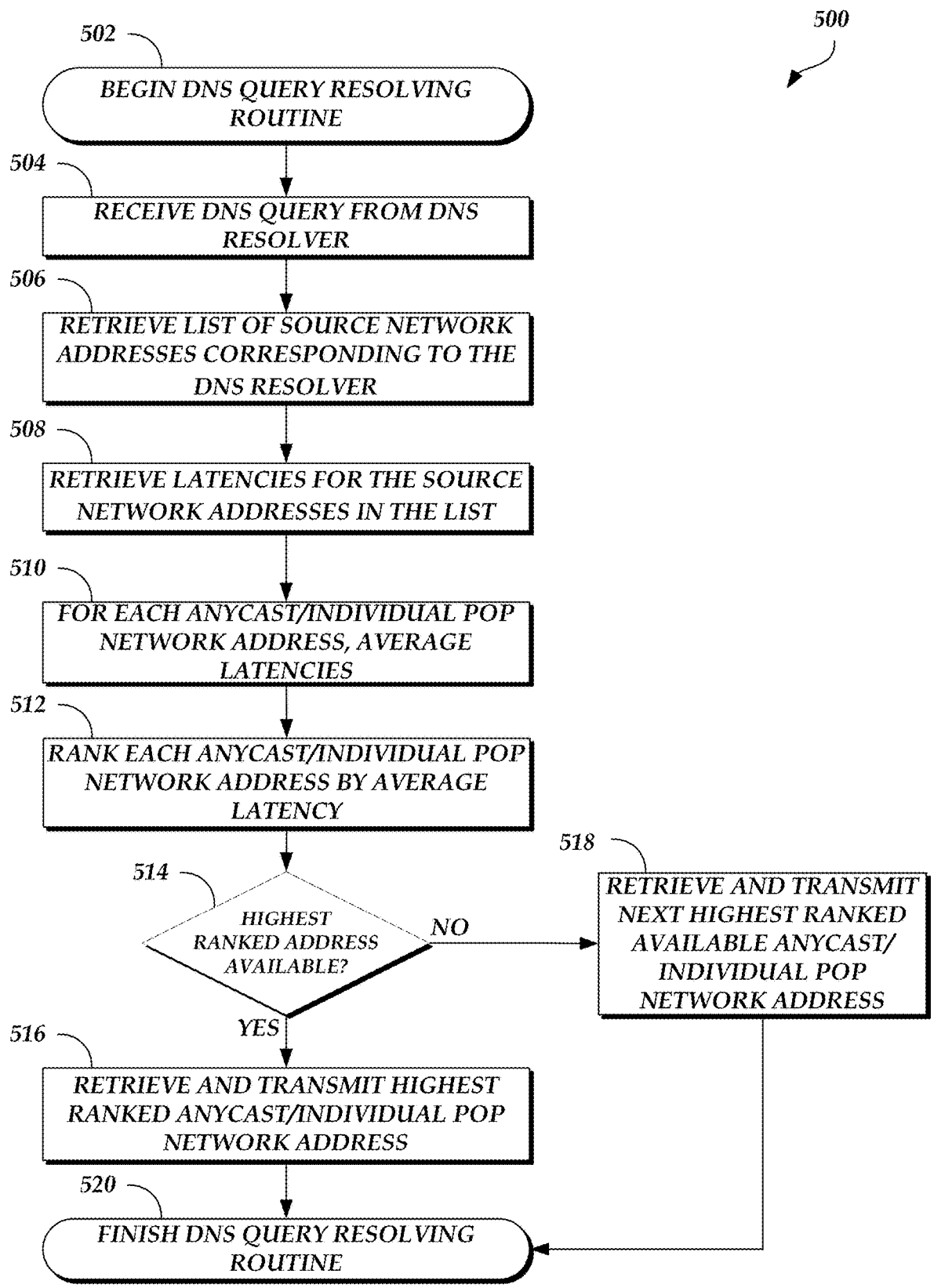
FIG. 5 is a flow diagram depicting a DNS query resolving routine illustratively implemented by a DNS server, according to one embodiment.

FIG. 5 is a flow diagram depicting a DNS query resolving routine 500 illustratively implemented by a DNS server, according to one embodiment. As an example, the DNS server 140 (e.g., the DNS query manager 142) of FIG. 1A can be configured to execute the DNS query resolving routine 500. The DNS query resolving routine 500 begins at block 502.

At block 504, a DNS query is received from a DNS resolver. The DNS query may include an identifier of the DNS resolver. However, the DNS query may not identify the user device 102 that initially transmitted the DNS query.

At block 506, a list of source network addresses corresponding to the DNS resolver is retrieved. For example, the list of source network addresses may include those source network addresses that have been determined to use the DNS resolver when submitting DNS queries.

At block 508, latencies for the source network addresses in the list are retrieved. For example, each retrieved latency may be associated with a source network address and a POP network address. The POP network address may be an individual POP network address or an anycast network address.

At block 510, for each anycast/individual POP network address, latencies are averaged. For example, latencies associated with a particular POP network address are aggregated and then averaged to determine an average latency value for the respective POP network address.

At block 512, each anycast/individual POP network address is ranked by average latency. For example, the anycast/individual POP network addresses may be ranked from lowest average latency value to highest average latency value.

At block 514, a determination is made as to whether the highest ranked POP network address is available. For example, a POP network address may not be available if the POP 120 or virtual POP 160 corresponding to the POP network address is at or nearly at request processing capacity, if the number of content requests transmitted to the virtual POP corresponding to the POP network address in a given period of time exceeds a threshold value (e.g., the number of times the POP network address is provided to resolve a DNS query in a given period of time exceeds a threshold value), and/or if the POP 120 or POPs 120 that form a virtual POP 160 corresponding to the POP network address are malfunctioning or offline. If the highest ranked POP network address is available, then the DNS query resolving routine 500 proceeds to block 516. Otherwise, if the highest ranked POP network address is unavailable, then the DNS query resolving routine 500 proceeds to block 518.

At block 516, the highest ranked anycast/individual POP network address is retrieved and transmitted. For example, the highest ranked anycast/individual POP network address may be transmitted to a DNS resolver 130, which then transmits the highest ranked anycast/individual POP network address to a user device 102 to resolve a DNS query. After retrieving and transmitting the highest ranked anycast/individual POP network address, the DNS query resolving routine 500 ends, as shown at block 520.

At block 518, the next highest ranked available anycast/individual POP network address is retrieved and transmitted. For example, the DNS query resolving routine 500 may repeat block 514, where the anycast/individual POP network addresses are analyzed in ranked order until an anycast/individual POP network address is identified as being available to determine the next highest ranked available anycast/individual POP network address. The next highest ranked available anycast/individual POP network address may be transmitted to a DNS resolver 130, which then transmits the next highest ranked available anycast/individual POP network address to a user device 102 to resolve a DNS query. After retrieving and transmitting the next highest ranked available anycast/individual POP network address, the DNS query resolving routine 500 ends, as shown at block 520.

Additional Embodiments

As described herein, the latency measurement device 122 can measure and store latencies when a user device 102 actively transmits a content request. The latency measurement device 122 may measure and store the latencies each time a user device 102 transmits a content request so that the content request latency data store 150 includes as many entries as possible, which may improve the accuracy of the DNS server 140 DNS query resolving process. For example, the latency measurement device 122 may measure and store the latencies after the operations depicted in FIG. 2 are performed and/or after the operations depicted in FIG. 4 are performed. In other words, the operations depicted in FIGS. 3A and/or 3B can be performed after the operations depicted in FIG. 2 are performed and/or after the operations depicted in FIG. 4 are performed.

In some cases, the POP 120 or DNS server 140 may instruct the user device 102 to transmit a random content request in addition to the request for content desired by the user device 102. For example, upon receiving a content request from a user device 102, the POP 120 may return the requested content and provide an instruction to transmit in the background another content request to another POP 120, such as a POP 120 that is otherwise not the POP 120 that would provide the lowest content delivery latency. The other POP 120 can receive the content request and measure the latency. The other POP 120 may or may not respond to the content request (e.g., since the user device 102 does not need or desire the requested content). As another example, upon receiving a DNS query, the DNS server 140 (e.g., the DNS query manager 142) may return the network addresses of two or more POPs 120 and/or virtual POPs 160. One of the POPs 120 or virtual POPs 160 may provide the content requested by the user device 102. However, all of the POPs 120 and/or virtual POPs 160 referenced by the network addresses included in the resolved DNS query may measure the latency of requests submitted by the user device 102. Thus, these operations can be used to further increase the number of entries stored in the content request latency data store 150.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer-implemented method comprising:
obtaining a first source network address and a second source network address that use a network device to submit queries;
obtaining an indication of a first latency between a first user device corresponding to the first source network address and a first point of presence (POP) that has a unique network address, an indication of a second latency between the first user device and a second POP that has a non-unique network address, an indication of a third latency between a second user device corresponding to the second source network address and the first POP, and an indication of a fourth latency between the second user device and the second POP;
determining that a combination of the first latency and the third latency is less than a combination of the second latency and the fourth latency; and
resolving a query from the network device based at least in part on the determination.

2. The computer-implemented method of claim 1, further comprising:
obtaining a second query from the network device, wherein the second query comprises a unique client identifier;
determining that the unique client identifier comprises the first source network address; and
mapping the first source network address to the network device.

3. The computer-implemented method of claim 1, wherein the first user device with the first source network address is configured to generate and transmit the query to the network device, wherein the first user device is further configured to obtain the unique network address from the network device, and wherein the first user device is further configured to transmit a content request to the unique network address.

4. The computer-implemented method of claim 1, wherein resolving a query from the network device further comprises:
determining that the first POP is available; and
transmitting the unique network address to the network equipment in response to the determination that the first POP is available.

5. A system comprising:
a data store that stores latency information; and
a selection system comprising a processor configured with specific computer-executable instructions that, when executed, cause the selection system to at least:
identify that a first source network address and a second source network address are mapped to a network device;
obtain an indication of a first latency between a first user device corresponding to the first source network address and a first network location that has a unique network address, an indication of a second between the first user device and a second network location that has a non-unique network address, an indication of a third latency between a second user device corresponding to the second source network address and the first network location, and an indication of a fourth latency between the second user device and the second network location;
determine that a combination of the first latency and the third latency is lower than a combination of the second latency and the fourth latency; and
resolve a query from the network device based at least in part on the determination.

6. The system of claim 5, wherein the processor is further configured with specific computer-executable instructions that, when executed, cause the selection system to at least:
  determine that the first network location is available; and
  transmit the unique network address to the network equipment in response to the determination that the first network location is available.

7. The system of claim 5, wherein the processor is further configured with specific computer-executable instructions that, when executed, cause the selection system to at least:
  determine that the network location is unavailable; and
  transmit the non-unique network address instead of the unique network address to the network equipment to resolve the query.

8. The system of claim 7, wherein the processor is further configured with specific computer-executable instructions that, when executed, cause the selection system to at least determine that the first network location is one of malfunctioning, offline, or currently at request processing capacity.

9. The system of claim 5, wherein the combination of the first latency and the third latency is one of an average of the first latency and the third latency, a median of the first latency and the third latency, a mode of the first latency and the third latency, a minimum of the first latency and the third latency, or a maximum of the first latency and the third latency.

10. The system of claim 5, wherein the processor is further configured with specific computer-executable instructions that, when executed, cause the selection system to at least:
  obtain a second query from the network equipment, wherein the second query comprises a unique client identifier;
  determine that the unique client identifier comprises the first source network address;
  map the first source network address to the network equipment; and
  store the mapping of the first source network address to the network equipment in a client ID mapping data store.

11. The system of claim 5, further comprising a third network location, wherein the second network location and the third network location are both assigned the non-unique network address.

12. The system of claim 11, wherein the second network location is configured to at least:
  obtain a content request from the first user device with the first source network address;
  measure a fifth latency of a transmission of the content request from the first user device to the second network location; and
  store the measured fifth latency in the data store in an entry associated with the first source network address and the non-unique network address.

13. The system of claim 12, wherein the third network location is configured to at least:
  obtain a second content request from the second user device with the second source network address;
  measure a sixth latency of a transmission of the second content request from the second user device to the third network location; and
  store the measured sixth latency in the data store in an entry associated with the second source network address and the non-unique network address.

14. The system of claim 12, wherein the content request is routed from the first user device to the second network location according to a border gateway protocol (BGP) routing protocol.

15. The system of claim 5, wherein the selection system comprises a domain name server (DNS).

16. Non-transitory, computer-readable storage media comprising computer-executable instructions for resolving a query, wherein the computer-executable instructions, when executed by a computer system, cause the computer system to at least:
  determine that a first source network address and a second source network address are mapped to a network device;
  obtain an indication of a first latency between a first user device corresponding to the first source network address and a first network location that has a first type of network address, an indication of a second latency between the first user device and a second network location that has a second type of network address, an indication of a third latency between a second user device corresponding to the second source network address and the first network location, and an indication of a fourth latency between the second user device and the second network location;
  compare a combination of the first latency and the third latency with a combination of the second latency and the fourth latency; and
  resolve the query based at least in part on the comparison.

17. The non-transitory, computer-readable storage media of claim 16, wherein the computer-executable instructions further cause the computer system to at least:
  determine that the first network location is available; and
  transmit the unique network address to the network equipment in response to the determination that the first network location is available.

18. The non-transitory, computer-readable storage media of claim 16, wherein the computer-executable instructions further cause the computer system to at least:
  determine that the first network location is unavailable; and
  transmit the second type of network address instead of the first type of network address to the network equipment to resolve the query.

19. The non-transitory, computer-readable storage media of claim 18, wherein the computer-executable instructions further cause the computer system to at least determine that the first network location is one of malfunctioning, offline, or currently at request processing capacity.

20. The non-transitory, computer-readable storage media of claim 16, wherein the computer-executable instructions further cause the computer system to at least:
  process a second query obtained from the network equipment, wherein the second query comprises a unique client identifier;
  determine that the unique client identifier comprises the first source network address; and
  map the first source network address to the network equipment.

* * * * *